(12) United States Patent
Uchida et al.

(10) Patent No.: US 12,116,054 B2
(45) Date of Patent: Oct. 15, 2024

(54) STEERING DEVICE

(71) Applicant: Knorr-Bremse Commercial Vehicle Systems Japan Ltd., Sakado (JP)

(72) Inventors: Yukio Uchida, Higashimatsuyama (JP); Toshiro Yoda, Higashimatsuyama (JP); Shogo Ishikawa, Higashimatsuyama (JP); Satoshi Kubosawa, Higashimatsuyama (JP)

(73) Assignee: Knorr-Bremse Commercial Vehicle Systems Japan Ltd., Saitama (JP)

( * ) Notice: Subject to any disclaimer, the term of this patent is extended or adjusted under 35 U.S.C. 154(b) by 563 days.

(21) Appl. No.: 17/429,703

(22) PCT Filed: Dec. 16, 2019

(86) PCT No.: PCT/JP2019/049101
§ 371 (c)(1),
(2) Date: Aug. 10, 2021

(87) PCT Pub. No.: WO2020/170579
PCT Pub. Date: Aug. 27, 2020

(65) Prior Publication Data
US 2022/0126912 A1    Apr. 28, 2022

(30) Foreign Application Priority Data
Feb. 18, 2019   (JP) ................... 2019-026915

(51) Int. Cl.
*B62D 5/06*        (2006.01)
*B62D 5/065*       (2006.01)
(Continued)

(52) U.S. Cl.
CPC .............. *B62D 5/092* (2013.01); *B62D 5/064* (2013.01); *B62D 5/065* (2013.01); *B62D 5/083* (2013.01);
(Continued)

(58) Field of Classification Search
CPC .......... B62D 5/064; B62D 5/30; B62D 5/065; B62D 5/083
See application file for complete search history.

(56) References Cited

U.S. PATENT DOCUMENTS 6,244,371 B1   6/2001  Bohner et al.
9,452,777 B2 *  9/2016  Yoda .................... H02K 5/1732
(Continued)

FOREIGN PATENT DOCUMENTS

CN    102887168 A    1/2013
DE    19839951 C2    6/2000
(Continued)

OTHER PUBLICATIONS

International Search Report issued in corresponding application No. PCT/JP2019/049101 dated Feb. 25, 2020 with English translation.
(Continued)

*Primary Examiner* — Tony H Winner
*Assistant Examiner* — Hosam Shabara
(74) *Attorney, Agent, or Firm* — FOLEY & LARDNER LLP

(57) ABSTRACT

A steering device includes: a steering mechanism including a steering shaft, and a transmitting mechanism; and a controller including a first hydraulic passage state judging section, a first electric motor control section, and a second electric motor control section; the first hydraulic passage state judging section configured to judge a state of the hydraulic fluid in a first hydraulic passage in which the hydraulic fluid discharged from the first pump flows, the first electric motor control section configured to control and drive the first electric motor based on a driving state of a vehicle, and the second electric motor control section configured to increase a rotation number of the second electric motor when the first hydraulic passage state judging section judges
(Continued)

that a supply of the hydraulic fluid in the first hydraulic passage is deficient.

17 Claims, 25 Drawing Sheets

(51) Int. Cl.
  *B62D 5/083* (2006.01)
  *B62D 5/09* (2006.01)
  *B62D 5/30* (2006.01)
  *B62D 5/04* (2006.01)

(52) U.S. Cl.
  CPC .............. *B62D 5/30* (2013.01); *B62D 5/0463* (2013.01); *B62D 5/063* (2013.01)

(56) References Cited

U.S. PATENT DOCUMENTS

| | | | |
|---|---|---|---|
| 10,988,167 B2 * | 4/2021 | Matsumura | B62D 5/0463 |
| 2012/0160594 A1 * | 6/2012 | Yoda | B62D 5/065 |
| | | | 180/421 |
| 2015/0298728 A1 | 10/2015 | Yoda et al. | |
| 2019/0111965 A1 | 4/2019 | Matsumura | |

FOREIGN PATENT DOCUMENTS

| | | | |
|---|---|---|---|
| JP | H01-186474 A | | 7/1989 |
| JP | 2001173480 A | * | 6/2001 |
| JP | 2003160056 A | * | 6/2003 |
| JP | 2005-343298 A | | 12/2005 |
| JP | 2007302050 A | * | 11/2007 |
| JP | 2016-150645 A | | 8/2016 |
| JP | 2018047715 A | * | 3/2018 |
| WO | WO-2014/103556 A1 | | 7/2014 |
| WO | WO-2017/159107 A1 | | 9/2017 |

OTHER PUBLICATIONS

Written Opinion issued in corresponding application No. PCT/JP2019/049101 dated Feb. 25, 2020 with English translation.
Office Action of corresponding Japanese Patent Application No. 2021-501609, dated Feb. 21, 2023 (12 pages).
Office Action of corresponding Chinese Patent Application No. 201980092458.5, dated Dec. 12, 2022.
German Office Action on German Application No. 112019006878.4 Dated Jun. 14, 2024 (16 pages).

* cited by examiner

STEERING DEVICE

TECHNICAL FIELD

This invention relates to a steering device.

BACKGROUND ART

There has been known a conventional steering device described, for example, in a following patent document.

In this steering device, a first shaft and a second shaft are connected by a torsion bar to be rotated relative to each other. A steering force is applied to the first shaft by a steering wheel or a first electric motor. A steering assist force is applied to the second shaft based on a hydraulic pressure supplied to a power cylinder by using a pump driven by an engine in accordance with a torsion of a torsion bar according to an input of the steering force.

PRIOR ART DOCUMENT

Patent Document

Patent Document 1: Japanese Patent Application Publication No. 2016-150645

SUMMARY OF THE INVENTION

Problems which the Invention is Intended to Solve

However, in the conventional steering device, the steering force is assisted based on the hydraulic pressure supplied to the power cylinder by using the pump driven by the engine. Accordingly, the supply of the hydraulic fluid to the power cylinder is deficient, for example, at an idling stop, or at a malfunction of a hydraulic system, so that it is difficult to apply the sufficient steering assist force to the second shaft.

It is, therefore, an object of the present invention to provide a steering device devised to solve the above-described problems, and to apply a steering assist force to a second shaft even when a supply of a hydraulic fluid to a power cylinder in a first hydraulic passage is deficient.

MEANS FOR SOLVING THE PROBLEM

In an aspect of the present invention, there is provided a second pump configured to be driven by a second electric motor which is a second driving source. A rotation number of the second motor is increased when it is judged that a supply of a hydraulic fluid in a first hydraulic passage is deficient.

BENEFIT OF THE INVENTION

In this present invention, even when the hydraulic fluid in the first hydraulic passage to the power cylinder is deficient, it is possible to provide the steering assist force to the second shaft.

BRIEF DESCRIPTION OF DRAWINGS

FIG. 4 are sectional views taken along a section line A-A line of FIG. 2.

DESCRIPTION OF EMBODIMENTS

Hereinafter, steering devices according to embodiments of the present invention are explained with reference to the drawings. Besides, the below-described embodiments show cases where the steering devices according to the embodiments are applied to steering devices of a vehicle, similarly to the conventional device.

First Embodiment

Figure 1:
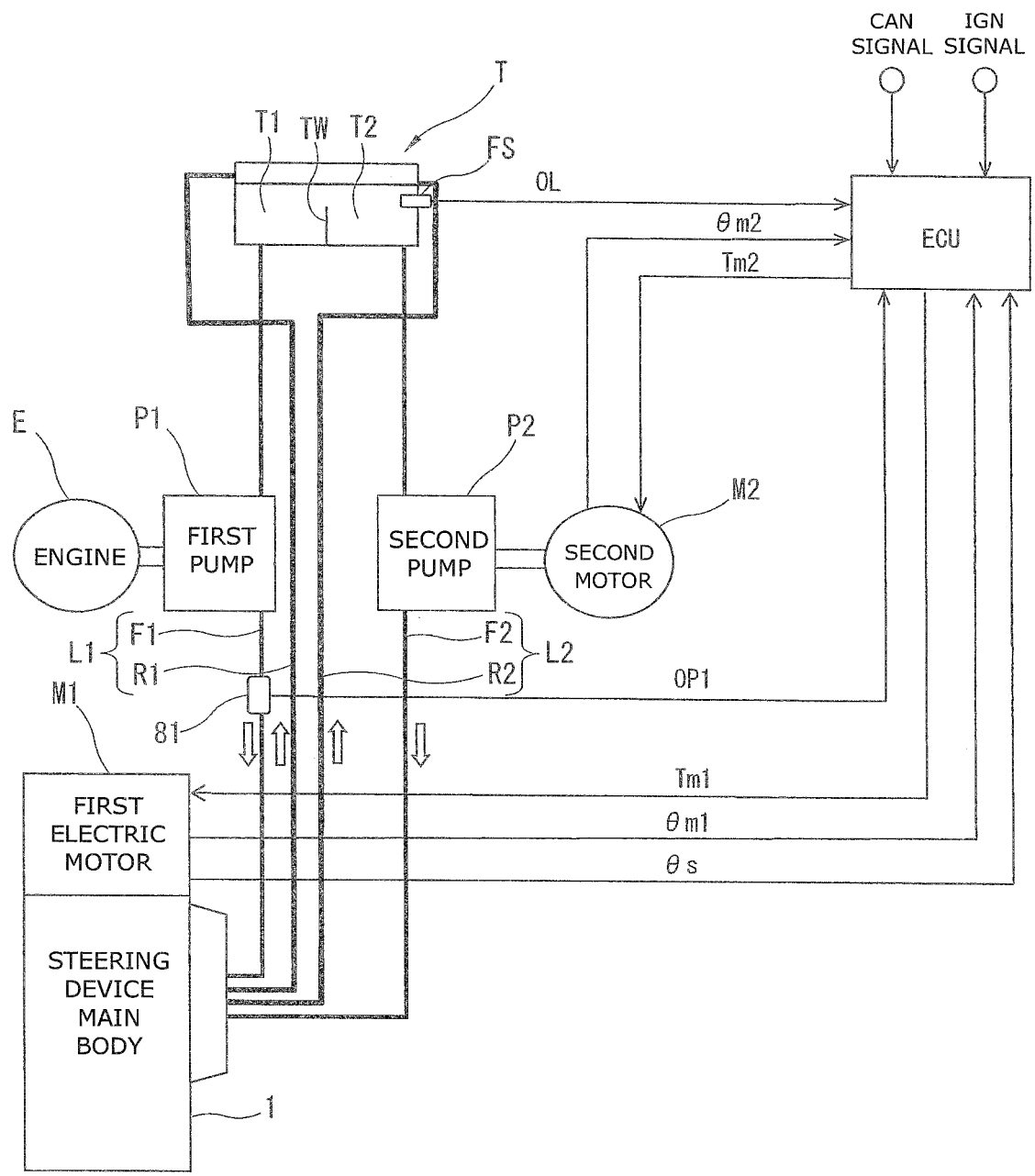
FIG. 1 is a system configuration view showing a steering device according to a first embodiment of the present invention.

FIG. 1 shows a system configuration view showing a steering device according to a first embodiment of the present invention.

As shown in FIG. 1, the steering device includes a steering device main body 1; a first pump P1; a second pump P2; a reservoir tank T; a first electric motor M1; a second electric motor M2; and a controller 2 which is a control device (CPU). That is, this steering device is configured to amplify a steering force inputted from a steering wheel (not shown) or a first electric motor M1 to the steering device main body 1, by the hydraulic pressure of the hydraulic fluid pressurized and transmitted by the first pump P1 or the second pump P2, and to transmit the amplified steering force to steered wheels (not shown).

The steering device main body 1 is an integral type power steering device. The steering device main body 1 is configured to receive the steering force through the steering wheel (not shown) in accordance with the steering operation of the driver in a manual operation state, that is, in a drive state in which the steering operation is performed by the driver. On the other hand, the steering device main body 1 is configured to receive the steering force through the first electric motor M1 controlled and driven by the controller 2, in an automatic steering state, that is, in a drive state in which the steering operation is performed based on a command signal from the vehicle side that is transmitted through the controller 2. The steering device main body 1 includes a power cylinder (not shown). In the steering device main body 1, the steering force is amplified based on the hydraulic pressure of the hydraulic fluid pressurized by and transmitted from the first pump P1 or the second pump P2 to the power cylinder.

The first pump P1 is a main pump configured to be driven by the engine E of the vehicle. That is, the hydraulic fluid is normally supplied through the first pump P1 to the steering device main body 1. The second pump P2 is a sub pump configured to be driven by the second electric motor M2. That is, the hydraulic fluid is supplied to the steering device main body 1 through the second pump P2 controlled and driven by the second electric motor M2, in a state in which the engine E is stopped in an idling stop and so on, or in a state where the hydraulic pressure of the hydraulic fluid in a first hydraulic passage L1 is decreased due to the malfunction of the first pump P1.

The reservoir tank T is partitioned into a first storage portion T1 and a second storage portion T2 by a partition wall TW extending from a bottom wall toward a vertical direction. The first storage portion T1 is connected to the steering device main body 1 through the first hydraulic passage L1 constituted by a first supply passage F1 and a first recirculation passage R1. The first storage portion T1 is configured to mainly store the hydraulic fluid sucked by and discharged from the first pump P1. The second storage portion T2 is connected to the steering device main body 1 through the second hydraulic passage L2 constituted by a second supply passage F2 and a second recirculation passage R2. The second storage portion T2 is configured to mainly store the hydraulic fluid sucked by and discharged from the second pump P2. Then, when the fluid level of the hydraulic fluid within the reservoir tank T is higher than a height of the partition wall TW, the first and second storage portions T1 and T2 both store the hydraulic fluid. On the other hand, when the fluid level of the hydraulic fluid within the reservoir tank T is lower than the height of the partition wall TW, the first and second storage portions T1 and T2 independently store the hydraulic fluid. Besides, the height of the fluid level of the hydraulic fluid within the reservoir tank T is sensed by a fluid amount sensor FS disposed on a circumferential wall of the reservoir tank T at a height position having a height identical to the height of the partition wall TW.

The first electric motor M1 is mounted to the steering device main body 1. The first electric motor M1 is integrally provided with the steering device main body 1. The first electric motor M1 is connected to a steering shaft 31 (cf. FIG. 2) described later in the steering device main body 1. The first electric motor M1 is configured to provide the steering force to the steering shaft 31 based on the command current from the controller 2. Besides, the first electric motor M1 is configured to provide the steering force to the steering shaft 31 based on the command signal from the vehicle side in the automatic operation state. Alternatively, in a case where it is not possible to obtain the sufficient steering force only by the operation of the second pump P2 in the manual operation state or in the automatic operation state, the first electric motor M1 is configured to provide the deficient steering force to the steering shaft 31. The second electric motor M2 is integrally provided with the second pump P2. Alternatively, the second electric motor M2 is provided as a member different from the second pump P2. The second electric motor M2 is connected to a pump rotation shaft (not shown) of the second pump P2. That is, the second electric motor M2 is configured to provide the rotation force to the pump rotation shaft based on the control current from the controller 2, and thereby to drive the second pump P2.

The controller 2 is an electronic control unit (ECU) including electronic components such as a microcomputer. The controller 2 is configured to receive an IGN signal which is an ignition ON signal, and CAN signals which are various vehicle information signals, from the vehicle side. The IGN signal is the ignition ON signal transmitted when an ignition switch of the vehicle is brought to the ON state. The controller 2 is brought to the energized state when the controller 2 receives this IGN signal. The CAN signals are various vehicle information signals relating to the driving state of the vehicle, such as a vehicle speed signal relating to a traveling speed of the vehicle, and a steered angle command signal and an actual steered angle signal in the automatic drive state.

Moreover, the controller 2 is configured to receive a steering angle signal θs which is the rotation angle of the steering shaft 31 (not shown), from a first resolver 77 (cf. FIG. 2) described later, and provided to the steering device main body 1. Furthermore, the controller 2 is configured to receive a first motor rotation angle signal θm1 which is the rotation angle of the first electric motor M1, from a second resolver 78 (cf. FIG. 2) described later, and provided to the steering device main body 1. Similarly, the controller 2 is configured to receive a second motor rotation angle signal θm2 which is the rotation angle of the second electric motor M2, from a rotation angle sensor (not shown) provided to the second electric motor M2. Moreover, the controller 2 is configured to receive a fluid level signal OL indicative of the height of the fluid level of the hydraulic fluid stored in the reservoir tank T, from the fluid amount sensor FS. Furthermore, the controller 2 is configured to receive a first sensing switch signal OP1 from a first sensing switch 81 which is a pressure switch provided to the first fluid pressure passage L1 (the first supply passage F1). The controller 2 is configured to perform various control operations such as the drive control of the first and second electric motors M1 and M2 by outputting the drive control signals Tm1 and Tm2 to the first and second electric motors M1 and M2.

Figure 2:
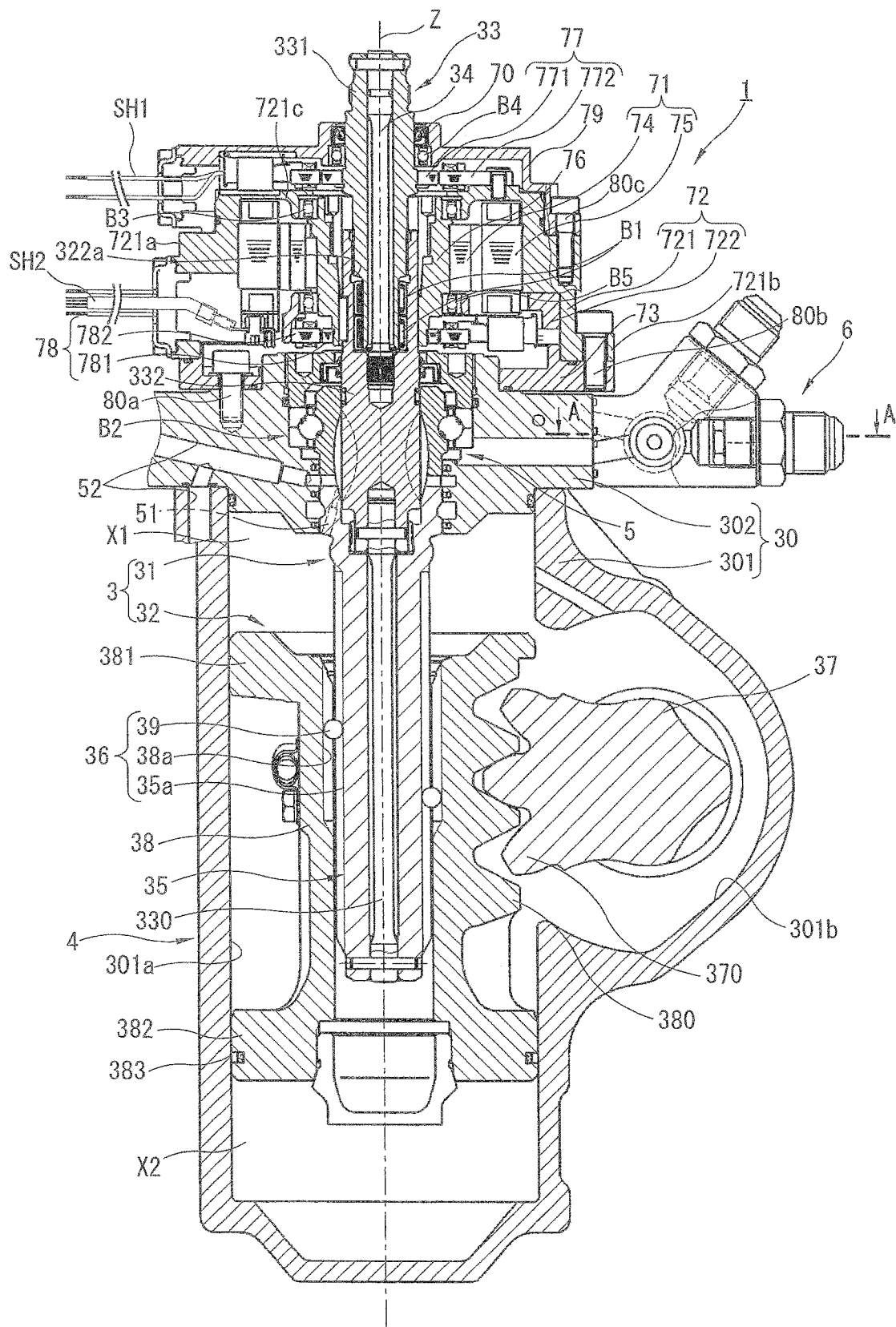
FIG. 2 is a longitudinal sectional view showing the steering device according to the first embodiment of the present invention.

FIG. 2 is a longitudinal sectional view showing the specific configuration of the steering device main body 1. Besides, in the explanations of this drawing, an "axial direction" is defined as a direction parallel to the rotation axis Z of the steering shaft 31. A "radial direction" is defined as a direction perpendicular to the rotation axis Z of the steering shaft 31. A "circumferential direction" is defined as a direction around the rotation axis Z of the steering shaft 31. Moreover, in the "axial direction", a "first side" is defined by an upper side of the drawing which is linked with the steering wheel (not shown). A "second side" is defined by a lower side of the drawing.

As shown in FIG. 2, the steering device main body 1 includes a steering mechanism 3 configured to transmit the rotation of the steering shaft 31 to the steered wheels (not shown); the power cylinder 4 configured to produce the steering assist force by the hydraulic pressure of the hydraulic fluid; and a rotary valve 5 configured to selectively supply the hydraulic fluid to first and second fluid chambers X1 and X2 (described later) of the power cylinder 4. That is, the steering device main body 1 is configured to selectively supply the hydraulic fluid through the rotary valve 5 to the first and second fluid chambers X1 and X2 of the power cylinder 4 in accordance with the steering force inputted to the steering mechanism 3, and thereby to provide the steering assist force for assisting the steering force to vary the directions of the steered wheels (not shown).

The steering mechanism 3 includes the steering shaft 31 including a first axial end side which extends to the outside of the housing 30, and which is connected to the steering wheel (not shown), and a second axial end side received within the housing 30; and a transmission mechanism 32 connected to the second end side of the steering shaft 31, and configured to transmit the rotation of the steering shaft 31 to the steered wheels (not shown).

The steering shaft 31 includes an input shaft 33 (corresponding to a first shaft in the present invention) including a first end side connected to the steering wheel (not shown) to rotate as a unit with the steering wheel; and an output shaft 35 (corresponding to a second shaft in the present invention) having a first end side connected through a first torsion bar 34 (corresponding to a torsion bar in the present invention) to the second end side of the input shaft 33 to be rotated relative to the input shaft 33.

The input shaft 33 includes a first input shaft 331 which is on the first axial end side, and which is connected to the steering wheel (not shown); a second input shaft 332 which is on the second axial end side, and which is connected through a second torsion bar 330 to the first input shaft 331 to be rotated relative to the first input shaft 331.

The first input shaft 331 has a hollow shape. The first input shaft 331 receives the most portion of the second torsion bar 330. Moreover, the first input shaft 331 includes a second end portion having a diameter smaller than a diameter of a first end portion on the steering wheel side. The second end portion of the first input shaft 331 is received within an opening recessed portion 332a formed in the first end portion of the second input shaft 332 on the steering wheel side. Furthermore, two needle bearings B1 and B1 are provided between an outer circumference surface of the second end portion of the first input shaft 331, and an inner circumference surface of the opening recessed portion 332a of the second input shaft 332. That is, the first input shaft 331 is rotatably supported by the second input shaft 332 through the needle bearings B1 and B1.

The output shaft 35 has a hollow shape. The output shaft 35 receives the most portion of the first torsion bar 34. Moreover, the output shaft 35 includes a first end portion which is on the input shaft 33 side, and which has a diameter greater than a diameter of a second end portion of the output shaft 35. The second end portion of the second input shaft 332 is received within the first end portion of the output shaft 35.

The first torsion bar 34 is configured to vary a fluid passage and a sectional area of the fluid passage of the rotary valve 5 in accordance with a torsion direction and a torsion angle of the first torsion bar 34. On the other hand, the second torsion bar 330 is a torsion bar for a torque sensor (not shown). The torque sensor is configured to sense the steering torque in accordance with the torsion amount of the second torsion bar 330.

The transmission mechanism 32 includes a ball screw mechanism 36 configured to convert the steering force (the rotation force) inputted to the output shaft 35, to an axial movement force in the rotation axis Z direction of the steering shaft 31; and a sector shaft 37 configured to be pivoted based on the axial movement force converted by the ball screw mechanism 36. That is, the transmission mechanism 32 is configured to convert the steering force inputted to the steering shaft 31, to the axial movement force in the rotation axis Z direction through the ball screw mechanism 36, and to transmit the axial movement force to the steered wheels through a sector gear constituted by engagement of teeth portions 370 and 380 described later.

The ball screw mechanism 36 includes the output shaft 35 that is a screw shaft having an outer circumference on which a shaft side ball groove 35a having a spiral groove shape is formed; a piston 38 that is disposed radially outside the output shaft 35, and that is a ball nut having an inner circumference on which a nut side ball groove 38a having a spiral groove shape is formed; and a plurality of balls 39 received within the ball grooves 35a and 38a. Moreover, the piton 38 includes the teeth portion 380 which is formed in a region confronting the sector shaft 37, and which constitutes a part of the sector gear.

The sector shaft 37 is disposed substantially perpendicular to the rotation axis Z of the steering shaft 31. The sector shaft 37 includes a first end portion and a second end portion in the axial direction of the sector shaft 37. The sector shaft 37 includes a teeth portion 370 which is formed on an outer circumference of the first end portion, and which is configured to be engaged with the teeth portion 380 of the piston 38. On the other hand, the second end portion of the sector shaft 37 is connected to a pitman arm (not shown) constituting a part of the transmission mechanism 32. This pitman arm is configured to be pulled in a widthwise direction of the vehicle body in accordance with the pivot movement of the sector shaft 37 so that the directions of the steered wheels (not shown) are varied.

The housing 30 includes a first axial end opening which is on the steering wheel (not shown) side. The housing 30 includes a first housing 301 within which the power cylinder 4 is constituted; and a second housing 302 which closes the first end side opening of the first housing 301, and within which the rotary valve 5 is constituted. Besides, the first housing 301 and the second housing 302 are tightened by a plurality of bolts (not shown) disposed at predetermined positions in a circumferential direction of the rotation axis Z of the steering shaft 31.

The first housing 301 includes a cylinder portion 301a receiving the piston 38 for constituting the power cylinder 4; and a shaft receiving portion 301b receiving the sector shaft 37. The cylinder portion 301a has a cylindrical shape formed in the rotation axis Z direction of the steering shaft 31. The cylinder portion 301a slidably receives the piston 38 so as to constitute the power cylinder 4. The shaft receiving portion 301b is substantially perpendicular to the cylinder portion 301a. A part of the shaft receiving portion 301b confronts the cylinder portion 301a. The sector shaft 37 is pivotally received within the shaft receiving portion 301b.

The second housing 302 is mounted to the first end side opening portion of the first housing 301 to close the first end side opening portion of the first housing 301. The second housing 302 receives a connection portion between the input shaft 33 and the output shaft 35 in which the input shaft 33 and the output shaft 35 are overlapped in the axial direction. Besides, in this case, the connection portion between the input shaft 33 and the output shaft 35 is rotatably supported through a second bearing B2 provided within the second housing 302. Moreover, a switching valve 6 is received within a side portion of the second housing 302. The switching valve 6 is configured to switch a connection between the rotary valve 5, and the first and second pumps P1 and P2.

The power cylinder 4 is constituted by the cylinder portion 301a of the first housing 301 which constitutes the power cylinder main body portion, and the piston 38 received within the cylinder portion 301a. The piston 38 has a bobbin shape. The piston 38 includes a first end portion 381 which is closer to the steering wheel (not shown) in the rotation axis Z direction; and a second end portion 382 which is farther from the steering wheel in the rotation axis Z direction. The first end portion 381 and the second end portion 382 have, respectively, diameters by which the first end portion 381 and the second end portion 382 are slidably abutted on the inner circumference surface of the cylinder portion 301a. An annular seal member 383 is mounted on an outer circumference of the second end portion 382 of the piston 38. This seal member 383 separates an inside space of the cylinder portion 301a into the first fluid chamber X1 which is positioned on the steering wheel side of the seal member 383, and the second fluid chamber X2 which is positioned on a side apart from the steering wheel. That is, the hydraulic fluid is selectively supplied to the first fluid chamber X1 or the second fluid chamber X2 of the power cylinder 4 so as to generate the pressure difference between the first and second fluid chambers X1 and X2, so that the steering assist force is provided to the piston 38. Besides, in this case, the hydraulic fluid of the first fluid chamber X1 is introduced into the shaft receiving portion 301b. The portions between the teeth portions 370 and 380 are lubricated by the supply of the hydraulic fluid to the first fluid chamber X1.

The rotary valve 5 is configured to be opened in accordance with the torsion amount of the first torsion bar 34 based on the relative rotation between the second input shaft 332 and the output shaft 35, and to supply and discharge the hydraulic fluid to and from the first and second fluid chambers X1 and X2 of the power cylinder 4. In particular, when the steering wheel (not shown) is steered in one direction, the rotary valve 5 is configured to supply the hydraulic fluid to the first fluid chamber X1 through a first connection passage 51 provided within the output shaft 35, and to discharge the hydraulic fluid from the second fluid chamber X2 through a second connection passage 52 provided in the first and second housings 301 and 302. On the other hand, when the steering wheel is steered in the other direction, the rotary valve 5 is configured to supply the hydraulic fluid through the second connection passage 52 to the second fluid chamber X2, and to discharge the hydraulic fluid from the first fluid chamber X1 through the first connection passage 51.

The first electric motor M1 is a hollow motor provided to surround the input shaft 33, that is, a three phase alternating current brushless motor. The first electric motor M1 includes a motor element 71 configured to produce the steering assist force; a motor housing 72 receiving the motor element 71. That is, in the first electric motor M1, the motor element 71 is connected to the input shaft 33. Moreover, the motor housing 72 is fixed to the housing 30 (the second housing 302) through an adapter member 73 by a plurality of bolts 80a.

The motor element 71 includes a cylindrical motor rotor 74 fixed to rotate as a unit with the input shaft 33; and a motor stator 75 which is a cylindrical stator coil provided radially outside the motor rotor 74 with a predetermined clearance. The motor rotor 74 is connected through a connection member 76 to the second input shaft 332. The motor stator 75 is fixed on the inner circumference side of the motor housing 72 by the press fit, the shrinkage fit, and so on.

The motor housing 72 includes a first motor housing constituting portion 721 which has a bottomed cylindrical shape, which is opened on the motor housing 30 side, and which receives the motor element 71; and a second motor housing constituting portion 722 which has a circular plate shape, and which closes the opening portion of the first motor housing constituting portion 721. Each of the first and second motor housing constituting portions 721 and 722 is made from predetermined metal material such as aluminum alloy material.

The first motor housing constituting portion 721 includes a cylindrical portion 721a having an inside diameter substantially identical to an outside diameter of the motor stator 75. The motor stator 75 is fixed on the inner circumference side of the cylindrical portion 721a of the first motor housing constituting portion 721 by the press fit, the shrinkage fit, and so on. Moreover, the first motor housing constituting portion 721 includes a flange portion 721b positioned radially outside the opening portion. This flange portion 721b is tightened to the circular-plate-shaped adapter member 73 by a plurality of bolts 80b. Furthermore, the adapter member 73 is tightened to the housing 30 (the second housing 302) by the plurality of the bolts 80a. In this way, the first motor housing constituting portion 721 is fixed through the adapter member 73 to the second housing 302.

Moreover, the first motor housing constituting portion 721 includes a cover portion 721c including a through hole through which the steering shaft 31 (the connection member 76) penetrates. In this through hole, a third bearing B3 which is a ball bearing is provided between the through hole and the connection member 76.

Furthermore, the first resolver 77 is provided on the steering wheel (not shown) side of the cover portion 721c. The first resolver 77 includes an annular resolver rotor 771 fixed to the outer circumference of the first input shaft 331 to rotate as a unit with the first input shaft 331; and an annular resolver stator 772 provided radially outside the resolver rotor 771 with a predetermined clearance. The first resolver 77 is configured to sense a rotation position of the resolver rotor 71 by the resolver stator 772, and thereby to sense the rotation angle of the first input shaft 331, that is, the steering angle of the steering wheel. This sensed steering angle of the steering wheel is transmitted as the steering angle signal θs through a first sensor harness SH1 to the controller 2 (cf. FIG. 1).

Moreover, the first resolver 77 is covered by a cover member 79 having a bottomed cylindrical shape. This cover member 79 is tightened to the first motor housing constituting portion 721 by a plurality of bolts 80c. The cover member 79 includes a through hole which is formed at a central position of the cover member 79, and through which the first input shaft 331 penetrates. In this through hole, a fourth bearing B4 and a seal member 70 are provided between the through hole and the first input shaft 331. The fourth bearing B4 is a ball bearing rotatably supporting the first input shaft 331. The seal member 70 liquid-tightly seals between the through hole and the first input shaft 331.

The second motor housing constituting section 722 includes a through hole which is formed at a central position of the second motor housing constituting section 722, and through which the steering shaft 31 (the connection member 76) penetrates. In this through hole, a fifth bearing B5 is provided between the through hole and the connection member 76. The fifth bearing B5 is a ball bearing rotatably supporting the connection member 76.

A second resolver 78 is provided to the second motor housing constituting portion 722 on the housing 30 side. The second resolver 78 includes an annular resolver 781 fixed through the connection member 76 to the outer circumference of the second input shaft 332 to rotate as a unit with the second input shaft 332; and an annular resolver stator 782 provided radially outside the resolver rotor 781 with a predetermined clearance. The second resolver 78 is configured to sense the rotation position of the resolver rotor 781 by the resolver stator 782, and thereby to sense the rotation angle of the second input shaft 332. Besides, this rotation angle of the second input shaft 332 is identical to the rotation angle of the motor rotor 74 of the first electric motor M1. The second resolver 78 functions also as a motor rotation angle sensor configured to sense the motor rotation angle which is the rotation angle of the motor rotor 74. This sensed motor rotation angle (the rotation angle of the second input shaft 332) is transmitted as a first motor rotation angle signal θm1 through a second sensor harness SH2 to the controller 2 (cf. FIG. 1).

Figure 3:
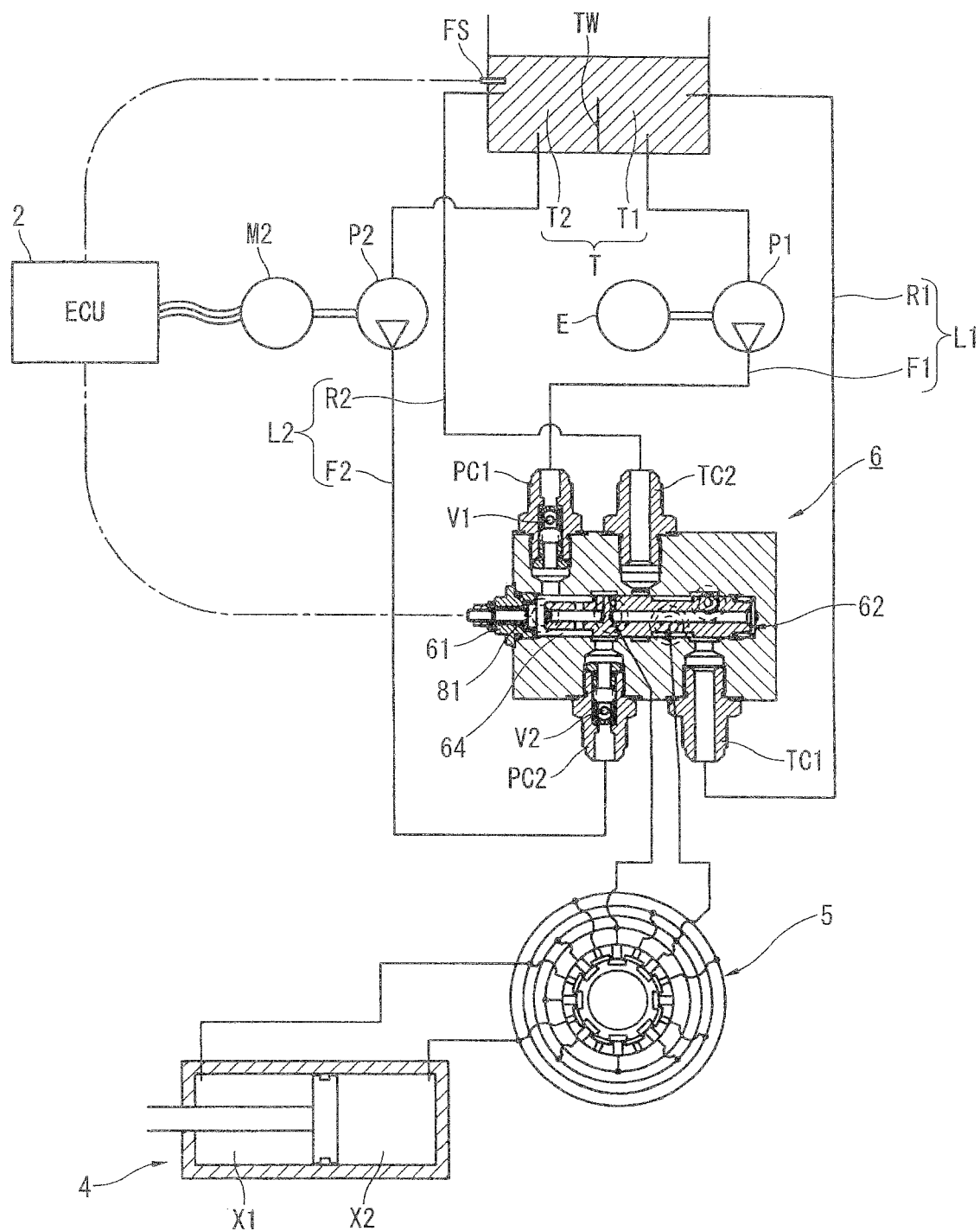
FIG. 3 is a hydraulic circuit view showing the steering device shown in FIG. 2.
Figure 4A:
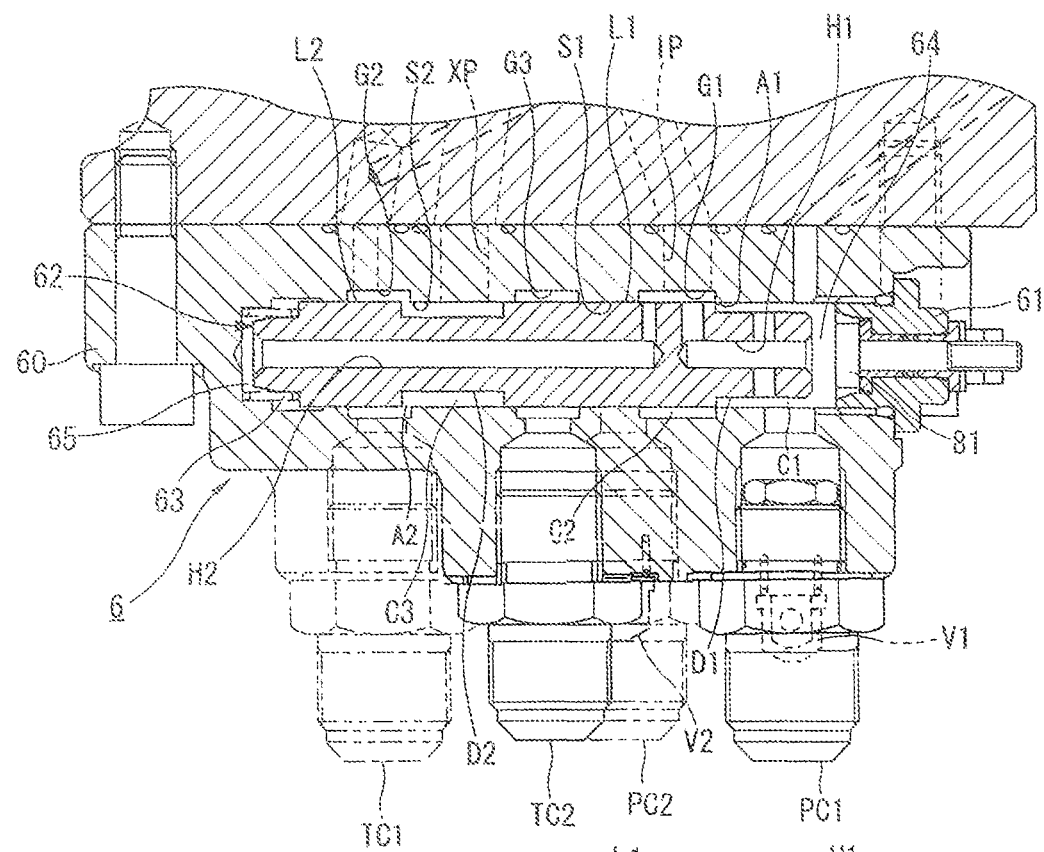
FIG. 4(a) is a view showing a state where a hydraulic pressure of a hydraulic fluid of a first hydraulic passage is normal.
Figure 4B:
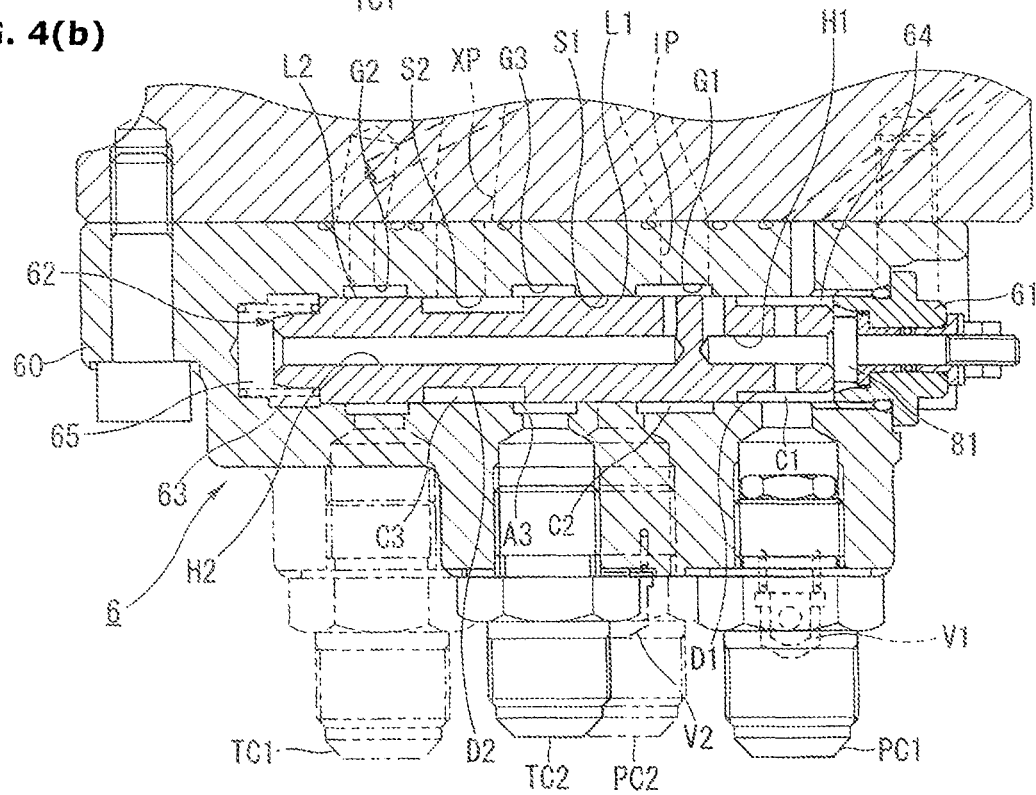
FIG. 4(b) is a view showing a state where the hydraulic pressure of the hydraulic fluid of the first hydraulic passage is deficient.

FIG. 3 is a hydraulic circuit diagram showing the steering device shown in FIG. 2. FIG. 4 are sectional views taken along a section line A-A line of FIG. 2. FIG. 4(a) is a view showing a state where the hydraulic pressure of the hydraulic fluid of the first hydraulic passage L1 is normal. FIG. 4(b) is a view showing a state where the hydraulic pressure of the hydraulic fluid of the first hydraulic passage L1 is deficient.

As shown in FIG. 3, a switching valve 6 is provided between the rotary valve 5, and the first and second pumps P1 and P2. The switching valve 6 is a pilot valve configured to switch the first and second recirculation passages R1 and R2 of the first and second hydraulic passages L1 and L2 which correspond to the return passages for the hydraulic fluid. That is, in this embodiment, the switching valve 6 is not configured to switch the first and second pumps P1 and P2 connected to the rotary valve 5. The switching valve 6 is configured to switch only the first and second recirculation passages R1 and R2 configured to recirculate the hydraulic fluid to the reservoir tank T (the first and second storage portions T1 and T2). That is, in this embodiment, the rotary valve 5 is not selectively connected to the first and second pumps P1 and P2. The rotary valve 5 is configured to be simultaneously connected to the first and second pumps P1 and P2. With this, it is possible to simultaneously use the first and second pumps P1 and P2.

In particular, as shown in FIGS. 4(a) and 4(b), the switching valve 6 includes a valve housing 60 having an axial first end side opening; a plug 61 closing the first end side opening of the valve housing 60; a valve element 62 configured to be moved within the valve housing 60; and a spring 63 which is an urging member disposed on the second end side of the valve housing 60. That is, the switching valve 6 is configured to be switched by using, as the pilot pressure, the hydraulic pressure of the hydraulic fluid supplied from the first and second pumps P1 and P2. When the valve element 62 is positioned at a first position shown in FIG. 4(a), the switching valve 6 is configured to supply the hydraulic fluid discharged from the first pump P1 to the rotary valve 5. On the other hand, when the valve element 62 is positioned at a second position shown in FIG. 4(b), the switching valve 6 is configured to supply the hydraulic fluid discharged from the second pump P2 to the rotary valve 5.

The valve housing 60 has a bottomed cylindrical shape opened on the first end side in the longitudinal direction, and closed on the second end side in the longitudinal direction. The valve housing 60 is mounted to the second housing 302 on the lateral side (the outer circumference side) of the rotary valve 5. The valve housing 60 includes a valve element receiving hole 64 movably receiving the valve element 62. The valve housing 60 has a first pump connection port PC1, a second pump connection port PC2, a supply port IP, a discharge port XP, a first tank connection port TC1, and a second tank connection port TC2 on a circumferential wall of the valve housing 60.

As shown in FIG. 3 and FIGS. 4(a) and 4(b), the first pump connection port PC1 is connected through the first supply passage F1 to the first pump P1. The first pump connection port PC1 is configured to introduce the hydraulic fluid discharged from the first pump P1 to the valve element receiving hole 64. Similarly, the second pump connection port PC2 is connected through the second supply passage F2 to the second pump P2. The second pump connection port PC2 is configured to introduce the hydraulic fluid discharged from the second pump P2 to the valve element receiving hole 64. Moreover, first and second check valves V1 and V2 are provided, respectively, in the first and second pump connection ports PC1 and PC2. The first and second check valves V1 and V2 are configured to prevent the backflow of the hydraulic fluid introduced from the first and second pumps P1 and P2 to the valve element receiving hole 64.

The supply port IP connects the valve receiving hole 64 and the rotary valve 5. The supply port IP is configured to supply the hydraulic fluid introduced through one or both of the first and second pumps P1 and P2 to the valve element receiving hole 64, to the rotary valve 5. Similarly, the discharge port XP connects the valve receiving hole 64 and the rotary valve 5. The supply port IP is configured to recirculate the hydraulic fluid discharged from the power cylinder 4 through the rotary valve 5, to the valve receiving hole 64.

The first tank connection port TC1 is connected through the first recirculation passage R1 to the reservoir tank T (the first storage portion T1). The first tank connection port TC1 is configured to recirculate the hydraulic fluid discharged from the power cylinder 4 to the valve receiving element receiving hole 64, to the first storage portion T1 of the reservoir tank T. Similarly, the second tank connection port TC2 is connected through the second recirculation passage R2 to the reservoir tank T (the second storage portion T2). The second tank connection port TC2 is configured to recirculate the hydraulic fluid discharged from the power cylinder 4 to the valve receiving element receiving hole 64, to the second storage portion T2 of the reservoir tank T.

In particular, when the first hydraulic passage L1 is in the normal state as shown in FIG. 4(a), that is, when the hydraulic pressure of the hydraulic fluid of the first hydraulic passage L1 is equal to or greater than a first predetermined value Px1, the valve element 62 is moved in the leftward direction of FIG. 4(a) (hereinafter, referred to as "first position") against the urging force of the spring 63 by the hydraulic pressure supplied from the first pump P1. At this first position, the first pump connection port PC1 and the supply port IP are connected with each other through a first annular passage C1 defined between a first small diameter portion D1 of the valve element 62 and the valve element receiving hole 64, a minute clearance A1 formed between a first land portion L1 of the valve element 62 and a first seal portion S1 of the valve element receiving hole 64 or a first inside passage H1 of the valve element 62, and a first annular groove G1. With this, the hydraulic fluid discharged from the first pump P1 is introduced to the supply port IP. Besides, a second inside passage H2 formed within the valve element 62 connects the first annular groove G1 and a back pressure chamber 65 receiving the spring 63, so as to absorb the volume variation of the back pressure chamber 65 according to the movement of the valve element 62. Moreover, the minute clearance A1 functions as an orifice. The pressure difference is generated between the hydraulic pressure of the first annular passage C1 and the hydraulic pressure of the first annular groove G1 which are front and back sides of the orifice. On the other hand, the second pump connection port PC2 is constantly connected to the supply port IP through a second annular groove C2 defined between the first land portion L1 and the first annular groove G1. With this, the hydraulic pressure discharged from the second pump P2 is introduced to the supply port IP.

Furthermore, at the first position, the discharge port XP and the first tank connection port TC1 are connected with each other through a third annular passage C3 defined between a second small diameter portion D2 of the valve element 62 and a second seal portion S2 of the valve receiving hole 64, a clearance A2 formed between the second land portion L2 and the second seal portion S2, and a second annular groove G2 formed radially outside the second land portion L2. On the other hand, the first land portion L1 is overlapped with the end portion on the third annular groove G3 side, so that the discharge port XP and the second tank port TC2 are disconnected from each other. With this, the hydraulic fluid discharged from the rotary valve 5 is recirculated through the first tank connection port TC1 to the first storage portion T1 of the reservoir tank T.

On the other hand, as shown in FIG. 4(b), when the hydraulic pressure of the hydraulic fluid of the first hydraulic passage L1 is decreased due to the stop state of the engine, the malfunction of the first pump P1, or so on, that is, when the hydraulic pressure of the hydraulic fluid is smaller than a first predetermined value Px1, the valve element 62 is moved in the rightward direction of FIG. 4(b) (hereinafter, referred to as "second position") by the urging force of the spring 63. At this second position, the first land portion L1 is overlapped with the end portion of the first seal portion S1 on the first annular groove G1 side, so that the first pump connection port PC1 and the supply port IP are disconnected from each other. On the other hand, the connection state between the second pump connection port PC2 and the supply port IP are maintained through the second annular passage C2. With this, the only second pump connection port PC2 is connected to the supply port IP.

Moreover, at the second position, the second land portion L2 is overlapped with the end portion of the second seal portion S2 on the second annular groove G2 side, so that the first tank connection port TC1 and the discharge port XP are disconnected from each other. On the other hand, the discharge port XP and the second tank connection port TC2 are connected with each other through the third annular passage C3, a minute clearance A3 formed between the first land portion L1 and the second seal portion S2, and the third annular groove G3. With this, the hydraulic fluid discharged from the rotary valve 5 is recirculated through the second tank connection port TC2 to the second storage portion T2 of the reservoir tank T.

Moreover, a first sensing switch 81 is provided on radially inside the plug 61. The first sensing switch 81 is a cylindrical pressure switch configured to sense the abutment state with the valve element 62. That is, when the valve element 62 is apart from the first sensing switch 81 as shown in FIG. 4(a), the electric signal is not inputted (energized) to the controller 2. The controller 2 recognizes that the valve element 62 is positioned at the first position. On the other hand, when the valve element 62 is abutted on the first sensing switch 81 as shown in FIG. 4(b), the electric signal is inputted (energized) to the controller 2. The controller 2 recognizes that the valve element 62 is positioned at the second position.

Figure 5:
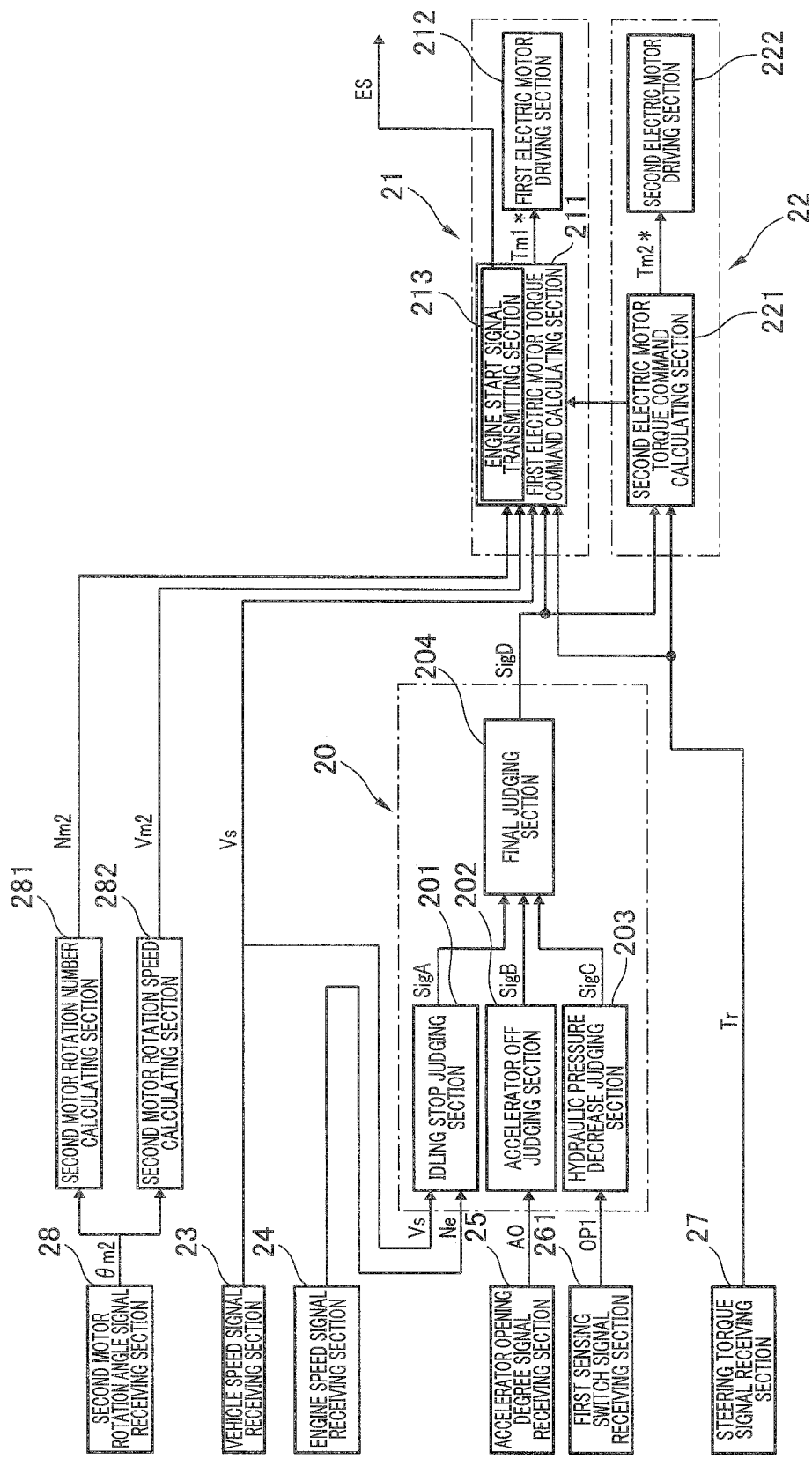
FIG. 5 is a control block diagram showing a configuration of a calculation circuit of a controller (ECU) according to the first embodiment of the present invention.
Figure 6:
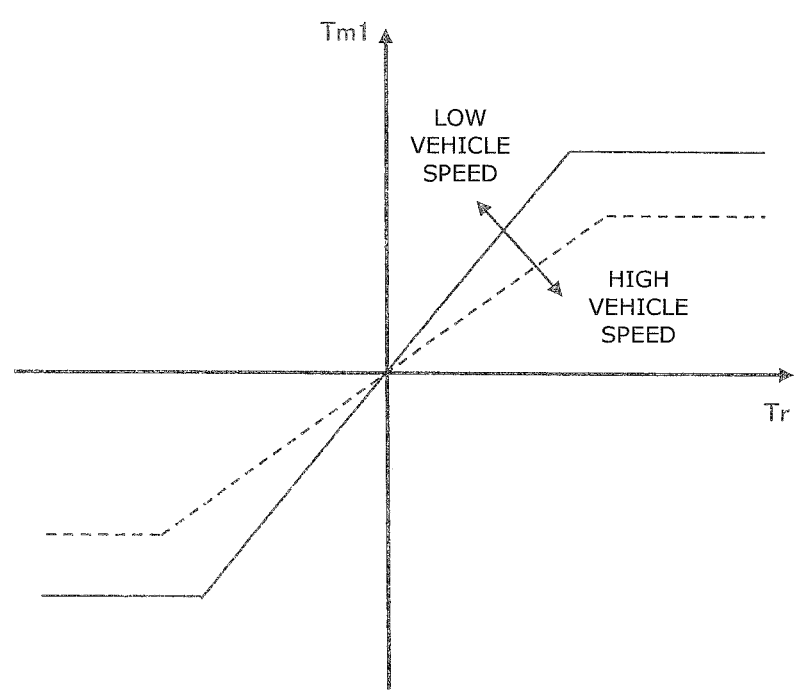
FIG. 6 is a graph showing a relationship between a vehicle speed and a first electric motor torque command in a first electric motor torque command calculating section shown in FIG. 5.

FIG. 5 is a control block diagram showing a calculation circuit of the controller 2. FIG. 6 is a graph showing a relationship between a vehicle speed Vs and a first electric motor torque command Tm1* in a first electric motor torque command calculating section 211. Besides, in FIG. 6, a solid line of the drawing shows the first electric motor torque command Tm1* with respect to the steering torque Tr in a state where the vehicle speed Vs is relatively low. A broken line of the drawing shows the first electric motor torque command Tm1* with respect to the steering torque Tr in a state where the vehicle speed Vs is relatively high.

As shown in FIG. 5, the controller 2 includes a microcomputer including a first hydraulic passage state judging section 20 configured to judge a state of the hydraulic fluid in the first hydraulic passage L1 (cf. FIG. 1); a first electric motor control section 21 configured to control and drive the first electric motor M1; and a second electric motor control section 22 configured to control and drive the second electric motor M2. Moreover, the microcomputer of the controller 2 includes, as interfaces, various signal receiving portions such as a vehicle speed signal receiving section 23, an engine speed signal receiving section 24, an accelerator opening degree signal receiving section 25, a first sensing switch signal receiving section 261, a steering torque signal receiving section 27, and a second motor rotation angle signal receiving section 28.

The first hydraulic passage state judging section includes an idling stop judging section 201; an accelerator off judging section 202; a hydraulic pressure decrease judging section 203; and a final judging section 204 configured to judge whether or not the first hydraulic passage L1 is malfunctioned based on the judgment results from these judging sections 201, 202, and 203.

The idling stop judging section 201 is configured to judge whether or not the vehicle is in the idling stop control period based on the vehicle speed signal Vs inputted through the vehicle speed signal receiving section 23, or the engine speed signal Ne inputted through the engine speed signal receiving section 24. Besides, the vehicle speed signal Vs and the engine speed signal Ne are obtained by CAN (Controller Area Network) communication, and so on.

In particular, the idling stop judging section 201 is configured to judge that the engine E (cf. FIG. 1) is in the idling stop control period when the vehicle speed signal Vs or the engine speed signal Ne is lower than a predetermined value. Specifically, the idling stop judging section 201 is configured to output an idling stop judging signal SigA to the final judging section 204.

The accelerator off judging section 202 is configured to judge that the accelerator pedal operation of the vehicle is in the OFF state when the accelerator opening degree signal AO inputted through the accelerator opening degree signal receiving section 25 is zero. Specifically, the accelerator off judging section 202 is configured to output an accelerator off judging signal SigB to the final judging section 204. Besides, the accelerator opening degree signal AO is obtained by the CAN communication, and so on, similarly to the vehicle speed signal Vs and the engine speed signal Ne.

The hydraulic pressure decrease judging section 203 is configured to judge the decrease of the hydraulic pressure of the hydraulic fluid of the first hydraulic passage L1 when the first sensing switch signal OP1 of the first sensing switch 81 received through the first sensing switch signal receiving section 261 is brought to the ON state (when "OP1"=1) is inputted by the movement of the valve element 62 of the switching valve 6 to the second position (cf. FIG. 4(*b*)), that is, when the hydraulic pressure of the hydraulic fluid of the first hydraulic passage L1 is smaller than the first predetermined value Px1. Specifically, the hydraulic pressure decrease judging section 203 is configured to output a hydraulic pressure decrease judging signal SigC to the final judging section 204.

The final judging section 204 is configured to judge that the first hydraulic passage L1 is the malfunction state when the idling stop judging signal SigA, the accelerator off judging signal SigB, or the hydraulic pressure decrease judging signal SigC which are outputted from the judging sections 201, 202, and 203 is inputted. Specifically, the final judging section 204 is configured to output a first hydraulic passage malfunction signal SigD indicative of the malfunction state of the first hydraulic passage L1, to the first electric motor control section 21 and the second electric motor control section 22.

The first electric motor control section 21 includes a first electric motor torque command calculating section 211 configured to calculate a first electric motor torque command Tm1* for the driving control of the first electric motor M1; and a first electric motor driving section 212 configured to control and drive the first electric motor M1 based on the first electric motor torque command Tm1*. The first electric motor torque command calculating section 211 is configured to calculate the first electric motor torque command Tm1* relating to the steering input, based on the steering torque signal Tr, for example, in the automatic steering state.

Moreover, the first electric motor control section 21 is configured to control and drive the first electric motor M1 when the steering assist force is deficient only by the hydraulic pressure by the second pump P2 even when the first hydraulic passage malfunction signal SigD is inputted to switch to the hydraulic pressure supply by the second pump P2. That is, the first electric motor torque command calculating section 211 is configured to calculate the first electric motor torque command Tm1* relating to the compensation for the deficient steering assist force when the steering assist force is deficient only by the hydraulic pressure supplied through the second pump P2, for example, in the manual steering state or the automatic steering state.

Besides, even when the steering assist is performed based on the hydraulic pressure supplied by the first and second pumps P1 and P2, for example, in the manual steering state, it is possible to assist the steering assist force by the hydraulic pressure by controlling and driving the first electric motor M1. That is, in the steering device according to this embodiment, it is simultaneously use the steering assist force produced by the hydraulic pressure supplied by the first pump P1 or the second pump P2, and the steering assist force produced by the driving torque of the first electric motor M1 in accordance with the required steering force.

Moreover, the first electric motor control section 21 is configured to control and drive the first electric motor M1 in accordance with the rotation number of the second electric motor M2. That is, the first electric motor control section 21 is configured to control and drive the first electric motor M1 when the second electric motor control section 22 controls and drives the second electric motor M2 to increase the rotation number of the second electric motor M2. Specifically, when the increase of the second motor rotation number Nm2 is sensed, the first electric motor torque command calculating section 211 is configured to calculate the first electric motor torque command Tm1* relating to the compensation for the steering assist force in accordance with this increased second motor rotation number Nm2. In this case, a second motor rotation number calculating section 281 is configured to calculate the second motor rotation number Nm2 based on the second motor rotation angle signal θ2 sensed by the motor rotation angle sensor (not shown) provided to the second electric motor M2.

Moreover, the first electric motor control section 21 is configured to control and drive the first electric motor M1 in accordance with the rotation speed of the second electric motor M2. That is, the first electric motor torque command calculating section 211 is configured to calculate the first electric motor torque command Tm1* relating to the compensation for the steering assist force, in accordance with the second motor rotation speed signal Vm2 inputted from the second motor rotation speed calculating section 282. In this case, a second motor rotation speed calculating section 281 is configured to calculate the second motor rotation speed Vm2 based on the second motor rotation angle signal θ2 sensed by the motor rotation angle sensor (not shown) provided to the second electric motor M2.

Furthermore, the first electric motor control section 21 is configured to control and drive the first electric motor M1 in accordance with the vehicle speed. That is, the first electric motor torque command calculating section 211 is configured to calculate the first electric motor torque command Tm1* in accordance with the vehicle speed signal Vs inputted through the vehicle speed signal receiving section 23. Specifically, the first electric motor torque command calculating section 211 is configured to calculate the first electric motor torque command Tm1* so that the driving torque of the first electric motor M1 becomes smaller as the vehicle speed signal Vs inputted from the vehicle speed signal receiving section 23 becomes greater (cf. FIG. 6).

The second electric motor control section 22 includes a second electric motor torque command calculating section 221 configured to calculate a second electric motor torque command Tm2* for the driving control of the second electric motor M2; and a second electric motor driving section 222 configured to control and drive the second electric motor M2 based on the second electric motor torque command Tm2*. That is, the second electric motor torque command calculating section 221 is configured to calculate the second electric motor torque command Tm2* relating to the produce of the steering assist force by the second pump P2 in place of the first pump P1 when the first hydraulic passage L1 is malfunctioned in the manual steering state or the automatic steering state. With this, in a case where the sufficient hydraulic pressure cannot be supplied to the power cylinder 4 by the first hydraulic passage L1 due to the malfunction of the first pump P1, and so on, the second pump P2 which is the backup device is controlled and driven. With this, it is possible to supply the hydraulic pressure by the second pump P2 to the power cylinder 4, in place of the first pump P1.

Figure 7:
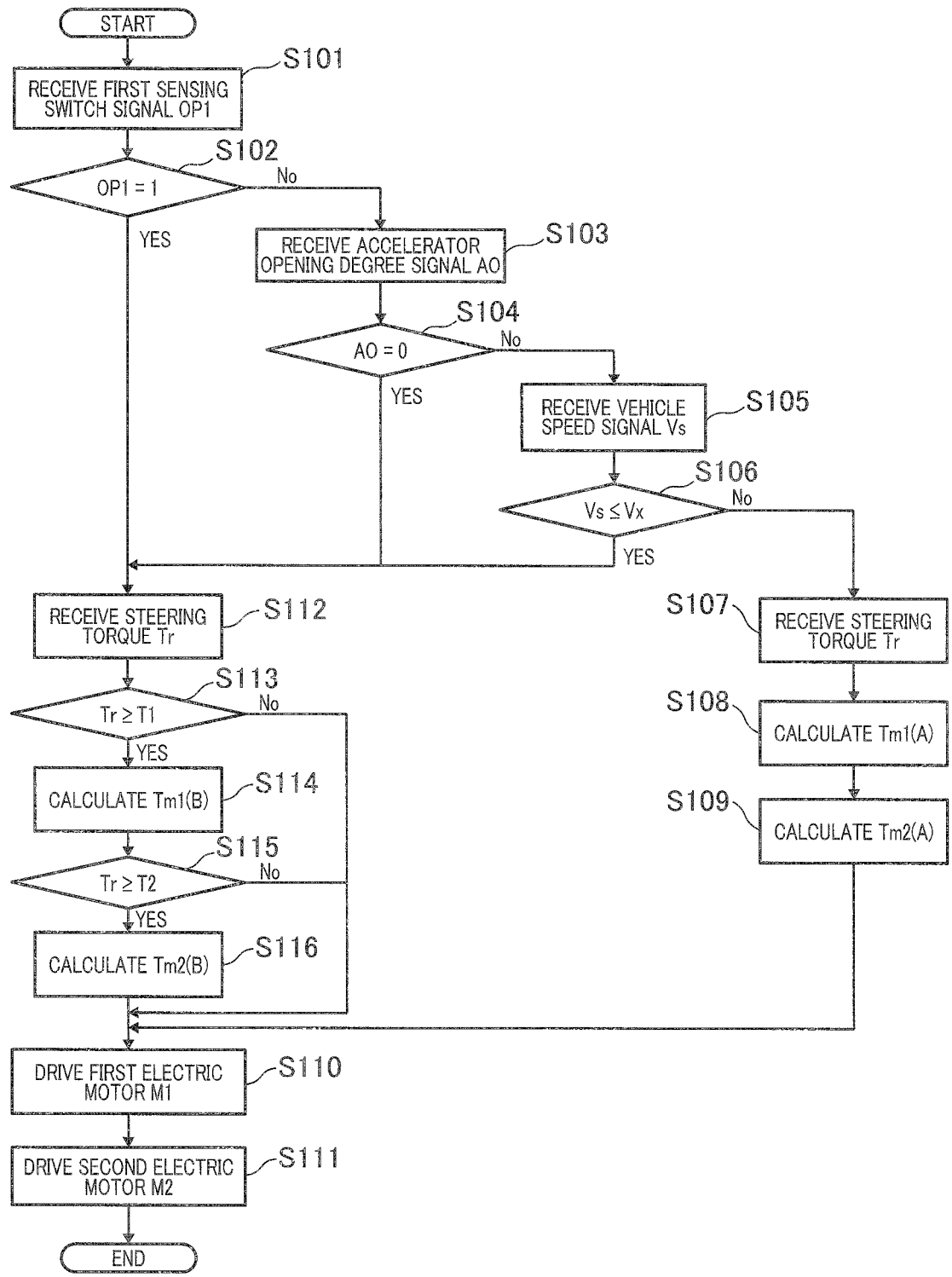
FIG. 7 is a flowchart showing a control flow of a drive control operation of a second pump in the first embodiment of the present invention.

FIG. 7 is a flowchart showing a control flow relating to the drive control of the second pump P2 by the controller 2. Besides, in this drawing, the first electric motor torque command Tm1* and the second electric motor torque command Tm2* which are calculated in a state in which the first pump P1 is driven are represented, respectively, as "first electric motor torque command Tm1*(A)" and "second electric motor torque command Tm2*(A)". The first electric motor torque command Tm1* and the second electric motor torque command Tm2* which are calculated in a state in which the first pump P1 is malfunctioned are represented, respectively, as "first electric motor torque command Tm1* (B)" and "second electric motor torque command Tm2*(B)".

As shown in FIG. 7, firstly, the hydraulic pressure decrease judging section 203 is configured to receive (fetch) the first sensing switch signal OP1 outputted from the first sensing switch 81 (step S101). Then, the hydraulic pressure decrease judging section 203 is configured to judge whether or not the received first sensing switch signal OP1 is "1", that is, whether or not the first sensing switch 81 is in the ON state (step S102). In this case, when the hydraulic pressure decrease judging section 203 judges Yes, the normal hydraulic pressure supply is not performed in the first hydraulic pressure passage L1 (the first supply passage F1) due to the malfunction of the first pump P1. Accordingly, the process proceeds to next step S112.

On the other hand, when the hydraulic pressure decrease judging section 203 judges No at step S102, the accelerator off judging section 202 is configured to receive the accelerator opening degree signal AO (step S103). Then, the accelerator off judging section 202 is configured to judge whether or not the received accelerator opening degree signal AO is "0", that is, whether or not the accelerator (the throttle) is closed (step S104). In this case, when the accelerator off judging section 202 judges Yes, the hydraulic pressure decrease in the first hydraulic pressure passage L1 is due to the stop state of the first pump P1 according to the accelerator off. Accordingly, the process proceeds to next step S112.

On the other hand, when the accelerator off judging section 202 judges No at step 104, the idling stop judging section 201 receives the vehicle speed signal Vs (step S105). The idling stop judging section 201 is configured to judge whether or not the received vehicle speed signal Vs is equal to or smaller than the predetermined vehicle speed Vx (step S106). In this case, when the idling stop judging section 201 judges Yes, the hydraulic pressure decrease in the first hydraulic passage L1 is due to the stop state of the first pump P1 according to the idling stop of the engine E. The process proceeds to step S112. Besides, the idling stop judging section 201 may be configured to receive the engine speed Ne at step S105, and to directly judges whether or not the engine E is in the idling stop state by this engine speed signal Ne at step S106. In this case, when the engine speed Ne received at step S105 is equal to or smaller than the predetermined rotation speed Nx at step S106, it is possible to judge that the first pump P1 is in the stop state according to the idling stop of the engine E.

On the other hand, when the idling stop judging section 201 judges No at step S106, the normal hydraulic pressure supply is performed in the first hydraulic passage L1 (the first supply passage F1). Accordingly, the steering torque signal Tr is read from the torque sensor TS through the steering torque signal receiving section 27 (step S107). Then, the first electric motor torque command Tm*(A) and the second electric motor torque command Tm2*(A) are calculated based on the read steering torque signal Tr (step S108 and S109). Then, the first electric motor M1 and the second electric motor M2 are controlled and driven based on these motor torque commands Tm1*(A) and Tm2*(A) (steps S110 and S111). This program is finished.

When the process proceeds to step S112, as described above, it is conceivable that it is in the abnormal state in which the normal hydraulic pressure supply is not performed to the steering mechanism 3 due to the stop state of the first pump P1, and so on, that is, the malfunction state of the first hydraulic passage L1. Accordingly, firstly, the steering torque signal Tr is read (step S112). It is judged whether or not this read steering torque signal Tr is equal to or greater than the first torque T1 (step S113). In this case, when No is judged, the first electric motor torque command Tm1*(B) and the second electric motor torque command Tm2*(B) are set to "0" without calculating the first and second electric motor torque commands Tm1*(B) and Tm2*(B). The process proceeds to step S110. In this case, the first and second electric motors M1 and M2 are not controlled and driven (steps S110 and S111). This program is finished.

On the other hand, when Yes is judged at step S113, the first electric motor torque command Tm1*(B) is calculated at step S114. Then, at step S115, it is judged whether or not the steering torque signal Tr is equal to or greater than the second torque T2. In this case, when No is judged, the second electric motor torque command Tm2*(B) is set to "0" without calculating the second electric motor torque command Tm2*(B). The process proceeds to step S110. In this case, the only first electric motor M1 is controlled and driven by the first electric motor torque command Tm1*(B) (step S110). The second electric motor M2 is not controlled and driven (step S111). This program is finished.

On the other hand, when Yes is judged at step S115, the second electric motor torque command Tm2*(B) is calculated at step S116. Then, the process proceeds to step S110. In this case, the first electric motor M1 is controlled and driven based on the first electric motor torque command Tm1*(B) (step S110). Moreover, the second electric motor M2 is controlled and driven based on the second electric motor torque command Tm2*(B) (step S111). This program is finished.

As described above, in this embodiment, when the hydraulic pressure of the hydraulic fluid in the first hydraulic passage L1 is deficient, the rotation number of the second electric motor M2 is increased to perform the steering assist based on the hydraulic pressure of the hydraulic fluid supplied through the second pump P2. In this case, it is conceivable that the causes of the deficiency of the hydraulic pressure of the hydraulic fluid in the first hydraulic passage L1 are a case in which the abnormality is generated in the first pump P1, and the first hydraulic passage L1 including the pipes through which the hydraulic fluid supplied through the first pump P1 flows, and so on, or a case in which the engine E that is the first driving source is stopped. Besides, the case in which the engine is stopped includes a case in which the engine E is intentionally stopped (for example, the idling stop), in addition to the case in which the engine E is stopped due to the malfunction of the engine E. Moreover, "the rotation number of the second electric motor M2 is increased" includes a case in which the second electric motor M2 is started from the stop state of the second electric motor M2, in addition to a case in which the rotation number of the second electric motor M2 is increased in the state in which the electric motor M2 is rotated.

(Operations and Effects of this Embodiment)

In the conventional steering device, the pump driven by the engine (corresponding to the first pump P1 in this embodiment) is configured to assist the steering assist force based on the hydraulic pressure supplied to the power cylinder. Accordingly, the supply of the hydraulic fluid to the power cylinder is deficient, for example, at the idling stop, and at the malfunction of the hydraulic system. Accordingly, it is difficult to provide the sufficient steering assist force to the second shaft.

On the other hand, the steering device according to this embodiment can attain the following effects. Accordingly, it is possible to solve the problems of the conventional steering device.

That is, the steering device according to this embodiment: a steering mechanism 3 including a steering shaft 31, and a transmitting mechanism 32, the steering shaft 31 including a first shaft (input shaft 33), a second shaft (output shaft 35), and a torsion bar (first torsion bar 34) provided between the first shaft and the second shaft, and the transmitting mechanism 32 configured to transmit a rotation of the steering shaft 31 to a steered wheel (not shown); a power cylinder 4 including a power cylinder main body portion (cylinder portion 301a), a piston 36, and a first hydraulic chamber X1, and a second hydraulic chamber X2, the power cylinder 4 configured to provide a steering force for steering the steered wheel (not shown), to the transmitting mechanism 32, and the piston 38 which is provided within the power cylinder main body portion (cylinder portion 301a), and which separates an inside space of the power cylinder main body portion into the first hydraulic chamber X1 and the second hydraulic chamber X2; a first electric motor which includes a stator coil (motor stator 75), and a motor rotor 74, and which is configured to provide a rotation force to the first shaft (input shaft 33); a first pump configured to be driven by a first driving source (engine E), and to discharge a hydraulic fluid; a second pump P2 configured to be driven by a second electric motor M2 which is a second driving source, and to discharge the hydraulic fluid; a rotary valve 5 configured to selectively supply the hydraulic fluid supplied from the first pump P1 or the second pump P2, to the first hydraulic chamber X1 and the second hydraulic chamber X2 in accordance with a torsion of the torsion bar (first torsion bar 34); and a controller including a first hydraulic passage state judging section, a first electric motor control section, and a second electric motor control section; the first hydraulic passage state judging section 20 configured to judge a state of the hydraulic fluid in a first hydraulic passage L1 in which the hydraulic fluid discharged from the first pump P1 flows, the first electric motor control section 21 configured to control and drive the first electric motor M1 based on a driving state of a vehicle, and the second electric motor control section 22 configured to increase a rotation number of the second electric motor M2 when the first hydraulic passage state judging section 20 judges that a supply of the hydraulic fluid in the first hydraulic passage L1 is deficient.

In this way, in this embodiment, when the hydraulic pressure of the hydraulic fluid in the first hydraulic passage L1 is deficient in a case in which the abnormality is generated in the first pump P1, and the first hydraulic passage L1 including the pipes through which the hydraulic fluid supplied through the first pump P1 flows, and so on, or in a case in which the engine E that is the first driving source is stopped, the rotation number of the second motor M2 is increased to perform the steering assist based on the hydraulic pressure of the hydraulic fluid supplied through the second pump P2. With this, it is possible to suppress the deficiency of the hydraulic fluid supplied to the power cylinder 4, and to suppress the decrease of the steering performance of the steering device.

Moreover, in this embodiment, the first hydraulic passage state judging section 20 is configured to judge whether or not the abnormality is generated in the first hydraulic passage L1 based on a pressure of the hydraulic fluid in the first hydraulic passage L1; and the second electric motor control section 22 is configured to increase the rotation number of the second electric motor M2 when the first hydraulic passage state judging section 20 judges that the abnormality is generated in the first hydraulic passage L1.

In this way, in this embodiment, for example, it is judged whether or not the abnormality is generated in the first hydraulic passage L1 by whether or not the hydraulic pressure of the hydraulic fluid in the first hydraulic passage L1 is equal to or smaller than the predetermined value. With this, it is possible to sense the abnormality in the first driving source (the engine E), the first pump P1, the pipes through which the hydraulic fluid discharged from the first pump P1 flows, the reservoir storing the hydraulic fluid, and so on.

Moreover, in this embodiment, the steering device includes a switching valve 6; the switching valve 6 is provided between the first pump P1 and the second pump P2, and the rotary valve 6; the switching valve 6 includes a valve housing 60, and a valve element 62 configured to be moved within the valve housing 60; the valve element 6 is configured to be moved to a first position when the pressure of the hydraulic fluid discharged from the first pump P1, and supplied to the switching valve 6 is equal to or greater than a first predetermined value, and to be moved to a second position when the pressure of the hydraulic fluid discharged from the first pump, and supplied to the switching valve is smaller than the first predetermined value; and the switching valve 6 is configured to supply the hydraulic fluid discharged from the first pump P1 to the rotary valve 5 when the valve element 62 is positioned at the first position, and to supply the hydraulic fluid discharged from the second pump P2 to the rotary valve 5 when the valve element 62 is positioned at the second position.

In this way, in this embodiment, when the valve element 62 is positioned at the second position, the hydraulic pressure of the hydraulic fluid supplied from the first pump P1 to the switching valve 6 is smaller than the first predetermined value. The switching valve 6 is configured to supply the hydraulic fluid discharged from the second pump P2 to the rotary valve 5. With this, it is possible to suppress the deficiency of the hydraulic fluid supplied to the power cylinder 4, and to suppress the decrease of the steering performance of the steering device.

Moreover, in this embodiment, the switching valve 6 includes a first sensing switch 81; the first sensing switch 81 is configured to sense that the valve element 62 is positioned at the second position; and the first hydraulic passage state judging section 20 is configured to judge that the abnormality is generated in the first hydraulic passage L1 when the first sensing switch 81 senses that the valve element 62 is positioned at the second position.

In this way, in this embodiment, when the valve element 62 is positioned at the second position, the hydraulic pressure of the hydraulic fluid supplied from the first pump P1 to the switching valve 6 is smaller than the predetermined value. With this, it is possible to judge that the first pump P1 does not supply the sufficient hydraulic fluid to the switching valve 6 due to the abnormality generated in the first pump P1, the first hydraulic passage L1 such as the pipes through which the hydraulic fluid discharged from the first pump P1 flows, and so on.

Moreover, in this embodiment, the first electric motor control section 21 is configured to control and drive the first electric motor M1 when the second electric motor control section 22 controls and drives the second electric motor M2 to increase the rotation number of the second electric motor M2.

In this way, in this embodiment, when the second electric motor M2 is controlled and driven, it is judged that the hydraulic fluid in the first hydraulic passage L1 is deficient. Accordingly, the sufficient steering force may not be produced. Therefore, it is possible to suppress the deficiency of the steering force by controlling and driving the first electric motor M1 with the second electric motor M2.

For example, when the supply of the hydraulic fluid in the first hydraulic passage L1 is normally performed, the second pump P2 is not driven. The second pump P2 is driven only in the abnormal state. In this case, the discharge capacity of the second pump P2 and the driving torque of the second electric motor M2 can be set to the minimum value. With this, it is possible to suppress the overall size increase of the steering device, and to decrease the manufacturing cost of the steering device. However, in this case, the discharge performance of the second pump P2 is inferior to the discharge performance of the first pump P1, so that the sufficient supply of the hydraulic fluid may not be obtained. Accordingly, when the discharge performance of the second pump P2 is inferior to the discharge performance of the first pump P1 in this way, the first electric motor M1 is controlled and driven. With this, it is possible to suppress the deficiency of the steering force.

Moreover, in this embodiment, the first electric motor control section 21 is configured to control and drive the first electric motor M1 in accordance with a vehicle speed Vs.

That is, in the steering device, the required characteristic of the steering torque is varied in accordance with the variation of the vehicle speed Vs. In particular, the frictional resistance with the road surface becomes greater when the vehicle speed Vs is relatively low. Accordingly, the large steering assist force is needed. On the other hand, when the vehicle speed Vs is relatively high, the frictional resistance with the road surface becomes small. Therefore, the small steering assist force is sufficient. Consequently, it is possible to improve the steering feeling by controlling and driving the first electric motor M1 in accordance with this characteristic variation.

Moreover, in this embodiment, the first electric motor control section 21 is configured to control and drive the first electric motor M1 so that a drive torque of the first electric motor M1 is lower as a vehicle speed Vs is higher.

As described above, the frictional resistance between the steered wheel and the road surface becomes lowered as the vehicle speed becomes higher. Accordingly, the first electric motor M1 is controlled and driven so as to decrease the drive torque of the first electric motor M1 in accordance with this lowering amount. With this, it is possible to control and drive the first electric motor M1 in accordance with the steering load.

Moreover, in this embodiment, the first electric motor control section 21 is configured to control and drive the first electric motor M1 in accordance with a rotation speed of the second electric motor M2.

That is, in the steering device, the steering force which can be produced by the power cylinder 4 is varied in accordance with the variation of the rotation speed Vm2 of the second electric motor M2. Accordingly, it is possible to improve the steering characteristic by controlling and driving the first electric motor M1 in accordance with this variation of the rotation speed Vm2.

Moreover, in this embodiment, the first electric motor control section 21 is configured to control and drive the first electric motor M1 so that a drive torque of the first electric motor M1 is lower as the rotation speed Vm2 of the second electric motor M2 is higher.

That is, in the steering device, the amount of the hydraulic fluid supplied to the rotary valve 5 is increased as the rotation speed Vm2 of the second electric motor M2 becomes higher, so that the steering assist force which can be produced by the power cylinder 4 is increased. Accordingly, it is possible to control and drive the first electric motor M1 in accordance with the steering load by controlling and driving the first electric motor M1 to decrease the driving torque of the first electric motor M1 in accordance with this variation of the rotation speed Vm2 of the second electric motor M2.

Moreover, in this embodiment, the first driving source is an engine E of the vehicle.

In this way, in this embodiment, the first pump P1 is driven by the engine E of the vehicle. Accordingly, it is not necessary to provide another driving source for driving the first pump P1. With this, it is possible to simplify the configuration of the steering device, and to decrease the manufacturing cost of the steering device.

(First Variation)

FIG. 8 to FIG. 11 show a steering device according to a first variation of the first embodiment of the present invention. Besides, in this variation, the means for sensing the state of the hydraulic fluid in the first hydraulic passage L1 is varied. The other configurations are identical to those of the first embodiment. Accordingly, the same symbols are provided to the identical configurations of the first embodiment. These explanations are omitted.

Figure 8:
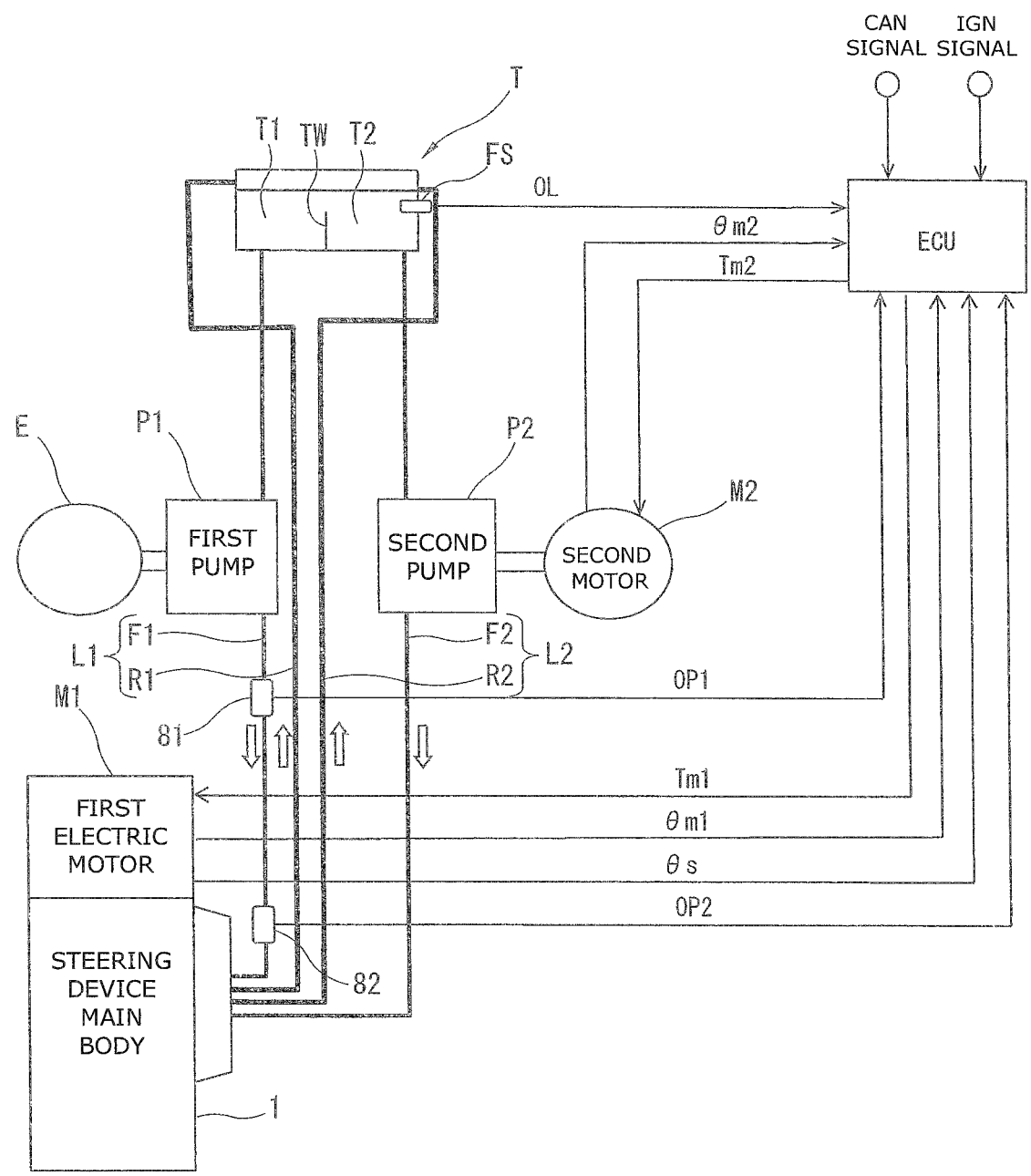
FIG. 8 is a system configuration view showing a steering device according to a first variation of the first embodiment of the present invention.
Figure 9:
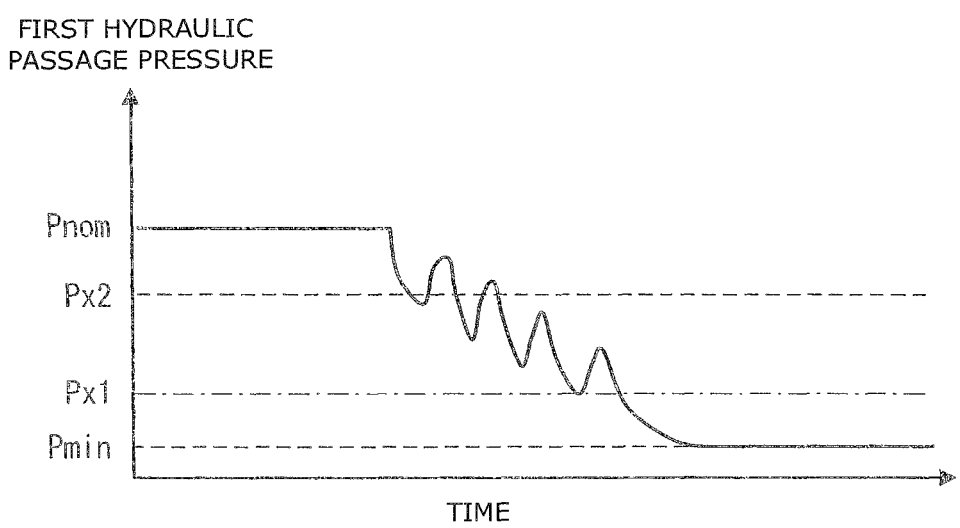
FIG. 9 is a graph showing a relationship between a time and a pressure of the first hydraulic passage in the steering device shown in FIG. 8.

FIG. 8 shows a system configuration view of the steering device according to this variation. FIG. 9 is a graph showing a relationship between a time and the hydraulic pressure of the first hydraulic passage L1 in the steering device according to this variation.

As shown in FIG. 8, in the steering device according to this variation, a second sensing switch 82 is provided in the first hydraulic passage L1 on a downstream side of the first sensing switch 81. The second sensing switch 82 has a threshold value higher than that of the first sensing switch 81. As shown in FIG. 9, the second sensing switch 82 has the threshold value that is a second predetermined value Px2 which is lower than the normal hydraulic pressure (the normal value Pnom) of the first hydraulic passage L1, and which is higher than the first predetermined value Px1 that is the threshold value of the first sensing switch 81. That is, this second sensing switch 82 is configured to be energized when the hydraulic pressure becomes smaller than the second predetermined threshold value Px2, and to transmit the second sensing switch signal OP2 to the controller 2 (cf. FIG. 8).

In this way, in this embodiment, as shown in FIG. 9, firstly, when the hydraulic pressure of the hydraulic fluid of the first hydraulic passage L1 becomes smaller than the normal value Pnom, and when the hydraulic pressure of the hydraulic fluid of the first hydraulic passage L1 further becomes smaller than the second predetermined value Px2, the second sensing switch 82 is brought to the ON state. With this, the abnormality of the first hydraulic passage L1 is primarily judged. Next, the hydraulic fluid is further decreased due to the malfunction of the first hydraulic passage L1. When the hydraulic pressure becomes lower than the first predetermined value Px1, the first sensing switch 81 is brought to the ON state. With this, the abnormality of the first hydraulic passage is secondarily judged and determined. Then, the hydraulic pressure is further decreased, so that the hydraulic pressure becomes the minimum value Pmin.

Figure 10:
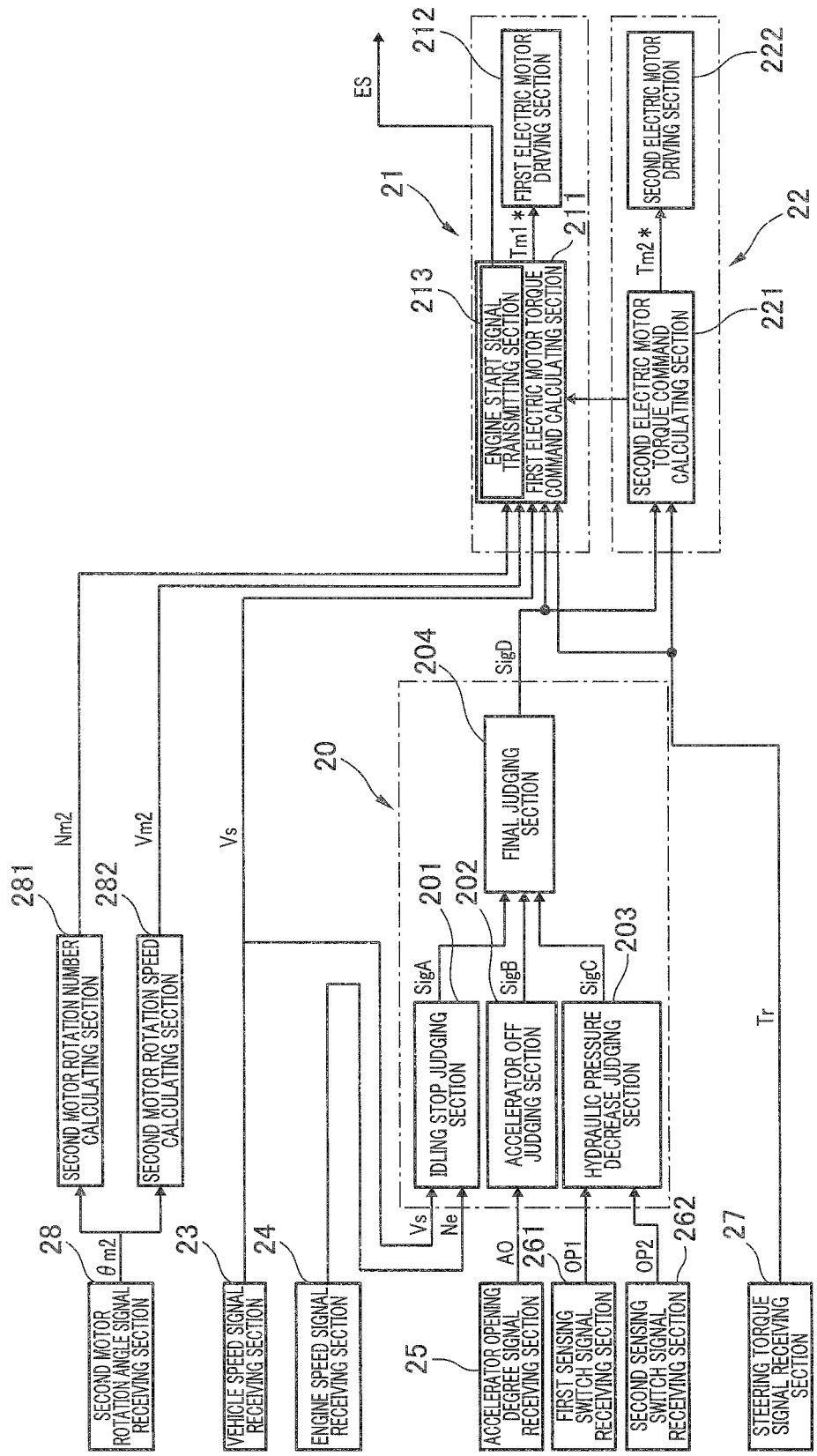
FIG. 10 is a control block diagram showing a configuration of a calculation circuit of a controller (ECU) according to the first variation of the first embodiment of the present invention.

FIG. 10 is a control block diagram showing the configuration of the calculation circuit of the controller 2 in this variation.

As shown in FIG. 10, in this variation, the hydraulic pressure decrease judging section 203 of the first hydraulic pressure passage state judging section 20 of the controller 2 is configured to receive the first sensing switch signal OP1 through the first sensing switch signal receiving section 261, and to receive the second sensing switch signal OP2 through the second sensing switch signal receiving section 262. Firstly, when the second sensing switch signal OP2 of the second sensing switch 82 is brought to the ON state (when "OP2"=1" is inputted), the hydraulic pressure decrease judging section 203 is configured to primarily judge the abnormality of the first hydraulic passage L1. Next, when the first sensing switch signal OP1 of the first sensing switch 81 is brought to the ON state (when "OP1"=1" is inputted), that is, when the valve element 62 of the switching valve 6 is moved to the second position (cf. FIG. 4(b)), the hydraulic pressure decrease judging section 203 is configured to secondarily judge and determine the abnormality of the first hydraulic passage L1. In this way, when it is judged that the abnormality is generated in the first hydraulic passage L1 based on the first and second sensing switch signals OP1 and OP2, the hydraulic pressure decrease judging section 203 is configured to output the hydraulic pressure decrease judging signal SigC to the final judging section 204.

Figure 11:
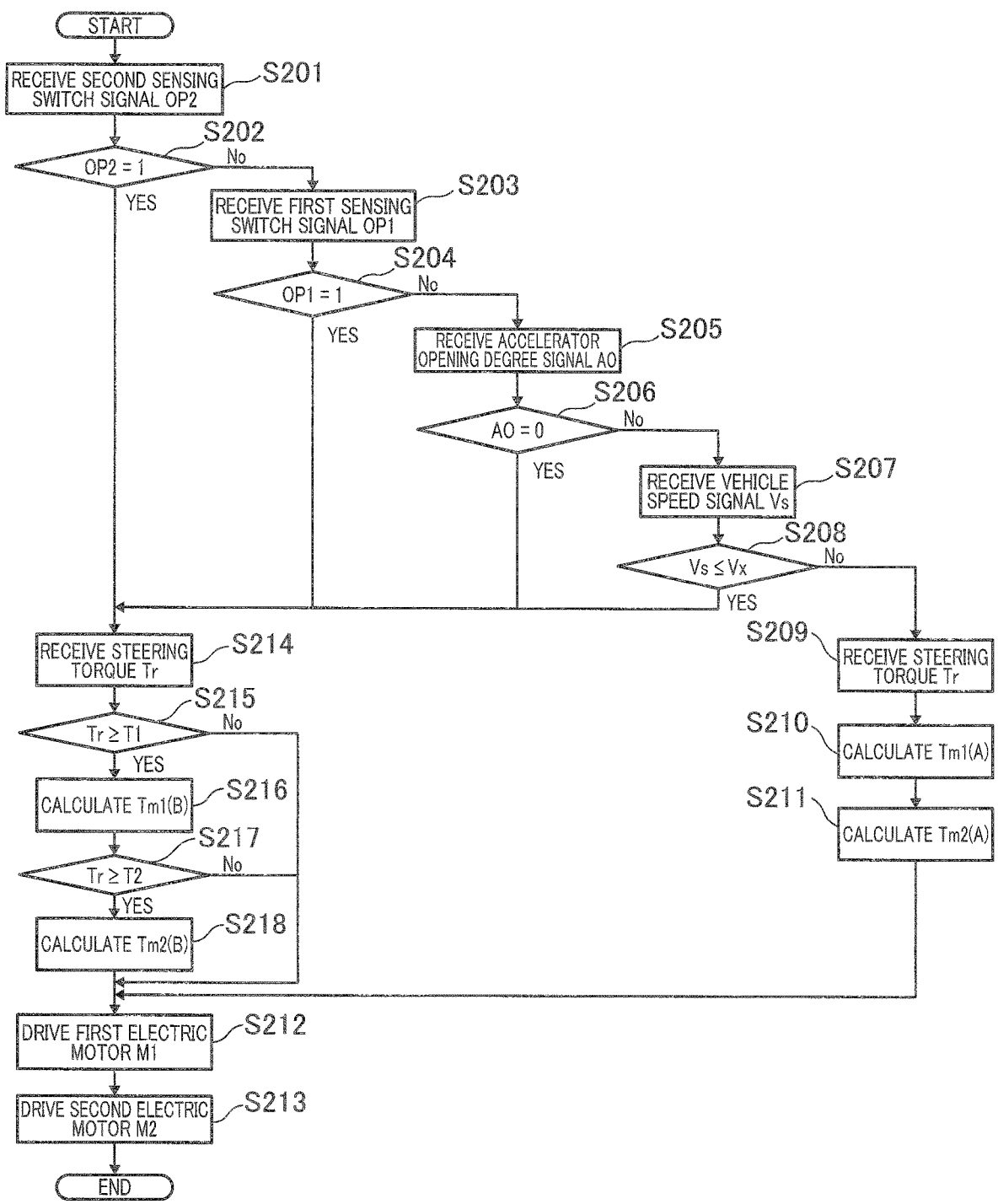
FIG. 11 is a flowchart showing a control flow of a drive control operation of the second pump in the first variation of the first embodiment of the present invention.

FIG. 11 is a flowchart showing a control flow of the drive control of the second pump P2 in this variation.

As shown in FIG. 11, firstly, the hydraulic pressure decrease judging section 203 is configured to receive (fetch) the second sensing switch signal OP2 outputted from the second sensing switch 82 (step S201). Then, the hydraulic pressure decrease judging section 203 is configured to judge whether or not the received second sensing switch signal OP2 is "1", that is, whether or not the second sensing switch 82 is in the ON state (step S202). In this case, when the hydraulic pressure decrease judging section 203 judges Yes, the abnormality is generated in the first hydraulic pressure passage L1. Accordingly, the process proceeds to next step S215.

On the other hand, when the hydraulic pressure decrease judging section 203 judges No at step S202, the hydraulic pressure decrease judging section 203 is configured to receive (fetch) the first sensing switch signal OP1 outputted from the first sensing switch 81 (step S203). Then, the hydraulic pressure decrease judging section 203 is configured to judge whether or not the received first sensing switch signal OP1 is "1", that is, whether or not the first sensing switch 81 is in the ON state (step S204). In this case, when the hydraulic pressure decrease judging section 203 judges Yes, the abnormality is generated in the first hydraulic pressure passage L1. Accordingly, the process proceeds to next step S215.

On the other hand, when the hydraulic pressure decrease judging section 203 judges No at step S204, the accelerator off judging section 202 is configured to receive the accelerator opening degree signal AO (step S205). Then, the accelerator off judging section 202 is configured to judge whether or not the received accelerator opening degree signal AO is "0", that is, whether or not the accelerator (the throttle) is closed (step S206). In this case, when the accelerator off judging section 202 judges Yes, the hydraulic pressure decrease in the first hydraulic pressure passage L1 is due to the stop state of the first pump P1 according to the accelerator off. Accordingly, the process proceeds to next step S215.

On the other hand, when the accelerator off judging section 202 judges No at step 206, the idling stop judging section 201 receives the vehicle speed signal Vs (step S207). The idling stop judging section 201 is configured to judge whether or not the received vehicle speed signal Vs is equal to or smaller than the predetermined vehicle speed Vx (step S206). In this case, when the idling stop judging section 201 judges Yes, the hydraulic pressure decrease in the first hydraulic passage L1 is due to the stop state of the first pump P1 according to the idling stop of the engine E. The process proceeds to step S214. Besides, the idling stop judging section 201 may be configured to receive the engine speed Ne at step S207, and to directly judges whether or not the engine E is in the idling stop state by this engine speed signal Ne at step S208. In this case, when the engine speed Ne received at step S207 is equal to or smaller than the predetermined rotation speed Nx at step S208, it is possible to judge that the first pump P1 is in the stop state according to the idling stop of the engine E.

On the other hand, when the idling stop judging section 201 judges No at step S208, the hydraulic pressure of the hydraulic fluid in the first hydraulic passage L1 is normal. Accordingly, the steering torque signal Tr received through the steering torque signal receiving section 27 is received (step S209). Then, the first electric motor torque command Tm*(A) and the second electric motor torque command Tm2*(A) are calculated based on the received steering torque signal Tr (step S210 and S211). Then, the first electric motor M1 and the second electric motor M2 are controlled and driven based on these motor torque commands Tm1*(A) and Tm2*(A) (steps S212 and S213). This program is finished.

When the process proceeds to step S214, as described above, it is conceivable that the abnormality is generated in the first hydraulic passage L1. Accordingly, firstly, the steering torque signal Tr is read (step S214). It is judged whether or not this read steering torque signal Tr is equal to or greater than the first torque T1 (step S215). In this case, when No is judged, the first electric motor torque command Tm1*(B) and the second electric motor torque command Tm2*(B) are set to "0" without calculating the first and second electric motor torque commands Tm1*(B) and Tm2*(B). The process proceeds to step S212. In this case, the first and second electric motors M1 and M2 are not controlled and driven (steps S212 and S213). This program is finished.

On the other hand, when Yes is judged at step S215, the first electric motor torque command Tm1*(B) is calculated at step S216. Then, at step S217, it is judged whether or not the steering torque signal Tr is equal to or greater than the second torque T2. In this case, when No is judged, the second electric motor torque command Tm2*(B) is set to "0" without calculating the second electric motor torque command Tm2*(B). The process proceeds to step S212. In this case, the only first electric motor M1 is controlled and driven by the first electric motor torque command Tm1*(B) (step S212). The second electric motor M2 is not controlled and driven (step S213). This program is finished.

On the other hand, when Yes is judged at step S217, the second electric motor torque command Tm2*(B) is calculated at step S218. Then, the process proceeds to step S212. In this case, the first electric motor M1 is controlled and driven based on the first electric motor torque command Tm1*(B) (step S212). Moreover, the second electric motor M2 is controlled and driven based on the second electric motor torque command Tm2*(B) (step S213). This program is finished.

(Operations and Effects of First Variation)

As described above, the steering device according to this variation includes the second sensing switch 82; the switching valve 6 includes a first sensing switch 81; the first sensing switch 81 is configured to sense that the valve element 62 is positioned at the second position; and the second sensing switch 82 is configured to sense that the hydraulic pressure of the hydraulic fluid discharged from the first pump P1, and supplied to the switching valve 6 becomes smaller than a second predetermined value Px2 higher than the first predetermined value Px1; and the first hydraulic passage state judging section 20 is configured to judge that the abnormality is generated in the first hydraulic passage L1 when the second sensing switch 82 senses that the hydraulic pressure of the hydraulic fluid supplied from the first pump P1 to the switching valve 6 becomes smaller than the second predetermined value Px2.

In this way, in this embodiment, the second sensing switch 82 is provided in addition to the first sensing switch 81. The second sensing switch 82 has the threshold value which is the second predetermined value Px2 higher than the first predetermined value Px1 that is the threshold value of the first sensing switch 81. That is, in this variation, the second sensing switch 82 is configured to judge whether the hydraulic pressure of the hydraulic fluid is equal to or greater than the second predetermined value Px2 higher than the first predetermined value Px1, or smaller than the second predetermined value Px2. Consequently, it is possible to sense the generation of the abnormality in the first hydraulic passage L1 at a timing earlier than that of the first embodiment. With this, it is possible to increase the rotation number of the second electric motor M2 at the earlier timing, and to smoothly shift from the hydraulic pressure supply by the first hydraulic passage L1 to the hydraulic pressure supply by the second hydraulic passage L2.

That is, when the abnormality is generated in the first hydraulic passage L1, the hydraulic pressure of the hydraulic fluid in the first hydraulic passage L1 is gradually attenuated with the hunting, as shown in FIG. 9. In the case of the only first sensing switch 81, when the hydraulic pressure of the first hydraulic passage L1 becomes smaller than the first predetermined value Px1, the second electric motor M2 is driven, so that it is shifted to the hydraulic pressure supply by the second hydraulic passage L2. On the other hand, when the hydraulic pressure becomes greater than the first predetermined value Px1, the second electric motor M2 is stopped, so that it becomes the hydraulic pressure supply by the first hydraulic passage L1. Consequently, the steering assist force is intermittently produced in the steering device, so that the steering feeling is deteriorated. Therefore, the second sensing switch 82 is provided. With this, it is possible to shift to the hydraulic pressure supply by the second hydraulic passage L2 before the hydraulic pressure of the first hydraulic passage L1 is largely decreased. With this, even when the above-described hunting is generated, it is possible to suppress the intermittent generation of the steering assist force of the steering device, and to ensure the good steering feeling.

On the other hand, it is conceivable that the first predetermined value Px1 which is the threshold value of the first sensing switch 81 is set to a higher value for sensing the generation of the abnormality in the first hydraulic passage L1 at the earlier timing, without adding the second sensing switch 82. However, the first sensing switch 81 is configured to switch the switching valve 6, that is, to switch from the hydraulic pressure supply by the first hydraulic passage L1 to the hydraulic pressure supply by the second hydraulic passage L2. Accordingly, it is preferable that the first sensing switch 81 switches the switching valve 6 after the hydraulic pressure of the hydraulic fluid in the first hydraulic passage L1 is sufficiently (surely) decreased due to the abnormality of the first hydraulic passage L1. It is not appropriate that the threshold value (the first predetermined value Px1) of the first sensing switch 81 is set to be unnecessarily higher. Therefore, in this variation, the second sensing switch 82 is added. With this, it is possible to rapidly sense the generation of the abnormality in the first hydraulic passage L1 while the threshold value (the first predetermined value Px1) of the first sensing switch 81 is maintained, and while the appropriate operation of the switching valve 6 is maintained.

(Second Variation)

Figure 12:
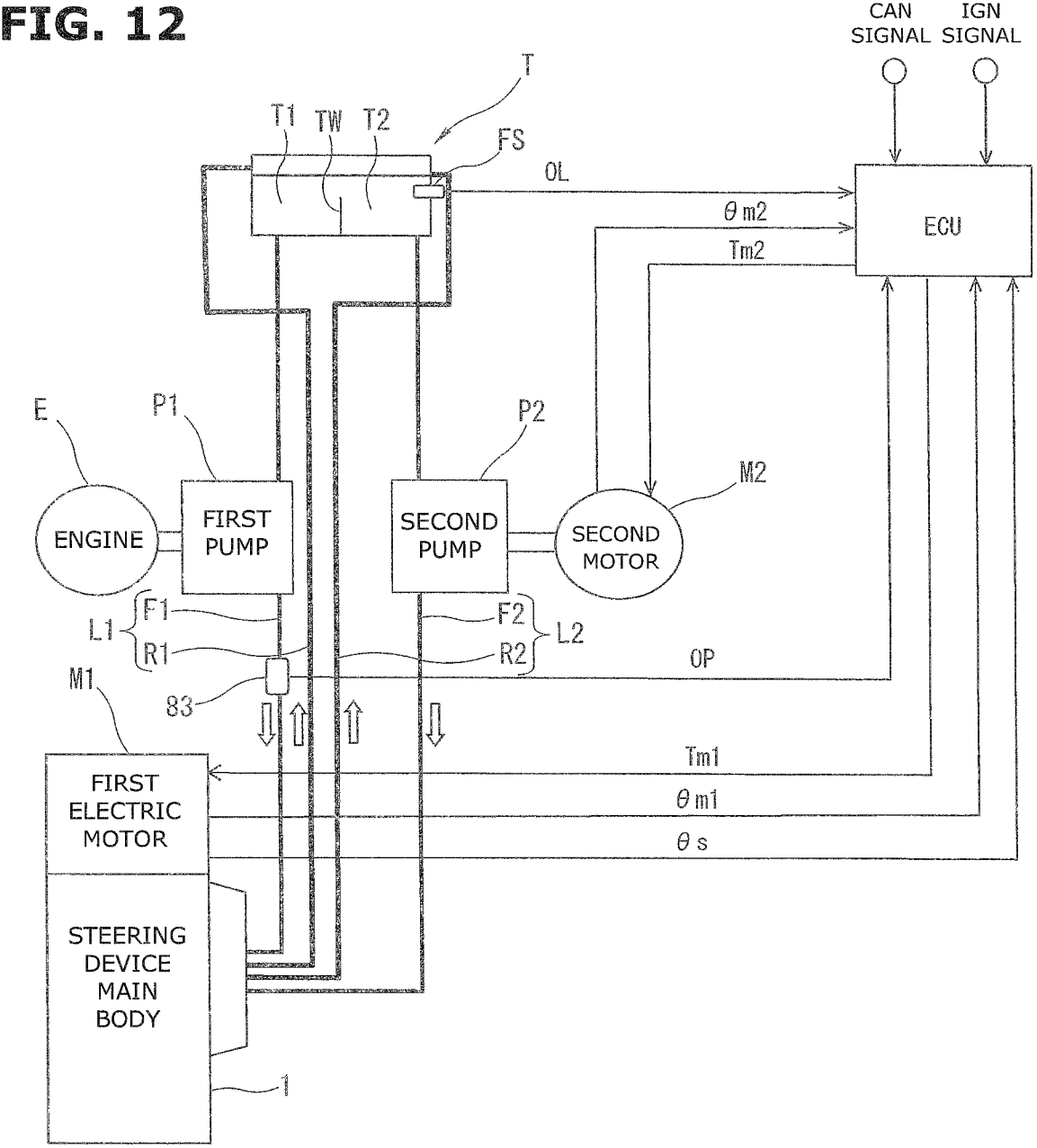
FIG. 12 is a system configuration view showing a steering device according to a second variation of the first embodiment of the present invention.
Figure 13:
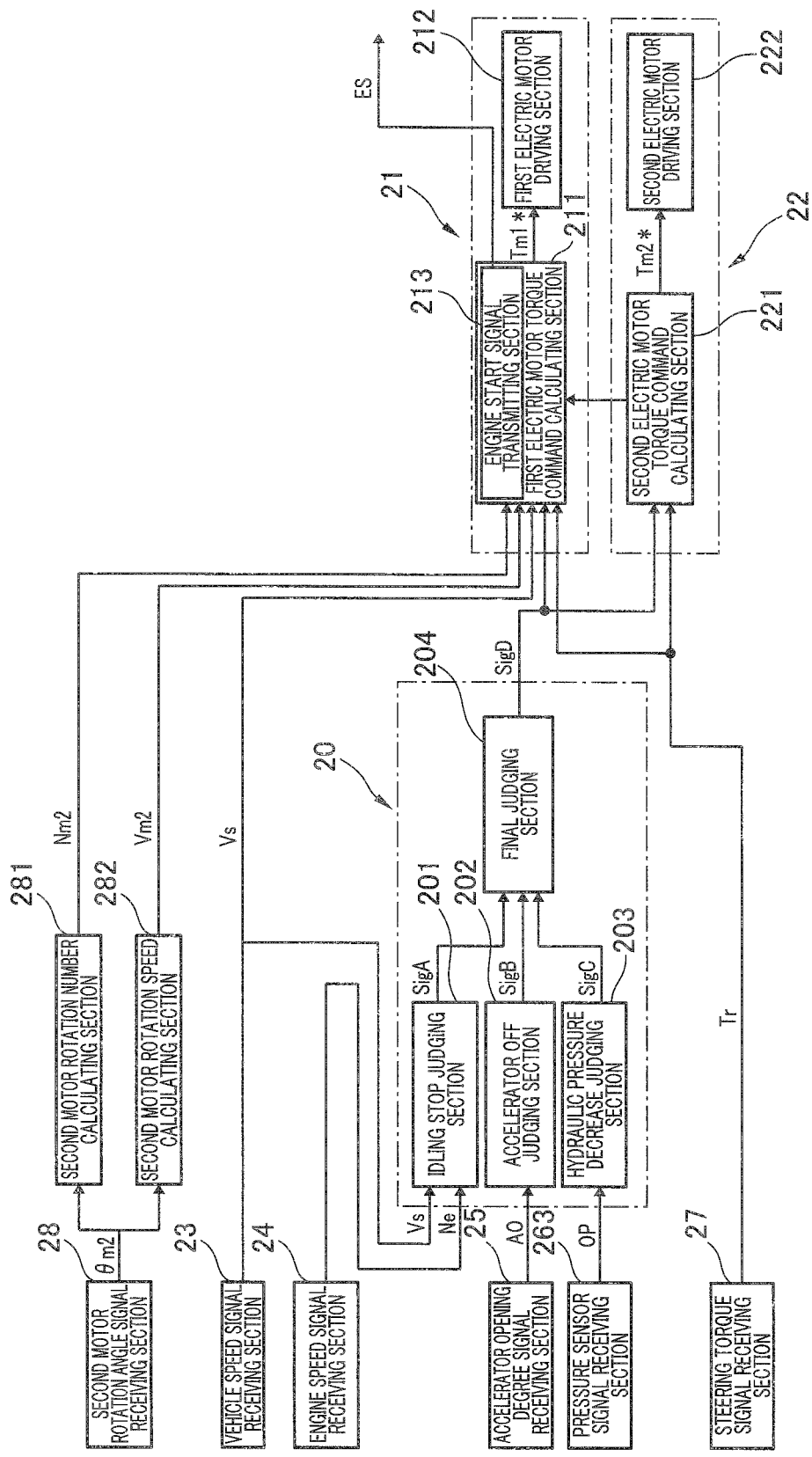
FIG. 13 is a control block diagram showing a configuration of a calculation circuit of a controller (ECU) according to the second variation of the first embodiment of the present invention.
Figure 14:
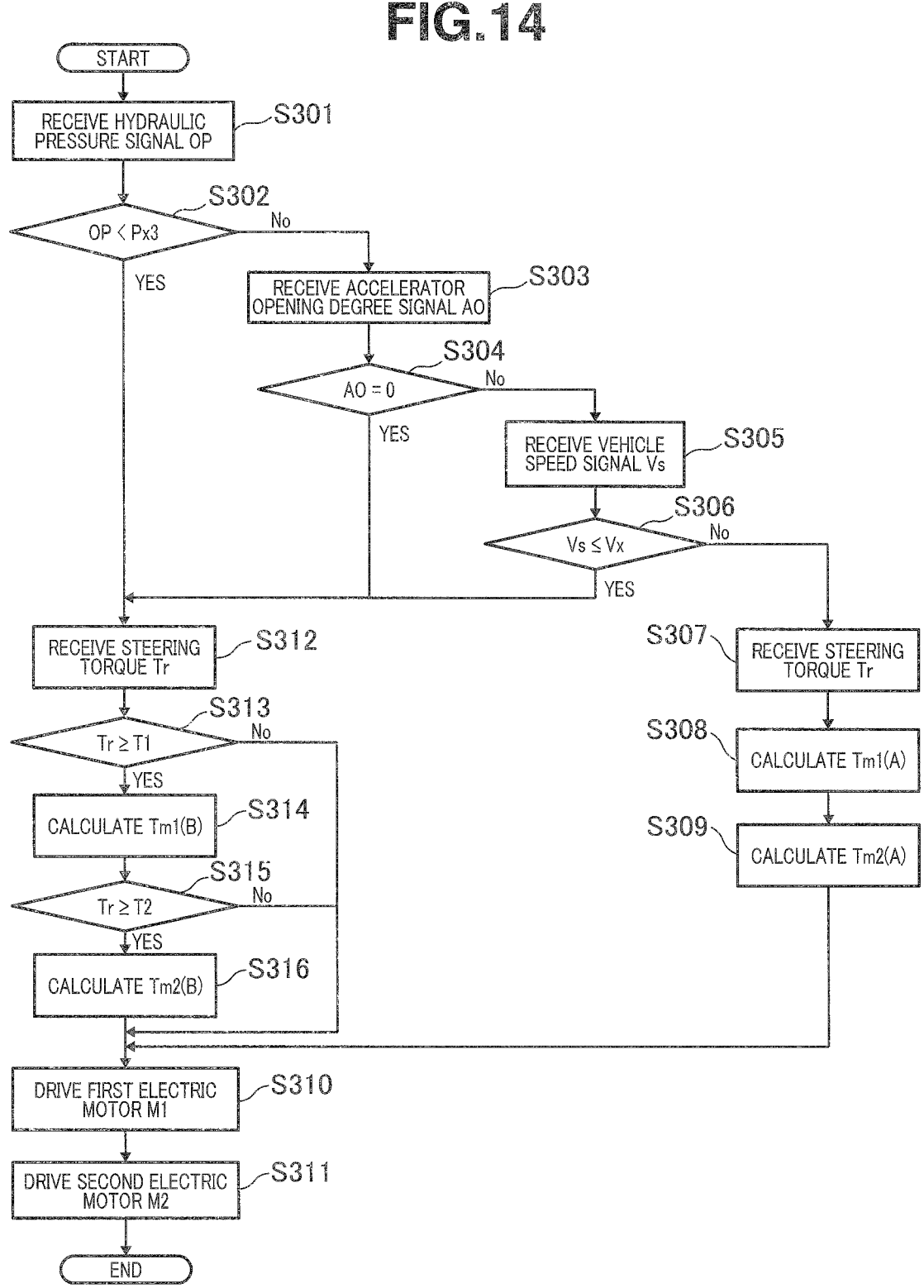
FIG. 14 is a flowchart showing a control flow of a drive control operation of the second pump in the second variation of the first embodiment of the present invention.

FIG. 12 to FIG. 14 show a steering device according to a second variation of the first embodiment of the present invention. Besides, in this variation, the means for sensing the state of the hydraulic fluid in the first hydraulic passage L1 is varied. The other configurations are identical to those of the first embodiment. Accordingly, the same symbols are provided to the identical configurations of the first embodiment. These explanations are omitted.

FIG. 12 shows a system configuration view of the steering device according to this variation.

As shown in FIG. 12, in the steering device according to this variation, a pressure sensor 83 is provided in the first hydraulic passage L1 between the first pump P1 and the rotary valve 5, in place of the first sensing switch 81. The pressure sensor 83 is configured to sense the hydraulic pressure of the hydraulic fluid. The pressure sensor 83 includes an element (not shown) configured to sense a variation of the hydraulic pressure of the hydraulic fluid supplied from the first pump P1 to the switching valve 6. A hydraulic pressure signal OP sensed by the pressure sensor 83 is transmitted to the controller 2.

FIG. 13 is a control block diagram showing the configuration of the calculation circuit of the controller 2 in this variation.

As shown in FIG. 13, in this variation, the hydraulic pressure decrease judging section 203 of the first hydraulic pressure passage state judging section 20 of the controller 2 is configured to judge that the abnormality is generated in the first hydraulic passage L1 when the hydraulic pressure signal OP inputted through the pressure sensor signal receiving section 263 becomes equal to or smaller than a third threshold value Px3 which is a threshold value. When it is judged that the abnormality is generated in the first hydraulic passage L1 by the hydraulic pressure signal OP in this way, the hydraulic pressure decrease judging section 203 is configured to output the hydraulic pressure decrease judging signal SigC to the final judging section 204.

FIG. 14 is a flowchart showing a control flow of the drive control of the second pump P2 in this variation.

As shown in FIG. 14, firstly, the hydraulic pressure decrease judging section 203 is configured to receive (fetch) the hydraulic pressure signal OP sensed by the pressure sensor 83 (step S301). Then, the hydraulic pressure decrease judging section 203 is configured to judge whether or not the received hydraulic pressure signal OP is smaller than the third predetermined value Px3 (step S302). In this case, when the hydraulic pressure decrease judging section 203 judges Yes, the abnormality is generated in the first hydraulic pressure passage L1. Accordingly, the process proceeds to next step S312.

On the other hand, when the hydraulic pressure decrease judging section 203 judges No at step S302, the accelerator off judging section 202 is configured to receive the accelerator opening degree signal AO (step S303). Then, the accelerator off judging section 202 is configured to judge whether or not the received accelerator opening degree signal AO is "0", that is, whether or not the accelerator (the throttle) is closed (step S304). In this case, when the accelerator off judging section 202 judges Yes, the hydraulic pressure decrease in the first hydraulic pressure passage L1 is due to the stop state of the first pump P1 according to the accelerator off. Accordingly, the process proceeds to next step S312.

On the other hand, when the accelerator off judging section 202 judges No at step 304, the idling stop judging section 201 receives the vehicle speed signal Vs (step S305). The idling stop judging section 201 is configured to judge whether or not the received vehicle speed signal Vs is equal to or smaller than the predetermined vehicle speed Vx (step S306). In this case, when the idling stop judging section 201 judges Yes, the hydraulic pressure decrease in the first hydraulic passage L1 is due to the stop state of the first pump P1 according to the idling stop of the engine E. The process proceeds to step S312. Besides, the idling stop judging section 201 may be configured to receive the engine speed Ne at step S305, and to directly judges whether or not the engine E is in the idling stop state by this engine speed signal Ne at step S306. In this case, when the engine speed Ne received at step S305 is equal to or smaller than the predetermined rotation speed Nx at step S306, it is possible to judge that the first pump P1 is in the stop state according to the idling stop of the engine E.

On the other hand, when the idling stop judging section 201 judges No at step S306, the normal hydraulic pressure supply is performed in the first hydraulic passage L1 (the first supply passage F1). Accordingly, the steering torque signal Tr received through the steering torque signal receiving section 27 is read (step S307). Then, the first electric motor torque command Tm*(A) and the second electric motor torque command Tm2*(A) are calculated based on the received steering torque signal Tr (step S308 and S309). Then, the first electric motor M1 and the second electric motor M2 are controlled and driven based on these motor torque commands Tm1*(A) and Tm2*(A) (steps S310 and S311). This program is finished.

When the process proceeds to step S312, as described above, it is conceivable that the abnormality is generated in the first hydraulic passage L1. Accordingly, firstly, the steering torque signal Tr is read (step S312). It is judged whether or not this read steering torque signal Tr is equal to or greater than the first torque T1 (step S313). In this case, when No is judged, the first electric motor torque command Tm1*(B) and the second electric motor torque command Tm2*(B) are set to "0" without calculating the first and second electric motor torque commands Tm1*(B) and Tm2*(B). The process proceeds to step S310. In this case, the first and second electric motors M1 and M2 are not controlled and driven (steps S310 and S311). This program is finished.

On the other hand, when Yes is judged at step S313, the first electric motor torque command Tm1*(B) is calculated at step S314. Then, at step S315, it is judged whether or not the steering torque signal Tr is equal to or greater than the second torque T2. In this case, when No is judged, the second electric motor torque command Tm2*(B) is set to "0" without calculating the second electric motor torque command Tm2*(B). The process proceeds to step S310. In this case, the only first electric motor M1 is controlled and driven by the first electric motor torque command Tm1*(B) (step S310). The second electric motor M2 is not controlled and driven (step S311). This program is finished.

On the other hand, when Yes is judged at step S315, the second electric motor torque command Tm2*(B) is calculated at step S316. Then, the process proceeds to step S310. In this case, the first electric motor M1 is controlled and driven based on the first electric motor torque command Tm1*(B) (step S310). Moreover, the second electric motor M2 is controlled and driven based on the second electric motor torque command Tm2*(B) (step S311). This program is finished.

(Operations and Effects of Second Variation)

As described above, in the steering device according to this variation, the steering device includes a pressure sensor 83; the pressure sensor 83 includes an element configured to sense a variation of the hydraulic pressure of the hydraulic fluid discharged from the first pump P1, and supplied to the switching valve 6; and the first hydraulic passage state judging section 20 is configured to judge that the abnormality is generated in the first hydraulic passage L1 when the pressure sensor 83 senses that the hydraulic pressure of the hydraulic fluid supplied from the first pump P1 to the switching valve 6 becomes smaller than a third predetermined value Px3.

In this way, in this embodiment, the pressure sensor 83 is configured to directly sense the hydraulic pressure of the hydraulic fluid in the first hydraulic passage L1. Accordingly, it is possible to sense the generation of the abnormality in the first hydraulic passage L1 with higher accuracy.

Moreover, the pressure sensor 83 is configured to directly senses the hydraulic pressure of the hydraulic fluid in the first hydraulic passage L1. Accordingly, it is unnecessary to provide a plurality of the mechanical switches such as the first and second sensing switches 81 and 82. Therefore, it is possible to simplify the configuration of the steering device.

Second Embodiment

Figure 15:
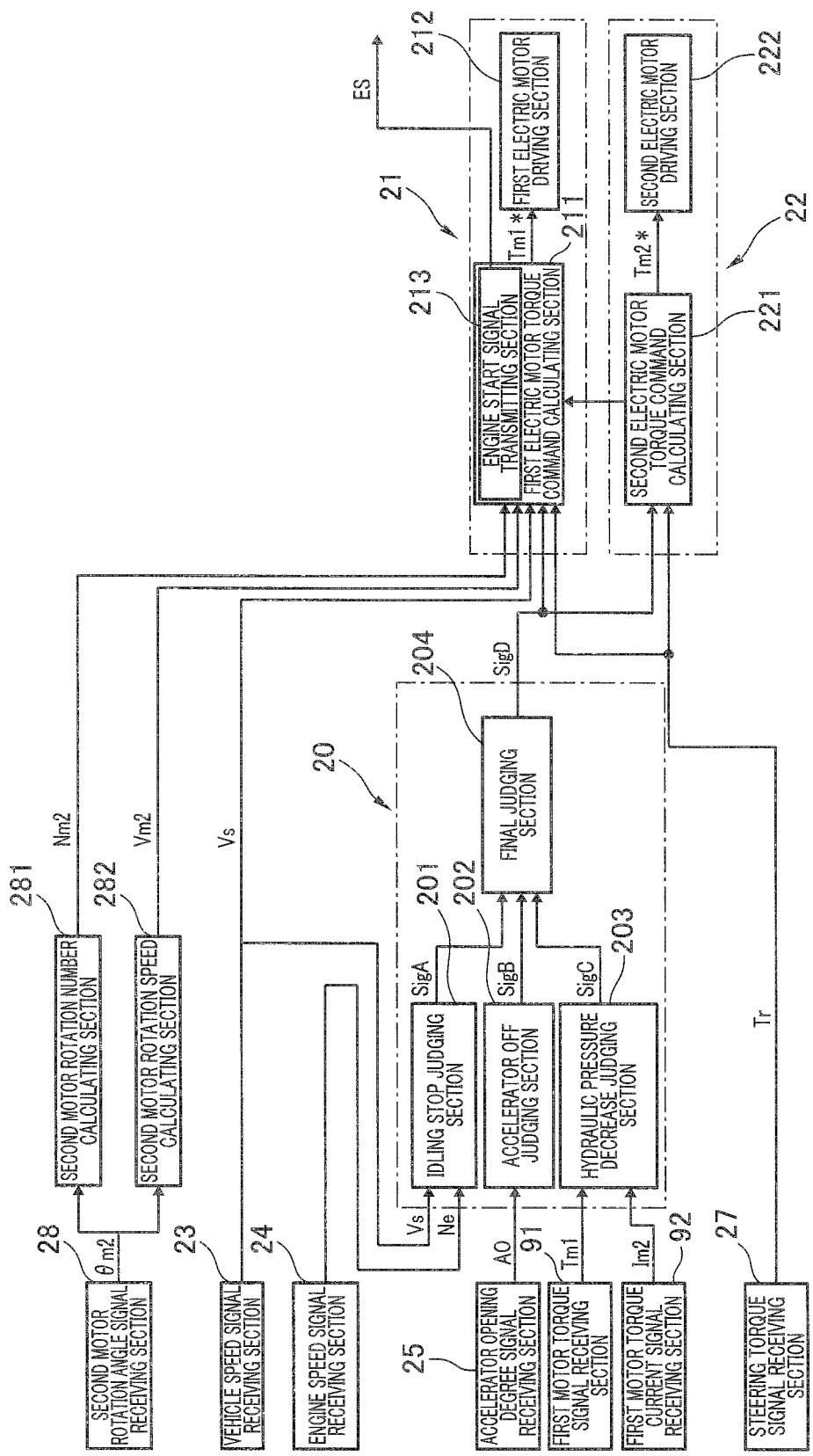
FIG. 15 is a control block diagram showing a configuration of a calculation circuit of a controller (ECU) according to a second embodiment of the present invention.
Figure 16:
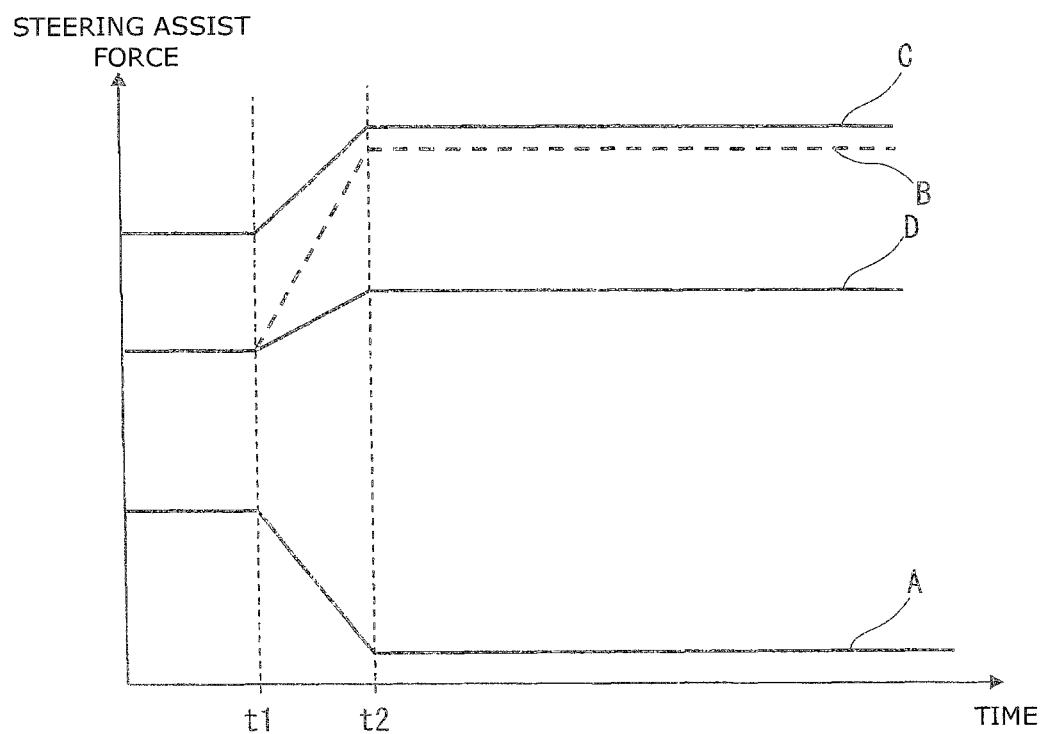
FIG. 16 is a graph showing a relationship between the steering assist force, and a case where there is a steering assist by a first electric motor, and a case where there is not the steering assist by the first electric motor, in the steering device according to the second embodiment of the present invention.
Figure 17:
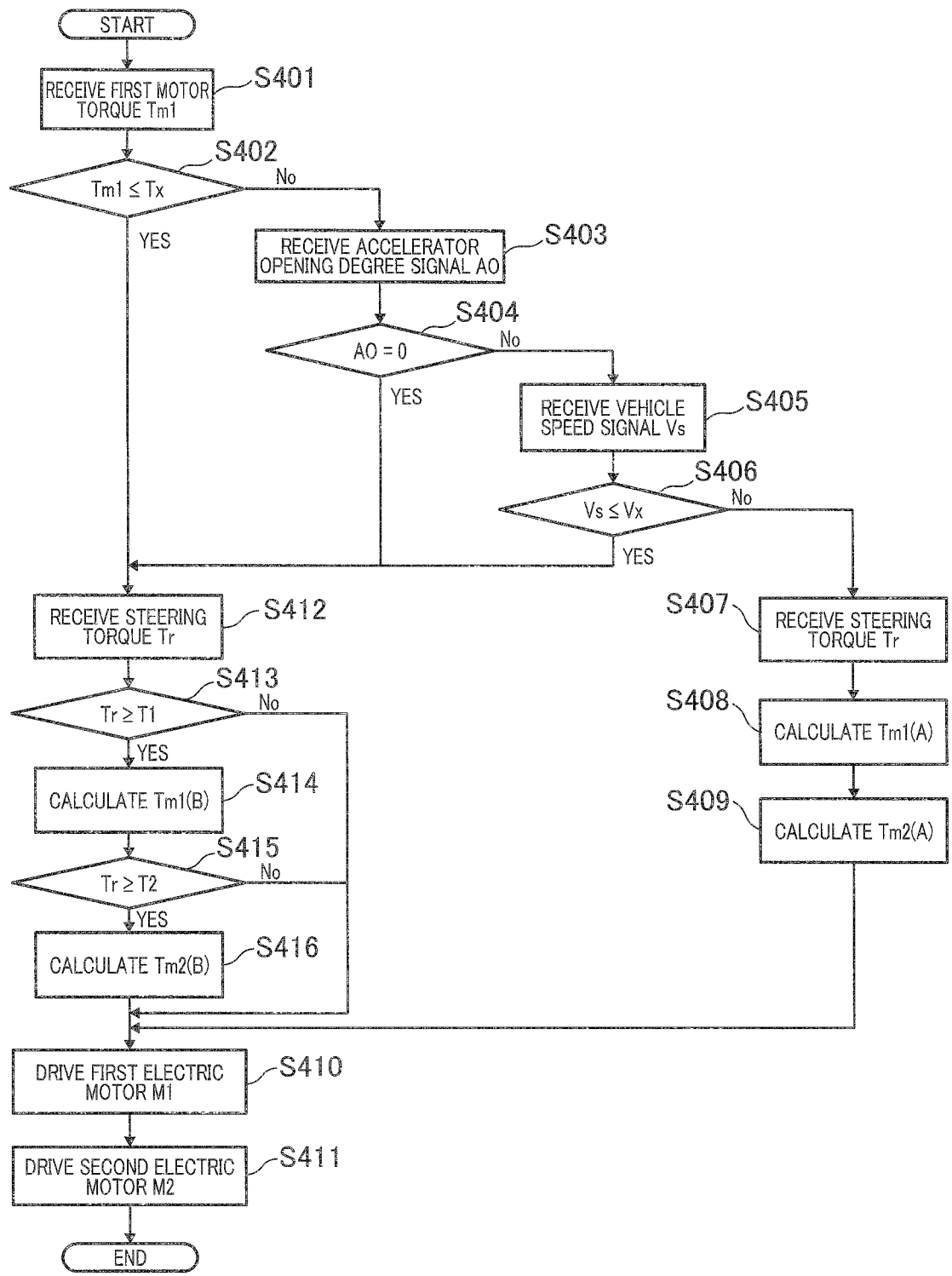
FIG. 17 is a flowchart showing a control flow of a drive control operation of the second pump in the second embodiment of the present invention.

FIG. 15 to FIG. 17 show a steering device according to a second embodiment of the present invention. Besides, in this embodiment, the means for sensing the state of the hydraulic fluid in the first hydraulic passage L1 is varied. The other configurations are identical to those of the first embodiment. Accordingly, the same symbols are provided to the identical configurations of the first embodiment. These explanations are omitted.

FIG. 15 is a control block diagram showing the configuration of the calculation circuit of the controller 2 in the second embodiment of the present invention.

As shown in FIG. 15, in this embodiment, the hydraulic pressure decrease judging section 203 of the first hydraulic pressure passage state judging section 20 of the controller 2 is configured to receive the first motor torque signal Tm1 which is the driving torque of the first electric motor M1, through the first motor torque signal receiving section 91. Alternatively, the hydraulic pressure decrease judging section 203 is configured to receive the first motor current signal Im1 which is the drive current of the first electric motor M1, through a first motor current signal receiving section 92, in place of the first motor torque signal Tm1. The hydraulic pressure decrease judging section 203 is configured to judge that the abnormality is generated in the first hydraulic passage L1 when the first motor torque signal Tm1 is equal to or greater than the predetermined torque Tx, or when the first motor current signal Im1 is equal to or greater than a predetermined current value Ix. When it is judged that the abnormality is generated in the first hydraulic passage L1 based on the first motor torque signal Tm1 or the first motor current signal Im1 in this way, the hydraulic pressure decrease judging section 203 is configured to output the hydraulic pressure decrease judging signal SigC to the final judging section 204.

In a case in which it is judged that the steering assist force by the power cylinder 4 is deficient based on the first motor torque Tm1 or the first motor current signal Im1, the first hydraulic passage state judging section 20 (the final judging section 204) is configured to output the first hydraulic passage malfunction signal SigD to the first electric motor control section 21. With this, the first electric motor control section 21 is configured to control and drive the first electric motor M1 to further increase the drive torque of the first electric motor M1.

FIG. 16 is a graph showing a relationship between the steering assist force, and a case where there is the steering assist by the first electric motor M1, and a case where there is not the steering assist by the first electric motor M1, in the steering device according to this embodiment.

As shown in FIG. 16, when the abnormality of the first hydraulic passage L1 is judged at time t1, the steering assist force produced by the power cylinder is gradually decreased to be minimum at time t2, as shown by a line A. As shown by a broken line B, the steering torque is largely increased in accordance with the decrease of the steering assist force of the power cylinder. On the other hand, in this embodiment, when the abnormality of the first hydraulic passage L1 is judged at time t1, the drive torque of the first electric motor M1 is controlled to be increased as shown by a line C, the drive torque of the first electric motor M1 is gradually increased to be maximum at time t2. It is possible to suppress the increase of the steering torque to a minimum as shown by a line D, by the steering assist based on the increase control of the drive torque of the first electric motor M1.

FIG. 17 is a flowchart showing a control flow of the drive control of the second pump P2 in this embodiment.

As shown in FIG. 17, firstly, the hydraulic pressure decrease judging section 203 is configured to receive (fetch) the first motor torque signal Tm1 inputted through the first motor torque signal receiving section 91 (step S401). Then, the hydraulic pressure decrease judging section 203 is configured to judge whether or not the received first motor torque signal Tm1 is equal to or greater than the predetermined value Tx (step S402). In this case, when the hydraulic pressure decrease judging section 203 judges Yes, the abnormality is generated in the first hydraulic pressure passage L1. Accordingly, the process proceeds to next step S412. Besides, the hydraulic pressure decrease judging section 203 may be configured to receive the first motor current signal Im1 at step S401 in place of the first motor torque signal Tm1, and to judge the abnormality of the first hydraulic passage L1 at step S402 by this first motor current signal Im1. In this case, at step S402, when the first motor current signal Im1 received at step S401 is equal to or greater than the predetermined current value Ix, it is possible to judge that the abnormality is generated in the first hydraulic passage L1.

On the other hand, when the hydraulic pressure decrease judging section 203 judges No at step S402, the accelerator off judging section 202 is configured to receive the accelerator opening degree signal AO (step S403). Then, the accelerator off judging section 202 is configured to judge whether or not the received accelerator opening degree signal AO is "0", that is, whether or not the accelerator (the throttle) is closed (step S404). In this case, when the accelerator off judging section 202 judges Yes, the hydraulic pressure decrease in the first hydraulic pressure passage L1 is due to the stop state of the first pump P1 according to the accelerator off. Accordingly, the process proceeds to next step S412.

On the other hand, when the accelerator off judging section 202 judges No at step 404, the idling stop judging section 201 receives the vehicle speed signal Vs (step S405). The idling stop judging section 201 is configured to judge whether or not the received vehicle speed signal Vs is equal to or smaller than the predetermined vehicle speed Vx (step S406). In this case, when the idling stop judging section 201 judges Yes, the hydraulic pressure decrease in the first hydraulic passage L1 is due to the stop state of the first pump P1 according to the idling stop of the engine E. The process proceeds to step S412. Besides, the idling stop judging section 201 may be configured to receive the engine speed Ne at step S405, and to directly judges whether or not the engine E is in the idling stop state by this engine speed signal Ne at step S406. In this case, when the engine speed Ne received at step S405 is equal to or smaller than the predetermined rotation speed Nx at step S406, it is possible to judge that the first pump P1 is in the stop state according to the idling stop of the engine E.

On the other hand, when the idling stop judging section 201 judges No at step S406, the normal hydraulic pressure supply is performed in the first hydraulic passage L1 (the first supply passage F1). Accordingly, the steering torque signal Tr received through the steering torque signal receiving section 27 is read (step S407). Then, the first electric motor torque command Tm*(A) and the second electric motor torque command Tm2*(A) are calculated based on the received steering torque signal Tr (step S408 and S409). Then, the first electric motor M1 and the second electric motor M2 are controlled and driven based on these motor torque commands Tm1*(A) and Tm2*(A) (steps S410 and S411). This program is finished.

When the process proceeds to step S412, as described above, it is conceivable that the abnormality is generated in the first hydraulic passage L1. Accordingly, firstly, the steering torque signal Tr is read (step S412). It is judged whether or not this read steering torque signal Tr is equal to or greater than the first torque T1 (step S413). In this case, when No is judged, the first electric motor torque command Tm1*(B) and the second electric motor torque command Tm2*(B) are set to "0" without calculating the first and second electric motor torque commands Tm1*(B) and Tm2*(B). The process proceeds to step S410. In this case, the first and second electric motors M1 and M2 are not controlled and driven (steps S410 and S411). This program is finished.

On the other hand, when Yes is judged at step S413, the first electric motor torque command Tm1*(B) is calculated at step S414. Then, at step S415, it is judged whether or not the steering torque signal Tr is equal to or greater than the second torque T2. In this case, when No is judged, the second electric motor torque command Tm2*(B) is set to "0" without calculating the second electric motor torque command Tm2*(B). The process proceeds to step S410. In this case, the only first electric motor M1 is controlled and driven by the first electric motor torque command Tm1*(B) (step S410). The second electric motor M2 is not controlled and driven (step S411). This program is finished.

On the other hand, when Yes is judged at step S415, the second electric motor torque command Tm2*(B) is calculated at step S416. Then, the process proceeds to step S410. In this case, the first electric motor M1 is controlled and driven based on the first electric motor torque command Tm1*(B) (step S410). Moreover, the second electric motor M2 is controlled and driven based on the second electric motor torque command Tm2*(B) (step S411). This program is finished.

(Operations and Effects of Second Variation)

As described above, in this embodiment, the first electric motor control section 21 is configured to control and drive the first electric motor M1 to increase a drive torque of the first electric motor M1 when the steering force of the power cylinder is deficient; and the first hydraulic passage state judging section 20 is configured to judge that the supply of the hydraulic fluid in the first hydraulic passage L1 is deficient when the drive torque (first motor torque Tm1) of the first electric motor M1 is equal to or greater than a predetermined torque Tx, or when a current value flowing in the first electric motor M1 is equal to or greater than a predetermined current value (first motor current value Im1).

That is, when the supply of the hydraulic fluid in the first hydraulic passage L1 is deficient, the drive torque of the first electric motor M1 is controlled to be increased to increase the first motor torque Tm1 or the first motor current Im1. Specifically, in case of the manual steering state, the steering torque sensed by the torque sensor (not shown) is increased due to the deficiency of the hydraulic fluid supply in the first hydraulic passage L1. Accordingly, the drive torque of the first electric motor M1 is controlled to be increased to increase the first motor torque Tm1 or the first motor current Im1. On the other hand, in case of the automatic steering state, the actual steering angle is deficient with respect to the steering angle command (the target steering angle) of the steering device due to the deficiency of the hydraulic fluid supply in the first hydraulic passage L1. Accordingly, the drive torque of the first electric motor M1 is controlled to be increased to increase the first motor torque Tm1 or the first motor current signal Im1. In this way, in this embodiment, it is possible to estimate the decrease of the hydraulic pressure of the hydraulic fluid in the first hydraulic passage L1 by sensing the increase of the first motor torque Tm1 or the first motor current Im1. That is, it is possible to judge the abnormality of the first hydraulic passage L1 without directly sensing the hydraulic pressure of the hydraulic fluid in the first hydraulic passage L1, to increase the rotation number of the second electric motor M2, and to shift to the hydraulic pressure supply by the second pump P2.

Third Embodiment

Figure 18:
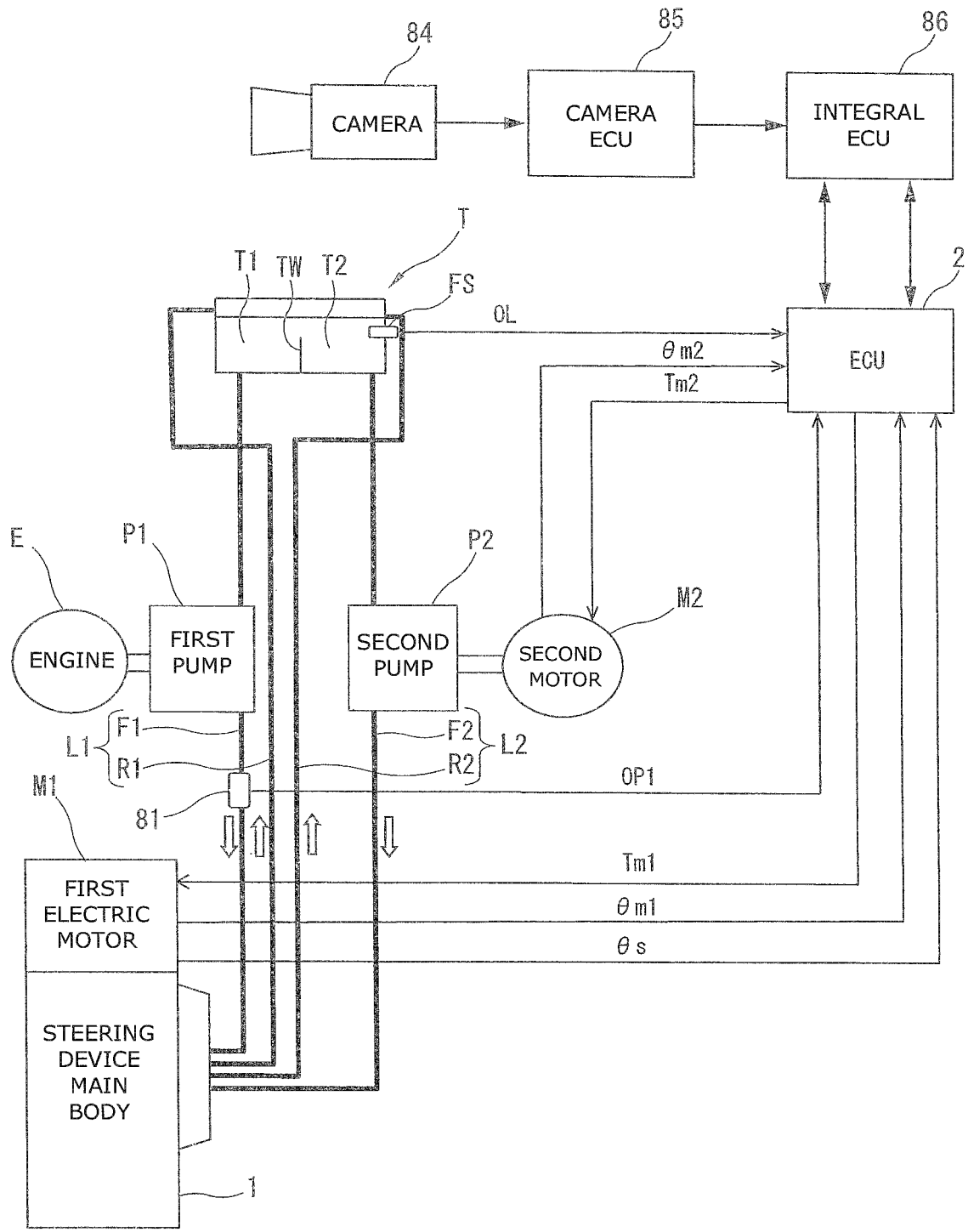
FIG. 18 is a system configuration view showing a steering device according to a third embodiment of the present invention.
Figure 19:
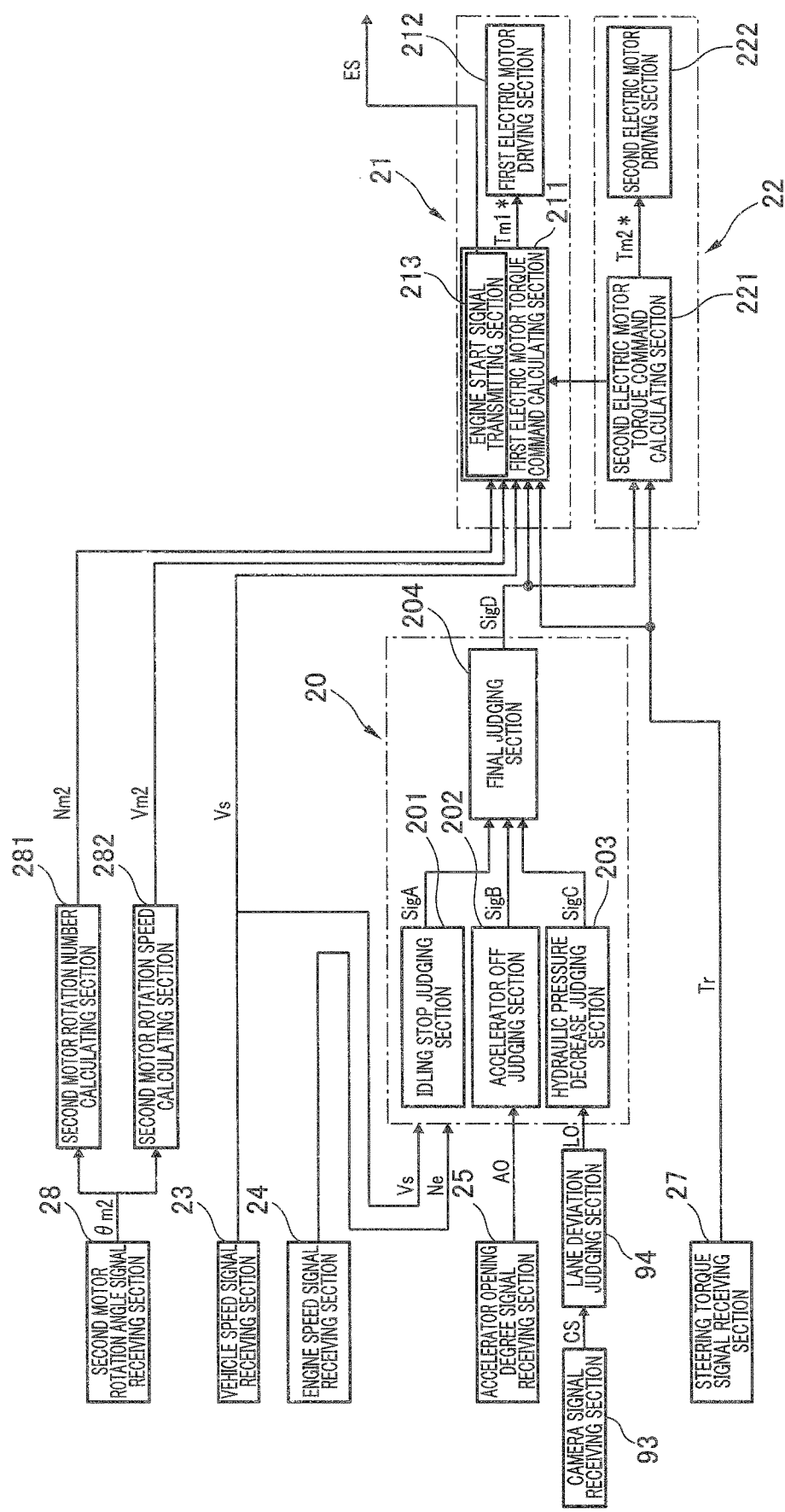
FIG. 19 is a control block diagram showing a configuration of a calculation circuit of a controller (ECU) according to the third embodiment of the present invention.
Figure 20:
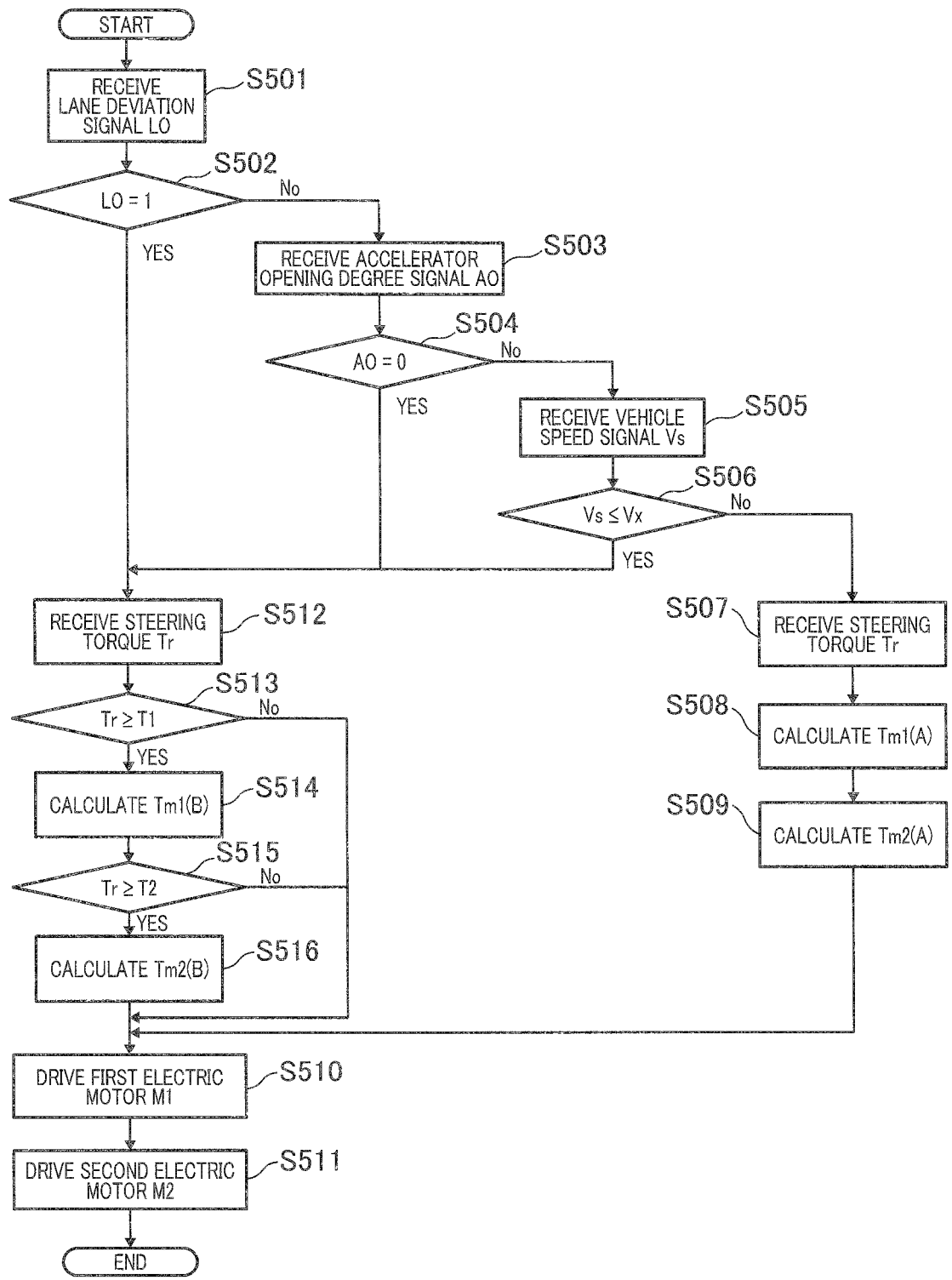
FIG. 20 is a flowchart showing a control flow of a drive control operation of the second pump in the third embodiment of the present invention.

FIG. 18 to FIG. 20 show a steering device according to a third embodiment of the present invention. Besides, in this embodiment, the means for sensing the state of the hydraulic fluid in the first hydraulic passage L1 is varied. The other configurations are identical to those of the first embodiment. Accordingly, the same symbols are provided to the identical configurations of the first embodiment. These explanations are omitted.

FIG. 18 is a system configuration view of the steering device according to this embodiment.

As shown in FIG. 18, in the steering device according to this embodiment, the controller 2 is connected to an integral controller 86 of the vehicle. The integral controller 86 is connected to a camera controller 85 configured to control an operation of an in-vehicle camera 84 configured to monitor a traveling state of the vehicle. In this way, the steering device according to this embodiment is configured to receive, as camera signals CS, an information relating to the traveling state of the vehicle which is shot by the in-vehicle camera 84, and which is arithmetically processed by the camera controller 85, for example, a lane distance which is a distance between the steered wheel of the vehicle and a traveling lane, and so on, through the integral controller 86.

FIG. 19 is a control block diagram showing the configuration of the calculation circuit of the controller 2 in this embodiment.

As shown in FIG. 19, in this embodiment, the controller 2 includes a lane deviation judging section 94 which is positioned on an upstream side of the first hydraulic passage state judging section 20, and which is configured to judge the deviation of the lane, or the possibility of the deviation based on the camera signal CS inputted through the camera signal receiving section 93. When the lane deviation judging section 94 judges the deviation of the lane, or the possibility of the deviation of the lane, the lane deviation judging section 94 is configured to output a lane deviation signal LO through a lane deviation signal receiving section 95 to the hydraulic pressure decrease judging section 203 of the first hydraulic passage state judging section 20. With this, the hydraulic pressure decrease judging section 203 is configured to judge the decrease of the hydraulic pressure of the hydraulic fluid in the first hydraulic passage L1 based on the lane deviation signal LO. Specifically, when the hydraulic pressure decrease judging section 203 of the first hydraulic passage state judging section 20 receives the lane deviation signal LO (LO=1), the hydraulic pressure decrease judging section 203 is configured to judge that the abnormality is generated in the first hydraulic passage L1. When it is judged that the abnormality is generated in the first hydraulic passage L1 based on the lane deviation signal LO in this way, the hydraulic pressure decrease judging section 203 is configured to output the hydraulic pressure decrease judging signal SigC to the final judging section 204.

FIG. 20 is a flowchart showing a control flow of the drive control of the second pump P2 in this embodiment.

As shown in FIG. 20, firstly, the hydraulic pressure decrease judging section 203 is configured to receive (fetch) the lane deviation signal LO inputted from the lane deviation judging section 94 through the lane deviation signal receiving section 95 (step S501). Then, the hydraulic pressure decrease judging section 203 is configured to judge whether or not the received lane deviation signal LO is "1", that is, whether or not there is the lane deviation, or the possibility of the lane deviation (step S502). In this case, when the hydraulic pressure decrease judging section 203 judges Yes, the abnormality is generated in the first hydraulic pressure passage L1. Accordingly, the process proceeds to next step S512.

On the other hand, when the hydraulic pressure decrease judging section 203 judges No at step S502, the accelerator off judging section 202 is configured to receive the accelerator opening degree signal AO (step S503). Then, the accelerator off judging section 202 is configured to judge whether or not the received accelerator opening degree signal AO is "0", that is, whether or not the accelerator (the throttle) is closed (step S504). In this case, when the accelerator off judging section 202 judges Yes, the hydraulic pressure decrease in the first hydraulic pressure passage L1 is due to the stop state of the first pump P1 according to the accelerator off. Accordingly, the process proceeds to next step S512.

On the other hand, when the accelerator off judging section 202 judges No at step 504, the idling stop judging section 201 receives the vehicle speed signal Vs (step S505). The idling stop judging section 201 is configured to judge whether or not the received vehicle speed signal Vs is equal to or smaller than the predetermined vehicle speed Vx (step S506). In this case, when the idling stop judging section 201 judges Yes, the hydraulic pressure decrease in the first hydraulic passage L1 is due to the stop state of the first pump P1 according to the idling stop of the engine E. The process proceeds to step S512. Besides, the idling stop judging section 201 may be configured to receive the engine speed Ne at step S505, and to directly judges whether or not the engine E is in the idling stop state by this engine speed signal Ne at step S506. In this case, when the engine speed Ne received at step S505 is equal to or smaller than the predetermined rotation speed Nx at step S506, it is possible to judge that the first pump P1 is in the stop state according to the idling stop of the engine E.

On the other hand, when the idling stop judging section 201 judges No at step S506, the normal hydraulic pressure supply is performed in the first hydraulic passage L1 (the first supply passage F1). Accordingly, the steering torque signal Tr received through the steering torque signal receiving section 27 is read (step S507). Then, the first electric motor torque command Tm*(A) and the second electric motor torque command Tm2*(A) are calculated based on the received steering torque signal Tr (step S508 and S509). Then, the first electric motor M1 and the second electric motor M2 are controlled and driven based on these motor torque commands Tm1*(A) and Tm2*(A) (steps S510 and S511). This program is finished.

When the process proceeds to step S512, as described above, it is conceivable that the abnormality is generated in the first hydraulic passage L1. Accordingly, firstly, the steering torque signal Tr is read (step S512). It is judged whether or not this read steering torque signal Tr is equal to or greater than the first torque T1 (step S513). In this case, when No is judged, the first electric motor torque command Tm1*(B) and the second electric motor torque command Tm2*(B) are set to "0" without calculating the first and second electric motor torque commands Tm1*(B) and Tm2*(B). The process proceeds to step S510. In this case, the first and second electric motors M1 and M2 are not controlled and driven (steps S510 and S511). This program is finished.

On the other hand, when Yes is judged at step S513, the first electric motor torque command Tm1*(B) is calculated at step S514. Then, at step S515, it is judged whether or not the steering torque signal Tr is equal to or greater than the second torque T2. In this case, when No is judged, the second electric motor torque command Tm2*(B) is set to "0" without calculating the second electric motor torque command Tm2*(B). The process proceeds to step S510. In this case, the only first electric motor M1 is controlled and driven by the first electric motor torque command Tm1*(B) (step S510). The second electric motor M2 is not controlled and driven (step S511). This program is finished.

On the other hand, when Yes is judged at step S515, the second electric motor torque command Tm2*(B) is calculated at step S516. Then, the process proceeds to step S510. In this case, the first electric motor M1 is controlled and driven based on the first electric motor torque command Tm1*(B) (step S510). Moreover, the second electric motor M2 is controlled and driven based on the second electric motor torque command Tm2*(B) (step S511). This program is finished.

(Operations and Effects of Third Embodiment)

As described above, the controller 2 includes a lane deviation judging section 94; the lane deviation judging section 94 is configured to judge whether or not the vehicle is deviated from a traveling lane, or whether or not the vehicle may be deviated from the traveling lane; and the first hydraulic passage state judging section 20 is configured to judge that the supply of the hydraulic fluid in the first hydraulic passage L1 is deficient when the lane deviation judging section 94 judges that the vehicle is deviated from the traveling lane, or that the vehicle may be deviated from the traveling lane.

In the lane keep control such as the automatic steering state, when the supply of the hydraulic fluid in the first hydraulic passage L1 is deficient, the steering assist force produced by the power cylinder 4 is deficient. Consequently, it is difficult to maintain the vehicle to the desired travel position. Accordingly, in this embodiment, the lane deviation judging section 94 is configured to judge the deviation of the lane, or the possibility of the deviation of the lane. The first hydraulic passage state judging section 20 is configured to judge that the supply of the hydraulic fluid in the first hydraulic passage L1 is deficient, based on the judgment of the lane deviation of the lane deviation judging section 94. With this, the second electric motor control section 22 is configured to control to increase the rotation number of the second electric motor M2. Accordingly, it is possible to suppress the generation of the deficiency of the hydraulic fluid supplied to the power cylinder 4, and to suppress the decrease of the steering performance.

Besides, the lane deviation judging section 94 of the controller 2 may be configured to judge whether or not the vehicle is deviated from the traveling lane, or whether or not the vehicle may be deviated from the traveling lane, based on the information of the in-vehicle camera 84, like this embodiment. Moreover, the lane deviation judging section 94 of the controller 2 may be configured to receive a signal relating to the lane deviation judging result from another controller (for example, the integral controller 86), and thereby to recognize whether or not the vehicle is deviated from the traveling lane, or whether or not the vehicle may be deviated from the traveling lane.

Fourth Embodiment

Figure 21:
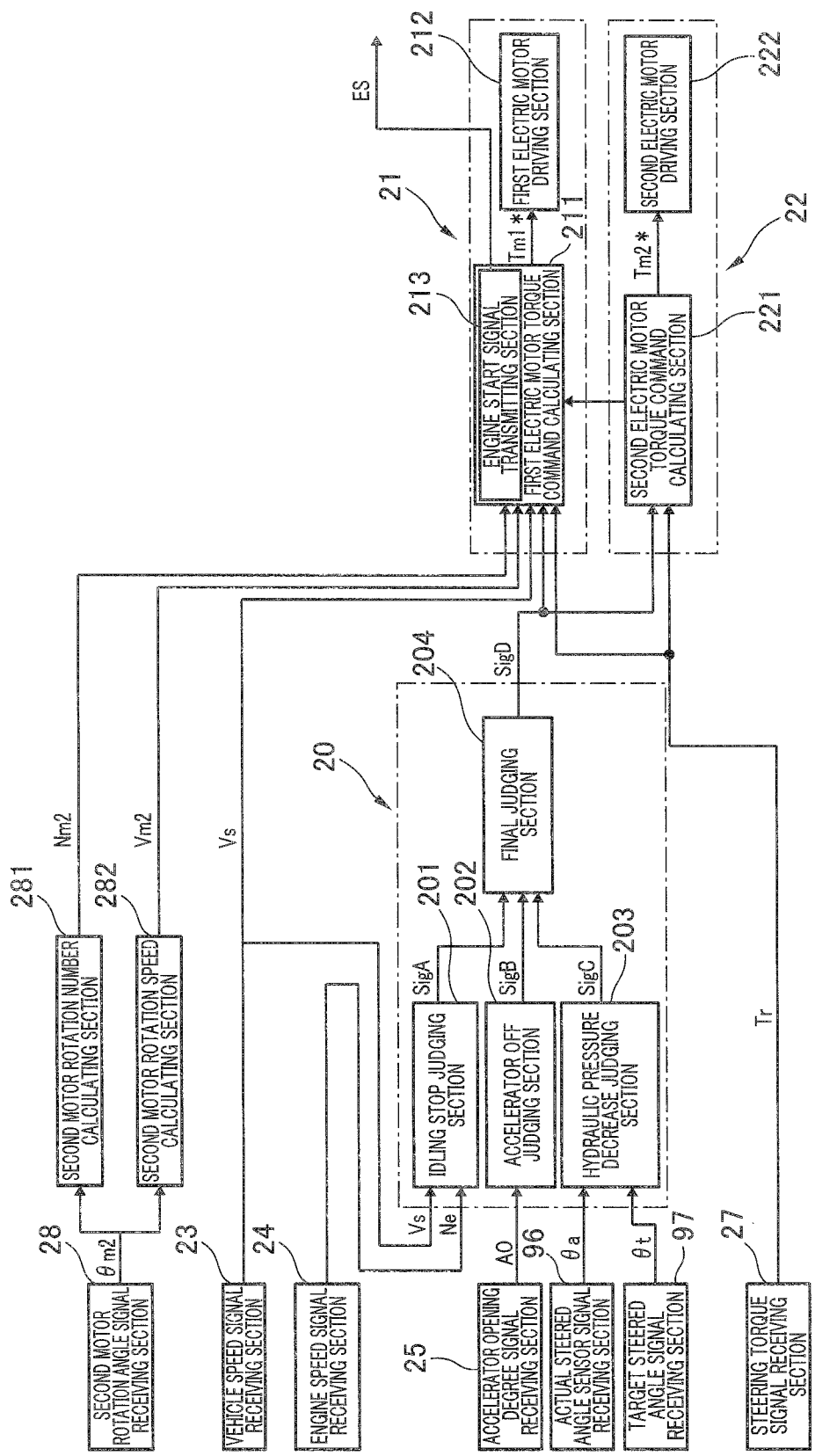
FIG. 21 is a control block diagram showing a configuration of a calculation circuit of a controller (ECU) according to a fourth embodiment of the present invention.
Figure 22:
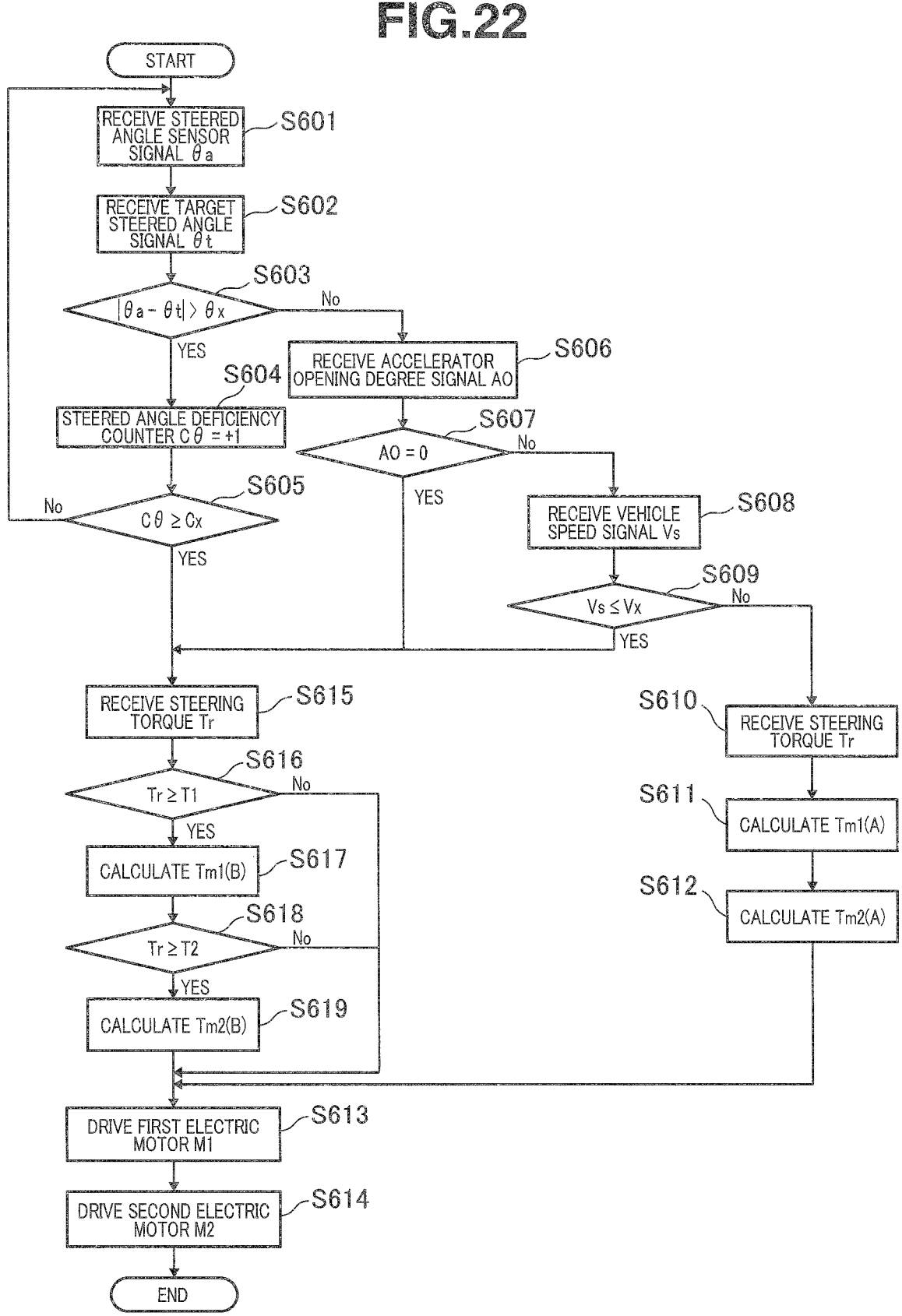
FIG. 22 is a flowchart showing a control flow of a drive control operation of the second pump in the fourth embodiment of the present invention.

FIG. 21 to FIG. 22 show a steering device according to a fourth embodiment of the present invention. Besides, in this embodiment, the means for sensing the state of the hydraulic fluid in the first hydraulic passage L1 is varied. The other configurations are identical to those of the first embodiment. Accordingly, the same symbols are provided to the identical configurations of the first embodiment. These explanations are omitted.

FIG. 21 is a control block diagram showing the configuration of the calculation circuit of the controller 2 in this embodiment.

As shown in FIG. 21, in this embodiment, the hydraulic pressure decrease judging section 203 of the first hydraulic pressure passage state judging section 20 of the controller 2 is configured to receive the actual steered angle signal θa through an actual steered angle sensor signal receiving section 96, and to receive the target steered angle signal θt through a target steering angle signal receiving section 97. Besides, the actual steered angle signal θa is sensed by the actual steered angle sensor (not shown) provided to the steering device. Moreover, the target steered angle signal θt is a signal arithmetically processed by the integral controller 86 based on the vehicle information by the in-vehicle camera 84 exemplified in the third embodiment, and so on. The target steering angle signal θ is a steering angle command signal for steering the steered wheel of the vehicle to a predetermined steered angle.

Then, the hydraulic pressure decrease judging section 203 is configured to judge the decrease of the hydraulic pressure of the hydraulic fluid in the first hydraulic passage L1 based on a difference |θt−θa| between the target steered angle signal θt and the actual steered angle signal θa. Specifically, when the difference |θt−θa| between the target steered angle signal θt and the actual steered angle signal θa is greater than the predetermined value θx, it is judged that the abnormality is generated in the first hydraulic passage L1. When it is judged that the abnormality is generated in the first hydraulic passage L1 based on the difference |θt−θa| between the target steered angle signal θt and the actual steered angle signal θa in this way, the hydraulic pressure decrease judging section 203 is configured to output the hydraulic pressure decrease judging signal SigC to the final judging section 204.

FIG. 22 is a flowchart showing a control flow of the drive control of the second pump P2 in this embodiment.

As shown in FIG. 22, firstly, the hydraulic pressure decrease judging section 203 is configured to receive (fetch) the actual steered angle signal θa inputted through the actual steered angle sensor signal receiving section 96 (step S601), and then to receive (fetch) the target steered angle signal θt inputted through the target steered angle sensor signal receiving section 97 (step S602). Then, the hydraulic pressure decrease judging section 203 is configured to judge whether or not the difference |θt−θa| between the target steered angle signal θt and the actual steered angle signal θa is greater than the predetermined value θx (step S603). In this case, when the hydraulic pressure decrease judging section 203 judges Yes at step S603, a steered angle deficient counter Cθ is incremented (Cθ=+1) (step S604). Then, it is judged whether or not the steering angle deficient counter Cθ is equal to or greater than a predetermined value Cx (step S605). In this case, when Yes is judged, the abnormality is generated in the first hydraulic pressure passage L1. Accordingly, the process proceeds to next step S615. On the other hand, when No is judged, the process returns to step S601.

On the other hand, when the hydraulic pressure decrease judging section 603 judges No at step S502, the accelerator off judging section 202 is configured to receive the accelerator opening degree signal AO (step S606). Then, the accelerator off judging section 202 is configured to judge whether or not the received accelerator opening degree signal AO is "0", that is, whether or not the accelerator (the throttle) is closed (step S607). In this case, when the accelerator off judging section 202 judges Yes, the hydraulic pressure decrease in the first hydraulic pressure passage L1 is due to the stop state of the first pump P1 according to the accelerator off. Accordingly, the process proceeds to next step S615.

On the other hand, when the accelerator off judging section 202 judges No at step 607, the idling stop judging section 201 receives the vehicle speed signal Vs (step S608). The idling stop judging section 201 is configured to judge whether or not the received vehicle speed signal Vs is equal to or smaller than the predetermined vehicle speed Vx (step S609). In this case, when the idling stop judging section 201 judges Yes, the hydraulic pressure decrease in the first hydraulic passage L1 is due to the stop state of the first pump P1 according to the idling stop of the engine E. The process proceeds to step S615. Besides, the idling stop judging section 201 may be configured to receive the engine speed Ne at step S608, and to directly judges whether or not the engine E is in the idling stop state by this engine speed signal Ne at step S609. In this case, when the engine speed Ne received at step S608 is equal to or smaller than the predetermined rotation speed Nx at step S609, it is possible to judge that the first pump P1 is in the stop state according to the idling stop of the engine E.

On the other hand, when the idling stop judging section 201 judges No at step S609, the hydraulic pressure of the hydraulic fluid in the first hydraulic passage L1 is normal. Accordingly, the steering torque signal Tr received through the steering torque signal receiving section 27 is read (step S610). Then, the first electric motor torque command Tm* (A) and the second electric motor torque command Tm2* (A) are calculated based on the received steering torque signal Tr (step S611 and S612). Then, the first electric motor M1 and the second electric motor M2 are controlled and driven based on these motor torque commands Tm1*(A) and Tm2*(A) (steps S613 and S614). This program is finished.

When the process proceeds to step S615, as described above, it is conceivable that the abnormality is generated in the first hydraulic passage L1. Accordingly, firstly, the steering torque signal Tr is read (step S615). It is judged whether or not this read steering torque signal Tr is equal to or greater than the first torque T1 (step S616). In this case, when No is judged, the first electric motor torque command Tm1*(B) and the second electric motor torque command Tm2*(B) are set to "0" without calculating the first and second electric motor torque commands Tm1*(B) and Tm2*(B). The process proceeds to step S613. In this case, the first and second electric motors M1 and M2 are not controlled and driven (steps S613 and S614). This program is finished.

On the other hand, when Yes is judged at step S616, the first electric motor torque command Tm1*(B) is calculated at step S617. Then, at step S618, it is judged whether or not the steering torque signal Tr is equal to or greater than the second torque T2. In this case, when No is judged, the second electric motor torque command Tm2*(B) is set to "0" without calculating the second electric motor torque command Tm2*(B). The process proceeds to step S613. In this case, the only first electric motor M1 is controlled and driven by the first electric motor torque command Tm1*(B) (step S613). The second electric motor M2 is not controlled and driven (step S614). This program is finished.

On the other hand, when Yes is judged at step S618, the second electric motor torque command Tm2*(B) is calculated at step S619. Then, the process proceeds to step S613. In this case, the first electric motor M1 is controlled and driven based on the first electric motor torque command Tm1*(B) (step S613). Moreover, the second electric motor M2 is controlled and driven based on the second electric motor torque command Tm2*(B) (step S614). This program is finished.

(Operations and Effects of Fourth Embodiment)

As described above, in the steering device according to this embodiment, the controller 2 is configured to receive the steered angle command signal (the target steered angle signal θt) which is the command signal for steering the steered wheels to the predetermined steered angle, and to receive the actual steered angle signal θa which is the signal relating to the sensed steered angle information of the steered wheels. The first electric motor control section 21 is configured to drive the first electric motor M1 based on the steered angle command signal (the target steered angle signal θt). The first hydraulic passage state judging section 20 is configured to judge that the supply of the hydraulic fluid in the first hydraulic passage L1 is deficient when the difference between the steered angle command signal (the target steered angle signal θt) and the actual steered angle signal θa is not converged to be smaller than the predetermined value θx during the predetermined time period (Cθ<Cx).

During the automatic steering control in the automatic steering state, the controller 2 is configured to receive the steered angle command signal (the target steered angle signal θt), and to control and drive the first electric motor M1 so that the steered wheels are steered to the predetermined steered angle. In this case, when the supply of the hydraulic fluid in the first hydraulic passage I1 is deficient, the steering assist force produced by the power cylinder 4 is deficient, so that it is difficult to steer the steered wheels to the desired steered angle. Accordingly, in this embodiment, when the difference between the steered angle command signal (the target steered angle signal θt) and the actual steered angle signal θa is not converged to be smaller than the predetermined value θx during the predetermined time period (Cθ<Cx), the first hydraulic passage state judging section 20 is configured to judge that the supply of the hydraulic fluid in the first hydraulic passage L1 is deficient. Consequently, the second electric motor control section 22 is configured to control to increase the rotation number of the second electric motor M2. Therefore, it is possible to suppress the generation of the deficiency of the hydraulic fluid supplied to the power cylinder 4, and to suppress the decrease of the steering performance.

Fifth Embodiment

Figure 23:
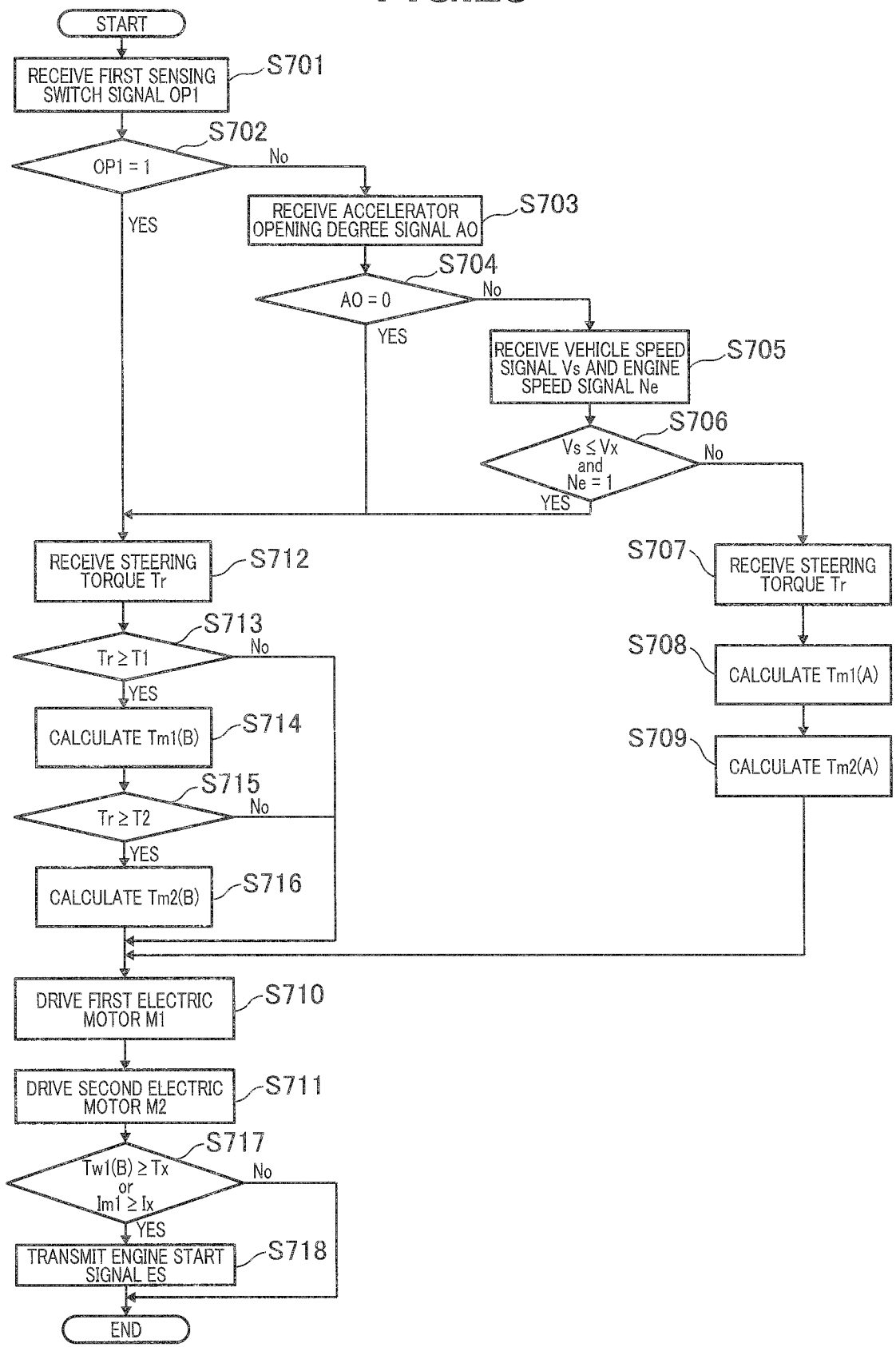
FIG. 23 is a flowchart showing a control flow of a drive control operation of the second pump in a fifth embodiment of the present invention.

FIG. 23 shows a steering device according to a fifth embodiment of the present invention. Besides, this embodiment exemplifies a case in which the steering assist force is deficient even when the rotation number of the second electric motor M2 is increased and the second pump P2 is driven in the first embodiment. The other configurations are identical to those of the first embodiment. Accordingly, the same symbols are provided to the identical configurations of the first embodiment. These explanations are omitted. Moreover, this embodiment are applicable to the controls of the second to fourth embodiments, in addition to the first embodiment.

FIG. 23 is a flowchart showing a control flow of the drive control of the second pump P2 in this embodiment.

As shown in FIG. 23, firstly, the hydraulic pressure decrease judging section 203 is configured to receive (fetch) the first sensing switch signal OP1 outputted from the first sensing switch 81 (step S701). Then, the hydraulic pressure decrease judging section 203 is configured to judge whether or not the received first sensing switch signal OP1 is "1", that is, whether or not the first sensing switch 81 is in the ON state (step S702). In this case, when the hydraulic pressure decrease judging section 203 judges Yes, the abnormality is generated in the first hydraulic pressure passage L1 (the first supply passage F1) due to the malfunction of the first pump P1. Accordingly, the process proceeds to next step S712.

On the other hand, when the hydraulic pressure decrease judging section 203 judges No at step S702, the accelerator off judging section 202 is configured to receive the accelerator opening degree signal AO (step S703). Then, the accelerator off judging section 202 is configured to judge whether or not the received accelerator opening degree signal AO is "0", that is, whether or not the accelerator (the throttle) is closed (step S704). In this case, when the accelerator off judging section 202 judges Yes, the hydraulic pressure decrease in the first hydraulic pressure passage L1 is due to the stop state of the first pump P1 according to the accelerator off. Accordingly, the process proceeds to next step S712.

On the other hand, when the accelerator off judging section 202 judges No at step 704, the idling stop judging section 201 receives the vehicle speed signal Vs and the engine speed signal Ne (step S705). The idling stop judging section 201 is configured to judge whether or not the received vehicle speed signal Vs is equal to or smaller than the predetermined vehicle speed Vx, and to judge that the engine speed signal Ne is equal to or smaller than the predetermined engine speed Nx (step S706). In this case, when the idling stop judging section 201 judges Yes, the hydraulic pressure decrease in the first hydraulic passage L1 is due to the stop state of the first pump P1 according to the idling stop of the engine E. The process proceeds to step S712.

On the other hand, when the idling stop judging section 201 judges No at step S706, the normal hydraulic pressure supply is performed in the first hydraulic passage L1 (the first supply passage F1). Accordingly, the steering torque signal Tr is read from the torque sensor TS through the steering torque signal receiving section 27 (step S707). Then, the first electric motor torque command Tm*(A) and the second electric motor torque command Tm2*(A) are calculated based on the read steering torque signal Tr (step S708 and S709). Then, the first electric motor M1 and the second electric motor M2 are controlled and driven based on these motor torque commands Tm1*(A) and Tm2*(A) (steps S710 and S711). In this case, the engine E is not in the stop state (No judgment at step S706). The engine start signal ES is not transmitted. This program is finished (step S717 and S718).

When the process proceeds to step S712, as described above, it is conceivable that the abnormality is generated in the first hydraulic passage L1. Accordingly, firstly, the steering torque signal Tr is read (step S712). It is judged whether or not this read steering torque signal Tr is equal to or greater than the first torque T1 (step S713). In this case, when No is judged, the first electric motor torque command Tm1*(B) and the second electric motor torque command Tm2*(B) are set to "0" without calculating the first and second electric motor torque commands Tm1*(B) and Tm2*(B). The process proceeds to step S710. In this case, the first and second electric motors M1 and M2 are not controlled and driven (steps S710 and S711). The process proceeds to step S717.

On the other hand, when Yes is judged at step S713, the first electric motor torque command Tm1*(B) is calculated at step S714. Then, at step S715, it is judged whether or not the steering torque signal Tr is equal to or greater than the second torque T2. In this case, when No is judged, the second electric motor torque command Tm2*(B) is set to "0" without calculating the second electric motor torque command Tm2*(B). The process proceeds to step S710. In this case, the only first electric motor M1 is controlled and driven by the first electric motor torque command Tm1*(B) (step S710). The second electric motor M2 is not controlled and driven (step S711). The process proceeds to step S717.

On the other hand, when Yes is judged at step S715, the second electric motor torque command Tm2*(B) is calculated at step S716. Then, the process proceeds to step S710. In this case, the first electric motor M1 is controlled and driven based on the first electric motor torque command Tm1*(B) (step S710). Moreover, the second electric motor M2 is controlled and driven based on the second electric motor torque command Tm2*(B) (step S711). The process proceeds to step S717.

At step S717, it is judged whether or not the first motor torque command Tm1*(B) is equal to or greater than the predetermined torque Tx, or whether or not the first motor current Im1 is equal to or greater than the predetermined current value Ix. When No is judged, this program is finished without transmitting the engine start signal ES.

On the other hand, when Yes is judged at step S717, it is judged that the steering force (the steering assist force) is deficient even when there are the steering assist by the first motor M1, and the steering assist based on the hydraulic supply by the second pump P2. Accordingly, at step S718, the engine start signal ES for starting the engine E is transmitted (step S718). This program is finished. Besides, as shown in FIG. 5 and so on, the engine start signal ES is transmitted from the engine start signal transmitting section provided to the first electric motor torque command calculating section 211 of the first electric motor control section 21, to the engine ECU (not shown) of the vehicle.

(Operations and Effects of Fifth Embodiment)

As described above, in this steering device, the second electric motor control section 22 is configured to increase the rotation number of the second electric motor M2 in a state in which a vehicle speed Vs is equal to or smaller than a predetermined vehicle speed Vx, and in an idling stop state in which the engine E of the vehicle is stopped (the engine speed signal Ne is equal to or smaller than the predetermined rotation speed Nx).

That is, in the stop state of the engine E that is the driving source of the first pump P1 such as the idling stop, the first pump P1 is not driven, and the first pump P1 is stopped. Accordingly, in this embodiment, in this engine stop state, the rotation number of the second electric motor M2 is increased. The second pump P2 is driven. With this, it is possible to perform the steering assist even in the engine stop state. With this, it is possible to ensure the steering assist function even in a case in which the steering operation is performed, for example, in the EV mode (the traveling mode in which the engine is stopped in the hybrid vehicle, and in which the vehicle travels only by the electric motor which is the driving source). Moreover, it is possible to perform the steering assist when the stationary steering is needed during the idling stop control, and when the steering is needed during the period from the idling stop state to the engine restart, such as the start of the steering in the right or left turn waiting during the idling stop control.

As described above, the first electric motor control section 21 is configured to control and drive the first electric motor M1 in the idling stop state.

In the idling stop control, the vehicle speed is zero, or the extremely low speed. Accordingly, the frictional resistance between the road surface and the steered wheels become large. Accordingly, in this embodiment, in this idling stop state, the first electric motor M1 is controlled and driven in addition to the second electric motor M2. With this, it is possible to suppress the generation of the deficiency of the steering assist force.

Moreover, in this embodiment, the first electric motor control section 21 is configured to control and drive the first electric motor M2 in a state in which a vehicle speed Vs is equal to or smaller than a predetermined vehicle speed Vx, and in an idling stop state in which the engine E of the vehicle is stopped (the engine speed signal Ne is equal to or smaller than the predetermine rotation speed Nx);

the controller includes an engine start signal transmitting section 98; and the engine start signal transmitting section 98 is configured to transmit an engine start signal for starting the engine E when a drive torque (the first motor torque Tm1) of the first electric motor M1 is equal to or greater than a predetermined torque (the first motor torque Tm1), or when a current value (the first motor current Im1) flowing in the first electric motor is equal to or greater than a predetermined current value Ux, in the idling stop state.

That is, in a state in which the first motor torque Tm1 or the first motor current Im1 becomes extremely large, it is judged that the steering assist force of the power cylinder 4 based on the hydraulic pressure discharged by the first pump Pt is needed. Therefore, in this embodiment, in this state, the engine start signal ES is transmitted to start the engine E. With this, it is possible to drive the first pump P1, and to obtain the necessary and sufficient steering assist force.

Sixth Embodiment

Figure 24:
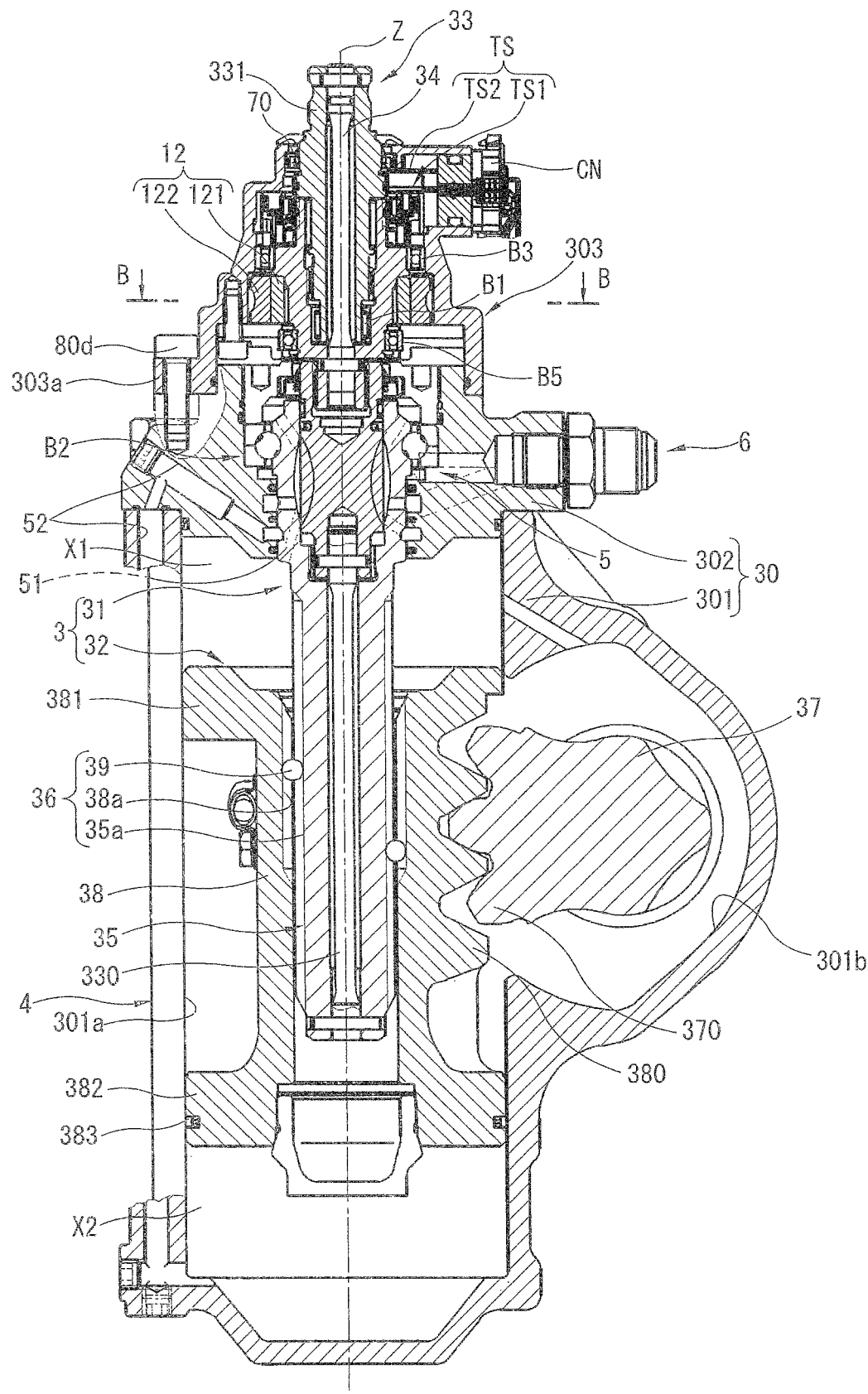
FIG. 24 is a longitudinal sectional view showing the steering device according to a sixth embodiment of the present invention.
Figure 25:
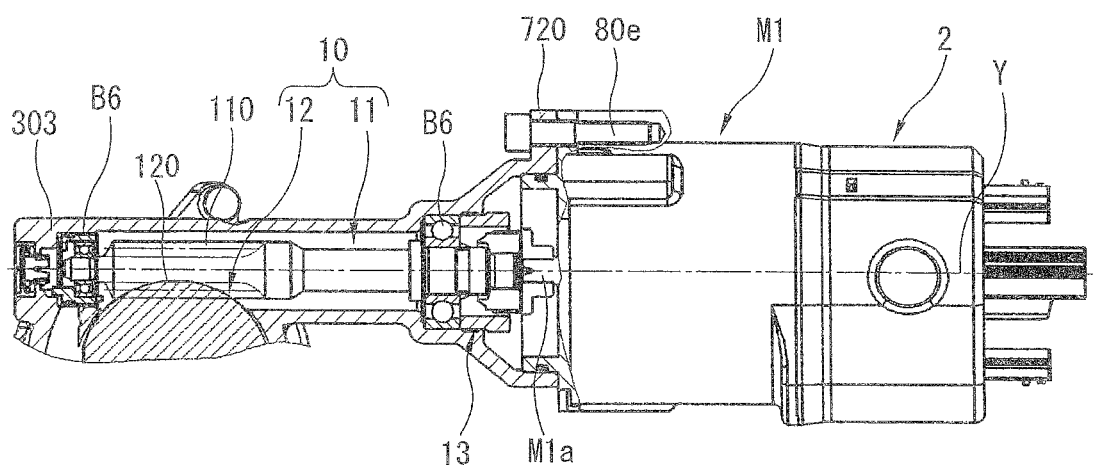
FIG. 25 is a sectional view taken along a section line B-B line of FIG. 24.

FIG. 24 to FIG. 25 show a steering device according to a sixth embodiment of the present invention. Besides, this embodiment exemplifies a configuration in which the first electric motor M1 is a member different from the input shaft 33. The other configurations are identical to those of the first embodiment. Accordingly, the same symbols are provided to the identical configurations of the first embodiment. These explanations are omitted.

FIG. 24 is a longitudinal sectional view showing the steering device according to the sixth embodiment of the present invention. FIG. 25 is a sectional view taken along a B-B line of FIG. 24.

The first embodiment exemplifies the configuration in which the first electric motor M1 is integrally constituted with the input shaft 33. As shown in FIG. 24 and FIG. 25, the present invention is applicable to the steering device in which the first electric motor M1 and the input shaft 33 are different members. That is, in this steering device according to the embodiment, the first electric motor M1 is connected through a speed reduction mechanism, for example, a worm gear 10, to the input shaft 33 (the second input shaft 332). The worm gear 10 includes a worm shaft 11 connected to the first electric motor M1; and a worm wheel connected to the input shaft 33. The worm gear 10 is received within a third housing 303 mounted to the end portion of the second housing 302 on the steering wheel (not shown) side. The third housing 303 is fixed to the second housing 302 by a plurality of bolts 80*d* through a flange portion 303*a* provided to the end portion confronting the second housing 302.

The worm shaft 11 includes a first end side connected through a shaft coupling 13 to the rotation shaft M1*a* of the electric motor M1 to rotate as a unit with the rotation shaft M1*a* of the electric motor M1; and a second end side. A teeth portion 110 is formed in a predetermined region of the second end side of the worm shaft 11. The teeth portion 110 is engaged with a teeth portion 120 provided on the outer circumference side of the worm wheel 12. Moreover, the both end portions of the worm shaft 11 are rotatably supported by a pair of sixth bearings B6 and B6 which are ball bearings.

The worm wheels 12 includes a core metal portion 121 made from the metal, and fixed to the outer circumference side of the input shaft 33 (the second input shaft 332); and a wheel portion 122 made from the resin, and integrally molded (insertion molding) to surround (encompass) the core metal portion 121. The core metal portion 121 has an annular shape. The core metal 121 includes a through hole 121*a* formed at a center portion. The second input shaft 332 is fixed to the through hole 121*a* to penetrate through the through hole 121*a*. The wheel portion 122 is provided to surround the outer surface of the core metal portion 121. The wheel portion 122 includes a teeth portion 120 formed on the outer circumference side, and engaged with the teeth portion 120 of the worm shaft 11.

As shown in FIG. 25, the first electric motor M1 is disposed along the rotation axis Y perpendicular to the rotation axis Z of the steering shaft 31 to be perpendicular to the input shaft 33. This electric motor M1 is fixed to a side portion of the third housing 303 by a plurality of bolts 80*e* through a flange portion 720 provided to the motor housing 72. Moreover, the first electric motor M1 has an electromechanical configuration (mechanically and electrically integral configuration). The controller 2 is integrally provided at the end portion of the first electric motor M1 which is opposite to the fixing portion (the flange portion 720).

A symbol TS in FIG. 24 is a torque sensor configured to sense the steering torque inputted through the input shaft 33, that is, the torque generated in the first torsion bar 34. This torque sensor TS includes a sensor main body portion TS1; and a circuit board TS2. The circuit board TS2 is electrically connected through a connecter CN to the controller 2 (cf. FIG. 1).

Hereinabove, the present invention is applicable to the steering device in which the input shaft 33 and the first electric motor M1 are constituted as the different members. Moreover, in this embodiment, it is possible to attain the operation and the effects which are identical to those of the first embodiment. Furthermore, the speed reduction mechanism (the worm gear 10) is disposed between the first electric motor M1 and the input shaft 33. With this, it is possible to amplify the drive torque of the first electric motor M1, and to increase the steering assist force of the first electric motor M1. Consequently, it is possible to decrease the sizes of the second electric motor M2 and the second pump P2 by using together with the first electric motor M1.

Other Embodiments

The present invention is not limited to the configurations exemplified in the above-described embodiments. Variations will freely occur in accordance with the specification and so on of the steering device to which the present invention is applied, as long as it is possible to attain the operations and the effects of the present invention.

For example, in the above-described embodiments and so on, the present invention is applied to the power steering device of the integral type. However, the present invention is applicable to a steering device of a rack and pinion type which includes a transmitting mechanism including a rack bar and a tie rod, and a power steering device of a column type.

Moreover, in the embodiments, the first electric motor control section 21 and the second electric motor control section 22 are provided in the microcomputer of the same controller. However, the first electric motor control section 21 and the second electric motor control section 22 may be provided, respectively, in different microcomputers of one (the same) controller.

The controller including the first electric motor control section 21, and the controller including the second electric motor control section 22 are not necessarily the same controller. That is, the first electric motor control section 21 and the second electric motor control section 22 are not necessarily provided in one (the same) controller. That is, for example, the second electric motor control section 22 may be provided in the controller for the second pump P2 only, and the first electric motor control section 21 may be provided in another controller different from that controller.

For example, following aspects are conceivable as the steering devices according to the above-described embodiments.

That is, the steering device according to an aspect includes a steering mechanism including a steering shaft, and a transmitting mechanism, the steering shaft including a first shaft, a second shaft, and a torsion bar provided between the first shaft and the second shaft, and the transmitting mechanism configured to transmit a rotation of the steering shaft to a steered wheel; a power cylinder including a power cylinder main body portion, a piston, and a first hydraulic chamber, and a second hydraulic chamber, the power cylinder configured to provide a steering force for steering the steered wheel, to the transmitting mechanism, and the piston which is provided within the power cylinder main body portion, and which separates an inside space of the power cylinder main body portion into the first hydraulic chamber and the second hydraulic chamber; a first electric motor which includes a stator coil, and a motor rotor, and which is configured to provide a rotation force to the first shaft; a first pump configured to be driven by a first driving source, and to discharge a hydraulic fluid; a second pump configured to be driven by a second electric motor which is a second driving source, and to discharge the hydraulic fluid; a rotary valve configured to selectively supply the hydraulic fluid supplied from the first pump or the second pump, to the first hydraulic chamber and the second hydraulic chamber in accordance with a torsion of the torsion bar; and a controller including a first hydraulic passage state judging section, a first electric motor control section, and a second electric motor control section; the first hydraulic passage state judging section configured to judge a state of the hydraulic fluid in a first hydraulic passage in which the hydraulic fluid discharged from the first pump flows, the first electric motor control section configured to control and drive the first electric motor based on a driving state of a vehicle, and the second electric motor control section configured to increase a rotation number of the second electric motor when the first hydraulic passage state judging section judges that a supply of the hydraulic fluid in the first hydraulic passage is deficient.

In the steering device according to a preferable aspect, the first hydraulic passage state judging section is configured to judge whether or not the abnormality is generated in the first hydraulic passage based on a pressure of the hydraulic fluid in the first hydraulic passage; and the second electric motor control section is configured to increase the rotation number of the second electric motor when the first hydraulic passage state judging section judges that the abnormality is generated in the first hydraulic passage.

In another aspect, the steering device includes a switching valve; the switching valve is provided between the first pump and the second pump, and the rotary valve; the switching valve includes a valve housing, and a valve element configured to be moved within the valve housing; the valve element is configured to be moved to a first position when the pressure of the hydraulic fluid discharged from the first pump, and supplied to the switching valve is equal to or greater than a first predetermined value, and to be moved to a second position when the pressure of the hydraulic fluid discharged from the first pump, and supplied to the switching valve is smaller than the first predetermined value; and the switching valve is configured to supply the hydraulic fluid discharged from the first pump to the rotary valve when the valve element is positioned at the first position, and to supply the hydraulic fluid discharged from the second pump to the rotary valve when the valve element is positioned at the second position.

In still another aspect, the switching valve includes a first sensing switch; the first sensing switch is configured to sense that the valve element is positioned at the second position; and the first hydraulic passage state judging section is configured to judge that the abnormality is generated in the first hydraulic passage when the first sensing switch senses that the valve element is positioned at the second position.

In still another aspect, the steering device includes a second sensing switch; the switching valve includes a first sensing switch; the first sensing switch is configured to sense that the valve element is positioned at the second position; and the second sensing switch is configured to sense that the hydraulic pressure of the hydraulic fluid discharged from the first pump, and supplied to the switching valve becomes smaller than a second predetermined value higher than the first predetermined value; and the first hydraulic passage state judging section is configured to judge that the abnormality is generated in the first hydraulic passage when the second sensing switch senses that the hydraulic pressure of the hydraulic fluid supplied from the first pump to the switching valve becomes smaller than the second predetermined value.

In still another aspect, the steering device includes a pressure sensor; the pressure sensor includes an element configured to sense a variation of the hydraulic pressure of the hydraulic fluid discharged from the first pump, and supplied to the switching valve; and the first hydraulic passage state judging section is configured to judge that the abnormality is generated in the first hydraulic passage when the pressure sensor senses that the hydraulic pressure of the hydraulic fluid supplied from the first pump to the switching valve becomes smaller than a third predetermined value.

In still another aspect, the first electric motor control section is configured to control and drive the first electric motor to increase a drive torque of the first electric motor when the steering force of the power cylinder is deficient; and the first hydraulic passage state judging section is configured to judge that the supply of the hydraulic fluid in the first hydraulic passage is deficient when the drive torque of the first electric motor is equal to or greater than a predetermined torque, or when a current value flowing in the first electric motor is equal to or greater than a predetermined current value.

In still another aspect, the controller includes a lane deviation judging section; the lane deviation judging section is configured to judge whether or not the vehicle is deviated from a traveling lane, or whether or not the vehicle may be deviated from the traveling lane; and the first hydraulic passage state judging section is configured to judge that the supply of the hydraulic fluid in the first hydraulic passage is deficient when the lane deviation judging section judges that the vehicle is deviated from the traveling lane, or that the vehicle may be deviated from the traveling lane.

In still another aspect, the controller is configured to receive a steered angle command signal which is a command signal for steering the steered wheel to a predetermined steered angle, and to receive an actual steered angle signal which is a signal relating to a sensed steering angle information of the steered wheel; the first electric motor control section is configured to control and drive the first electric motor based on the steered angle command signal; the first hydraulic passage state judging section is configured to judge that the supply of the hydraulic fluid in the first hydraulic passage is deficient when a difference between a value of the steered angle command signal and a value of the actual steered angle signal is not converged to be smaller than a predetermined value during a predetermined time period.

In still another aspect, the first electric motor control section is configured to control and drive the first electric motor when the second electric motor control section controls and drives the second electric motor to increase the rotation number of the second electric motor.

In still another aspect, the first electric motor control section is configured to control and drive the first electric motor in accordance with a vehicle speed.

In still another aspect, the first electric motor control section is configured to control and drive the first electric motor so that a drive torque of the first electric motor is lower as a vehicle speed is higher.

In still another aspect, the first electric motor control section is configured to control and drive the first electric motor in accordance with a rotation speed of the second electric motor.

In still another aspect, the first electric motor control section is configured to control and drive the first electric motor so that a drive torque of the first electric motor is lower as the rotation speed of the second electric motor is higher.

In still another aspect, the first driving source is an engine of the vehicle.

In still another aspect, the second electric motor control section is configured to increase the rotation number of the second electric motor in a state in which a vehicle speed is equal to or smaller than a predetermined vehicle speed, and in an idling stop state in which the engine of the vehicle is stopped.

In still another aspect, the first electric motor control section is configured to control and drive the first electric motor in the idling stop state.

In still another aspect, the first electric motor control section is configured to control and drive the first electric motor in a state in which a vehicle speed is equal to or smaller than a predetermined vehicle speed, and in an idling stop state in which the engine of the vehicle is stopped; the controller includes an engine start signal transmitting section; and the engine start signal transmitting section is configured to transmit an engine start signal for starting the engine when a drive torque of the first electric motor is equal to or greater than a predetermined torque, or when a current value flowing in the first electric motor is equal to or greater than a predetermined current value, in the idling stop state.

The invention claimed is:

1. A steering device comprising:
a steering mechanism including a steering shaft, and a transmitting mechanism,
the steering shaft including a first shaft, a second shaft, and a torsion bar provided between the first shaft and the second shaft, and
the transmitting mechanism configured to transmit a rotation of the steering shaft to a steered wheel;
a power cylinder including a power cylinder main body portion, a piston, and a first hydraulic chamber, and a second hydraulic chamber,
the power cylinder configured to provide a steering force for steering the steered wheel, to the transmitting mechanism, and
the piston which is provided within the power cylinder main body portion, and which separates an inside space of the power cylinder main body portion into the first hydraulic chamber and the second hydraulic chamber;
a first electric motor which includes a stator coil, and a motor rotor, and which is configured to provide a rotation force to the first shaft;
a first pump configured to be driven by a first driving source, and to discharge a hydraulic fluid;
a second pump configured to be driven by a second electric motor which is a second driving source, and to discharge the hydraulic fluid;
a rotary valve configured to selectively supply the hydraulic fluid supplied from the first pump or the second pump, to the first hydraulic chamber and the second hydraulic chamber in accordance with a torsion of the torsion bar; and
a controller including a first hydraulic passage state judging section, a first electric motor control section, and a second electric motor control section;
the first hydraulic passage state judging section configured to judge a state of the hydraulic fluid in a first hydraulic passage in which the hydraulic fluid discharged from the first pump flows,
the first electric motor control section configured to:
control and drive the first electric motor based on a driving state of a vehicle,
receive input of a rotation speed of the second electric motor, and
control and drive the first electric motor in accordance with the rotation speed of the second electric motor, and
the second electric motor control section configured to increase a rotation number of the second electric motor when the first hydraulic passage state judging section judges that a supply of the hydraulic fluid in the first hydraulic passage is deficient.

2. The steering device as claimed in claim 1, wherein the first hydraulic passage state judging section is configured to judge whether or not the abnormality is generated in the first hydraulic passage based on a pressure of the hydraulic fluid in the first hydraulic passage; and
the second electric motor control section is configured to increase the rotation number of the second electric motor when the first hydraulic passage state judging section judges that the abnormality is generated in the first hydraulic passage.

3. The steering device as claimed in claim 2, wherein the steering device includes a switching valve;
the switching valve is provided between the first pump and the second pump, and the rotary valve;
the switching valve includes a valve housing, and a valve element configured to be moved within the valve housing;
the valve element is configured to be moved to a first position when the pressure of the hydraulic fluid discharged from the first pump, and supplied to the switching valve is equal to or greater than a first predetermined value, and to be moved to a second position when the pressure of the hydraulic fluid discharged from the first pump, and supplied to the switching valve is smaller than the first predetermined value; and
the switching valve is configured to supply the hydraulic fluid discharged from the first pump to the rotary valve when the valve element is positioned at the first position, and to supply the hydraulic fluid discharged from the second pump to the rotary valve when the valve element is positioned at the second position.

4. The steering device as claimed in claim 3, wherein the switching valve includes a first sensing switch;
the first sensing switch is configured to sense that the valve element is positioned at the second position; and
the first hydraulic passage state judging section is configured to judge that the abnormality is generated in the first hydraulic passage when the first sensing switch senses that the valve element is positioned at the second position.

5. The steering device as claimed in claim 3, wherein the steering device includes a second sensing switch;
the switching valve includes a first sensing switch;
the first sensing switch is configured to sense that the valve element is positioned at the second position; and
the second sensing switch is configured to sense that the hydraulic pressure of the hydraulic fluid discharged from the first pump, and supplied to the switching valve becomes smaller than a second predetermined value higher than the first predetermined value; and
the first hydraulic passage state judging section is configured to judge that the abnormality is generated in the first hydraulic passage when the second sensing switch senses that the hydraulic pressure of the hydraulic fluid supplied from the first pump to the switching valve becomes smaller than the second predetermined value.

6. The steering device as claimed in claim 3, wherein the steering device includes a pressure sensor;
the pressure sensor includes an element configured to sense a variation of the hydraulic pressure of the hydraulic fluid discharged from the first pump, and supplied to the switching valve; and
the first hydraulic passage state judging section is configured to judge that the abnormality is generated in the first hydraulic passage when the pressure sensor senses that the hydraulic pressure of the hydraulic fluid supplied from the first pump to the switching valve becomes smaller than a third predetermined value.

7. The steering device as claimed in claim 1, wherein the first electric motor control section is configured to control and drive the first electric motor to increase a drive torque of the first electric motor when the steering force of the power cylinder is deficient; and the first hydraulic passage state judging section is configured to judge that the supply of the hydraulic fluid in the first hydraulic passage is deficient when the drive torque of the first electric motor is equal to or greater than a predetermined torque, or when a current value flowing in the first electric motor is equal to or greater than a predetermined current value.

8. The steering device as claimed in claim 1, wherein the controller includes a lane deviation judging section;

the lane deviation judging section is configured to judge whether or not the vehicle is deviated from a traveling lane, or whether or not the vehicle may be deviated from the traveling lane; and the first hydraulic passage state judging section is configured to judge that the supply of the hydraulic fluid in the first hydraulic passage is deficient when the lane deviation judging section judges that the vehicle is deviated from the traveling lane, or that the vehicle may be deviated from the traveling lane.

9. The steering device as claimed in claim 1, wherein the controller is configured to receive a steered angle command signal which is a command signal for steering the steered wheel to a predetermined steered angle, and to receive an actual steered angle signal which is a signal relating to a sensed steering angle information of the steered wheel;

the first electric motor control section is configured to control and drive the first electric motor based on the steered angle command signal;

the first hydraulic passage state judging section is configured to judge that the supply of the hydraulic fluid in the first hydraulic passage is deficient when a difference between a value of the steered angle command signal and a value of the actual steered angle signal is not converged to be smaller than a predetermined value during a predetermined time period.

10. The steering device as claimed in claim 1, wherein the first electric motor control section is configured to control and drive the first electric motor when the second electric motor control section controls and drives the second electric motor to increase the rotation number of the second electric motor.

11. The steering device as claimed in claim 1, wherein the first electric motor control section is configured to control and drive the first electric motor in accordance with a vehicle speed.

12. The steering device as claimed in claim 11, wherein the first electric motor control section is configured to control and drive the first electric motor so that a drive torque of the first electric motor is lower as a vehicle speed is higher.

13. The steering device as claimed in claim 1, wherein the first electric motor control section is configured to control and drive the first electric motor so that a drive torque of the first electric motor is lower as the rotation speed of the second electric motor is higher.

14. The steering device as claimed in claim 1, wherein the first driving source is an engine of the vehicle.

15. The steering device as claimed in claim 14, wherein the second electric motor control section is configured to increase the rotation number of the second electric motor in a state in which a vehicle speed is equal to or smaller than a predetermined vehicle speed, and in an idling stop state in which the engine of the vehicle is stopped.

16. The steering device as claimed in claim 15, wherein the first electric motor control section is configured to control and drive the first electric motor in the idling stop state.

17. The steering device as claimed in claim 14, wherein the first electric motor control section is configured to control and drive the first electric motor in a state in which a vehicle speed is equal to or smaller than a predetermined vehicle speed, and in an idling stop state in which the engine of the vehicle is stopped;

the controller includes an engine start signal transmitting section; and the engine start signal transmitting section is configured to transmit an engine start signal for starting the engine when a drive torque of the first electric motor is equal to or greater than a predetermined torque, or when a current value flowing in the first electric motor is equal to or greater than a predetermined current value, in the idling stop state.

* * * * *